(12) United States Patent
Kumagai et al.

(10) Patent No.: US 9,844,839 B2
(45) Date of Patent: Dec. 19, 2017

(54) FLUX COMPOSITION

(71) Applicant: UACJ Corporation, Tokyo (JP)

(72) Inventors: Hidetoshi Kumagai, Tokyo (JP); Yuji Hisatomi, Tokyo (JP); Naoki Yamashita, Tokyo (JP)

(73) Assignee: UACJ Corporation, Tokyo (JP)

( * ) Notice: Subject to any disclaimer, the term of this patent is extended or adjusted under 35 U.S.C. 154(b) by 303 days.

(21) Appl. No.: 14/438,293

(22) PCT Filed: Oct. 24, 2013

(86) PCT No.: PCT/JP2013/078777
§ 371 (c)(1),
(2) Date: Apr. 24, 2015

(87) PCT Pub. No.: WO2014/065356
PCT Pub. Date: May 1, 2014

(65) Prior Publication Data
US 2015/0290748 A1 Oct. 15, 2015

(30) Foreign Application Priority Data
Oct. 26, 2012 (JP) .................. 2012-236580

(51) Int. Cl.

| | |
|---|---|
| *B23K 35/36* | (2006.01) |
| *B23K 35/28* | (2006.01) |
| *B23K 35/30* | (2006.01) |
| *B23K 35/02* | (2006.01) |
| *B23K 1/19* | (2006.01) |
| *B23K 1/00* | (2006.01) |
| *B23K 3/08* | (2006.01) |
| *B23K 35/362* | (2006.01) |
| *B23K 101/00* | (2006.01) |
| *B23K 101/14* | (2006.01) |

(52) U.S. Cl.
CPC .......... *B23K 35/361* (2013.01); *B23K 1/0012* (2013.01); *B23K 1/19* (2013.01); *B23K 3/087* (2013.01); *B23K 35/0222* (2013.01); *B23K 35/0244* (2013.01); *B23K 35/28* (2013.01); *B23K 35/282* (2013.01); *B23K 35/286* (2013.01); *B23K 35/30* (2013.01); *B23K 35/302* (2013.01); *B23K 35/36* (2013.01); *B23K 35/3601* (2013.01); *B23K 35/362* (2013.01); *B23K 35/3603* (2013.01); *B23K 35/3605* (2013.01); *B23K 35/3613* (2013.01); *B23K 35/3618* (2013.01); *B23K 2201/006* (2013.01); *B23K 2201/14* (2013.01)

(58) Field of Classification Search
CPC .. B23K 35/361; B23K 35/3603; B23K 35/30; B23K 35/3601; B23K 35/28; B23K 35/0222; B23K 1/0012; B23K 3/087; B23K 1/19; B23K 35/3618; B23K 35/0244; B23K 35/302; B23K 35/286; B23K 35/282; B23K 35/36; B23K 35/3613; B23K 35/362; B23K 35/3605; B23K 2201/14; B23K 2201/006
See application file for complete search history.

(56) References Cited

U.S. PATENT DOCUMENTS

2004/0009358 A1   1/2004   Scott et al.

FOREIGN PATENT DOCUMENTS

| JP | 61-293699 A | 12/1986 |
|---|---|---|
| JP | 2004-42086 A | 2/2004 |
| JP | 2005-523163 A | 8/2005 |
| JP | 2006-255755 A | 9/2006 |
| JP | 2010-75965 A | 4/2010 |
| JP | 2010-75966 A | 4/2010 |

OTHER PUBLICATIONS

Fleischer et al., "The RbNiCrF6 family. New fluorides AIMIIMIIIF6 (AI=Cs, Rb; MII=Mg, Ni, Cu, Zn; and Miii=Al, V, Fe, Co, Ni)," Journal of Fluorine Chemistry, vol. 19, Issue: 3-6, pp. 529-52, Journal, 1982.*
Office Action dated Mar. 20, 2017, issued in counterpart European Application No. 13849887.8. (6 pages).
International Search Report dated Jan. 21, 2014, issued in corresponding application No. PCT/JP2013/078777.

* cited by examiner

*Primary Examiner* — Anthony J Zimmer
(74) *Attorney, Agent, or Firm* — Westerman, Hattori, Daniels & Adrian, LLP

(57) ABSTRACT

A flux composition includes a component (A) that is a powder of an alkali metal zinc fluoroaluminate represented by "$M_w Zn_x Al_y F_z$ (1)" (wherein M is K or Cs, and w, x, y, and z are a positive integer, the greatest common divisor of w, x, y, and z being 1), the content of the component (A) in the flux composition being 50 mass % or more. The flux composition prevents occurrence of a brazing defect and discoloration even when an aluminum alloy is brazed in an atmosphere having a high oxygen concentration, or an atmosphere having high humidity.

7 Claims, 1 Drawing Sheet

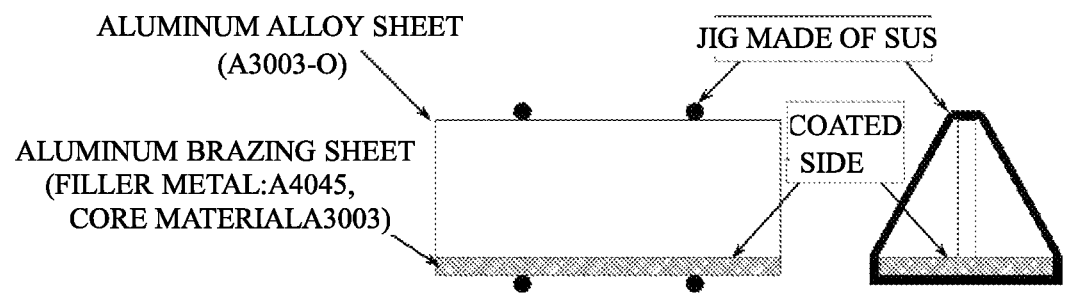

FLUX COMPOSITION

TECHNICAL FIELD

The present invention relates to a flux composition that is used when subjecting an aluminum member or an aluminum alloy member to flux brazing.

BACKGROUND ART

A reduction in weight has been desired for an automotive heat exchanger made of aluminum in order to achieve a reduction in fuel consumption of an automotive engine and a reduction in cost, and a reduction in thickness of a material (e.g., tube) for producing a heat exchanger has been desired. However, since leakage of a refrigerant due to pitting corrosion of the aluminum alloy member may occur within a shorter period when the thickness of the material is reduced, it is important to provide the material with corrosion resistance while reducing the thickness of the material.

For example, a condenser used for an automotive heat exchanger is produced using a multi-port extruded tube having a flat cross-sectional shape as a tube that forms a refrigerant passage. When $KZnF_3$ is applied to the outer circumferential surface of the tube, and the tube is brazed, $KAlF_4$ is produced by the substitution reaction between Zn and Al, and removes an oxide film formed on the surface of the aluminum alloy. On the other hand, Zn produced by the substitution reaction forms a Zn diffusion layer on the surface of the aluminum alloy member, and improves corrosion resistance (see Patent Document 1). Specifically, when $KZnF_3$ is applied to the aluminum alloy member, and the aluminum alloy member is brazed, $KZnF_3$ reacts with Al that forms the surface of the aluminum alloy member at about 550° C., and is decomposed into Zn and a potassium fluoroaluminate (e.g., $KAlF_4$ and $K_2AlF_5$) (i.e., a noncorrosive flux normally used for brazing). Zn produced by decomposition of $KZnF_3$ diffuses into the surface of the aluminum alloy member, and forms a Zn diffusion layer. On the other hand, the potassium fluoroaluminate removes an oxide film formed on the surface of the aluminum alloy member so that wetting occurs between the filler metal and the aluminum alloy member, and the aluminum alloy member is joined.

The Zn diffusion layer has a natural electrode potential lower than that of the aluminum alloy member that forms the tube, and is preferentially corroded as compared with the aluminum alloy member due to a sacrificial anode effect caused by galvanic action to prevent the tube from undergoing pitting corrosion. Since $KZnF_3$ ensures that the Zn diffusion layer has a uniform Zn concentration as compared with Zn arc spraying, it is possible to suppress contamination of the work environment that occurs when a thermally sprayed powder is scattered around the surface of the tube material, and reduce the application amount.

However, $KZnF_3$ may not normally function during brazing when the oxygen concentration in the brazing furnace is high. In such a case, since an oxide film is not removed, the molten filler metal may not spread, and a fillet may not be formed. When the aluminum alloy member is brazed using $KZnF_3$ in an atmosphere having a high oxygen concentration, Zn and $K_3AlF_6$ (having a high melting point) (covered with a thick oxide film) produced from $KZnF_3$ that has reacted with oxygen in the brazing furnace during brazing may remain on the surface of the aluminum alloy member as a residue, whereby the surface of the aluminum alloy member may be discolored, and a deterioration in external appearance may occur.

When $KZnF_3$ is stored in an atmosphere having high humidity, $KZnF_3$ may deteriorate, and not normally function during brazing. In such a case, since an oxide film is not removed, the molten filler metal may not spread, and a fillet may not be formed.

In order to prevent such a situation, it is necessary to store $KZnF_3$ in a storage area in which dehumidification equipment is installed.

In this case, however, since it is necessary to always operate the dehumidification equipment, the electricity cost increases, and frequent maintenance of the dehumidification equipment is required. This results in an increase in production cost.

$KZnF_3$ is easily affected by the flow of the molten filler metal, and may flow together with the filler metal when the filler metal flows toward the fin, and forms a fillet. In this case, the Zn concentration in the surface of the tube between the fillets (for which corrosion resistance is required) decreases, and the Zn concentration in the fillet increases, whereby the fillet is preferentially corroded, and the fin is separated at an early stage.

In order to solve the above problems, a method that utilizes a mixture of $KZnF_3$ and a noncorrosive flux (e.g., $KAlF_4$ or $K_2AlF_5$) has been proposed, for example (see Patent Document 2).

Specifically, when the noncorrosive flux that does not easily deteriorate during brazing even in an atmosphere having a high oxygen concentration, and removes an oxide film, is mixed with $KZnF_3$ that reacts with the surface of the aluminum alloy member to remove an oxide film and form a Zn diffusion layer, and the mixture is heated, the flux mixture spreads at a temperature lower than the melting point of the filler metal, and the Zn concentration in the Zn diffusion layer between the fillets becomes uniform.

RELATED-ART DOCUMENT

Patent Document

Patent Document 1: JP-A-61-293699 (claims)
Patent Document 2: JP-A-2006-255755 (claims)

SUMMARY OF THE INVENTION

Technical Problem

When using the flux mixture disclosed in Patent Document 2, however, a brazing defect or discoloration may also occur when brazing is performed in an atmosphere having a high oxygen concentration, or an atmosphere having high humidity.

An object of the invention is to provide a flux composition that prevents occurrence of a brazing defect and discoloration even when an aluminum alloy is brazed in an atmosphere having a high oxygen concentration, or an atmosphere having high humidity.

Solution to Problem

The inventors of the invention conducted extensive studies in order to achieve the above object. As a result, the inventors found that it is possible to prevent a brazing defect, form a good Zn diffusion layer, and prevent discoloration even when an aluminum alloy is brazed in an atmosphere having a high oxygen concentration, or an atmosphere having high humidity, by brazing an aluminum alloy using a flux composition (flux) that includes an alkali metal zinc fluoroaluminate in a ratio equal to or more than a specific ratio. This finding has led to the completion of the invention.

(1) According to one aspect of the invention, a flux composition includes a component (A) that is a powder of an alkali metal zinc fluoroaluminate represented by the following general formula (1), the content of the component (A) in the flux composition being 50 mass % or more, $$M_w Zn_x Al_y F_z \quad (1)$$

wherein M is K or Cs, and w, x, y, and z are a positive integer, the greatest common divisor of w, x, y, and z being 1.

(2) The flux composition according to (1), including only the component (A).

(3) The flux composition according to (1), including the component (A), and a flux component other than the component (A), the content of the component (A) in the flux composition being 50 mass % or more.

(4) The flux composition according to (1), including the component (A), and a component (B) that is one type of powder or two or more types of powders selected from a powder of an alkali metal fluoroaluminate and a powder of an alkali metal fluorozincate, the content of the component (A) in the flux composition being 50 mass % or more.

(5) The flux composition according to (1), including the component (A), and a component (C) that is one type of metal powder or two or more types of metal powders selected from a powder of an aluminum alloy that includes one type of metal element or two or more types of metal elements among Si, Cu, and Zn, an Al powder, an Si powder, a Cu powder, and a Zn powder, the content of the component (A) in the flux composition being 50 mass % or more.

(6) According to another aspect of the invention, a flux composition includes a component (A) that is a powder of an alkali metal zinc fluoroaluminate represented by the general formula (1), a component (B) that is one type of powder or two or more types of powders selected from a powder of an alkali metal fluoroaluminate and a powder of an alkali metal fluorozincate, and a component (C) that is one type of metal powder or two or more types of metal powders selected from a powder of an aluminum alloy that includes one type of metal element or two or more types of metal elements among Si, Cu, and Zn, an Al powder, an Si powder, a Cu powder, and a Zn powder, the content of the component (A) in the flux composition being 50 mass % or more.

(7) According to another aspect of the invention, a mixture includes the flux composition according to any one of (1) to (6), and an organic resin binder.

Advantageous Effects Of The Invention

The aspects of the invention thus provide a flux composition that prevents occurrence of a brazing defect and discoloration even when an aluminum alloy is brazed in an atmosphere having a high oxygen concentration, or an atmosphere having high humidity.

BRIEF DESCRIPTION OF DRAWINGS

FIG. 1 is a schematic view illustrating a testing material assembly method used for a brazing test.

DESCRIPTION OF EMBODIMENTS

The component (A) used in connection with the embodiments of the invention is a powder of an alkali metal zinc fluoroaluminate represented by the following general formula (1).

$$M_w Zn_x Al_y F_z \quad (1)$$

wherein M is K or Cs, and w, x, y, and z are a positive integer, the greatest common divisor of w, x, y, and z being 1.

When an aluminum alloy member is brazed in a state in which the component (A) is applied to the surface of the aluminum alloy member, the component (A) is decomposed into Zn and an alkali metal fluoroaluminate (e.g., $MAlF_4$, $M_2AlF_5$, or $M_3AlF_6$) (M is K or Cs) at a temperature lower than the brazing temperature. Zn that has been produced by decomposition of the component (A) diffuses into the aluminum alloy member to form a Zn diffusion layer. The Zn diffusion layer ensures that the aluminum alloy member exhibits corrosion resistance that prevents a situation in which leakage of a refrigerant occurs due to pitting corrosion. The alkali metal fluoroaluminate (e.g., $MAlF_4$) that has been produced by decomposition of the component (A) functions as a flux, and removes an oxide film formed on the surface of the aluminum alloy member.

Specific examples of the alkali metal zinc fluoroaluminate represented by the general formula (1) include $KZnAlF_6$, $K_2ZnAlF_7$, $KZn_2AlF_8$, $KZnAl_2F_9$, $CsZnAlF_6$, $Cs_2ZnAlF_7$, $CsZn_2AlF_8$, $CsZnAl_2F_9$, and the like.

The component (A) may be one type of the alkali metal zinc fluoroaluminate represented by the general formula (1), or may be a combination of two or more types of the alkali metal zinc fluoroaluminate represented by the general formula (1).

The component (B) used in connection with the embodiments of the invention is one type of powder or two or more types of powders selected from a powder of an alkali metal fluoroaluminate and a powder of an alkali metal fluorozincate. The component (B) may be either or both of a powder of an alkali metal fluoroaluminate and a powder of an alkali metal fluorozincate.

When an aluminum alloy member is brazed in a state in which a mixture of the component (A) and the component (B) is applied to the surface of the aluminum alloy member, the component (B) functions as a flux, and removes an oxide film formed on the surface of the aluminum alloy member.

Specific examples of the alkali metal fluoroaluminate include $KAlF_4$, $K_2AlF_5$, $K_3AlF_6$, $CsAlF_4$, $Cs_2AlF_5$, $Cs_3AlF_6$, and the like. The component (B) may include only one type of alkali metal fluoroaluminate, or may include two or more types of alkali metal fluoroaluminates.

Specific examples of the alkali metal fluorozincate include $KZnF_3$, $K_2ZnF_4$, $K_3Zn_2F_7$, $CsZnF_3$, $Cs_2ZnF_4$, $CsZn_2F_7$, and the like. The component (B) may include only one type of alkali metal fluorozincate, or may include two or more types of alkali metal fluorozincates.

The component (B) may be one type of powder or two or more types of powders of an alkali metal fluoroaluminate, or may be one type of powder or two or more types of powders of an alkali metal fluorozincate, or may be a combination of one type of powder or two or more types of powders of an alkali metal fluoroaluminate and one type of powder or two or more types of powders of an alkali metal fluorozincate.

The component (C) used in connection with the embodiments of the invention is one type of metal powder or two or more types of metal powders selected from a powder of an aluminum alloy, an Al powder, an Si powder, a Cu powder, and a Zn powder. The component (C) is used to improve the properties of an aluminum alloy member that is joined by flux brazing, and provide a filler metal-producing function, a sacrificial anode layer-forming function, a function of reducing the melting point of the filler metal, and the like. The aluminum alloy used as the component (C) includes one type of metal element or two or more types of metal elements among Si, Cu, and Zn. The content of each metal element included in the aluminum alloy used as the component (C) may be appropriately selected taking account of the properties that are improved or provided by incorporating the component (C) in the flux composition.

The flux composition according to the embodiments of the invention includes the component (A) (i.e., a powder of an alkali metal zinc fluoroaluminate represented by the following general formula (1)), the content of the component (A) in the flux composition being 50 mass % or more.

$$M_w Zn_x Al_y F_z \tag{1}$$

wherein M is K or Cs, and w, x, y, and z are a positive integer, the greatest common divisor of w, x, y, and z being 1.

The content of the component (A) in the flux composition according to the embodiments of the invention is 50 mass % or more, preferably 70 mass % or more, and particularly preferably 80 mass % or more. When the content of the component (A) in the flux composition is within the above range, a Zn diffusion layer is formed in a stable manner, and the properties of the flux that removes an oxide film formed on the surface of an aluminum alloy member are improved, even in an atmosphere having a high oxygen concentration, or an atmosphere having high humidity. Therefore, it is possible to prevent a brazing defect and discoloration. If the content of the component (A) in the flux composition is less than the above range, a brazing defect or discoloration may occur when brazing is performed in an atmosphere having a high oxygen concentration, or an atmosphere having high humidity.

A flux composition according to a first embodiment of the invention (hereinafter may be referred as "flux composition (1)") includes only the component (A) (i.e., a powder of an alkali metal zinc fluoroaluminate represented by the following general formula (1)).

$$M_w Zn_x Al_y F_z \tag{1}$$

wherein M is K or Cs, and w, x, y, and z are a positive integer, the greatest common divisor of w, x, y, and z being 1.

The flux composition (1) according to the first embodiment of the invention includes only the component (A). Note that the expression "includes only the component (A)" means that the flux composition (1) substantially includes only the component (A), and may include unavoidable impurities.

When an aluminum alloy is brazed in a state in which the component (A) is applied to the surface of the aluminum alloy member, a Zn diffusion layer is formed in a stable manner, and excellent flux properties are obtained even in an atmosphere having a high oxygen concentration, or an atmosphere having high humidity, and a brazing defect and discoloration do not occur. Therefore, when an aluminum alloy (member) is brazed using the flux composition (1) according to the first embodiment of the invention as a flux, a Zn diffusion layer is formed in a stable manner, and excellent flux properties are obtained even in an atmosphere having a high oxygen concentration, or an atmosphere having high humidity, and a brazing defect and discoloration do not occur.

The average particle size of the flux composition (1) according to the first embodiment of the invention is preferably 80 μm or less, and particularly preferably 1 to 50 μm. When the average particle size of the flux composition is within the above range, the flux composition exhibits high reactivity with an aluminum alloy, and the effect of suppressing a chemical reaction with oxygen is improved. This ensures that a Zn diffusion layer is formed in a stable manner, and excellent flux properties are obtained even in an atmosphere having a high oxygen concentration, or an atmosphere having high humidity, and a brazing defect and discoloration do not occur.

A flux composition according to a second embodiment of the invention (hereinafter may be referred as "flux composition (2)") includes the component (A) (i.e., a powder of an alkali metal zinc fluoroaluminate represented by the following general formula (1)), and a flux component other than the component (A), the content of the component (A) in the flux composition being 50 mass % or more.

$$M_w Zn_x Al_y F_z \tag{1}$$

wherein M is K or Cs, and w, x, y, and z are a positive integer, the greatest common divisor of w, x, y, and z being 1.

The flux composition (2) according to the second embodiment of the invention includes only the component (A), and the flux component other than the component (A). Note that the expression "includes only the component (A) and the flux component other than the component (A)" means that the flux composition substantially includes only the component (A) and the flux component other than the component (A), and may include unavoidable impurities.

The flux component other than the component (A) that is included in the flux composition (2) according to the second embodiment of the invention is not particularly limited as long as the flux component functions as a flux that removes an oxide film formed on the surface of an aluminum alloy. Examples of the flux component include $K_2SiF_6$ and the like that may be used as the component (B).

The content of the component (A) in the flux composition (2) according to the second embodiment of the invention is 50 mass % or more, preferably 70 mass % or more, and particularly preferably 80 mass % or more. When the content of the component (A) in the flux composition is within the above range, a Zn diffusion layer is formed in a stable manner, and excellent flux properties are obtained even when brazing is performed in an atmosphere having a high oxygen concentration, or an atmosphere having high humidity, and a brazing defect and discoloration do not occur. If the content of the component (A) in the flux composition is less than the above range, a brazing defect or discoloration may occur when brazing is performed in an atmosphere having a high oxygen concentration, or an atmosphere having high humidity.

The average particle size of the flux composition (2) according to the second embodiment of the invention is preferably 80 μm or less, and particularly preferably 1 to 50 μm. When the average particle size of the flux composition is within the above range, the flux composition exhibits high reactivity with an aluminum alloy, and the effect of suppressing a chemical reaction with oxygen is improved. This ensures that a Zn diffusion layer is formed in a stable manner, and excellent flux properties are obtained even in an atmosphere having a high oxygen concentration, or an atmosphere having high humidity, and a brazing defect and discoloration do not occur.

A flux composition according to a third embodiment of the invention (hereinafter may be referred as "flux composition (3)") includes the component (A) (i.e., a powder of an alkali metal zinc fluoroaluminate represented by the following general formula (1)), and the component (B) (i.e., one type of powder or two or more types of powders selected from a powder of an alkali metal fluoroaluminate and a powder of an alkali metal fluorozincate), the content of the component (A) in the flux composition being 50 mass % or more.

$$M_w Zn_x Al_y F_z \qquad (1)$$

wherein M is K or Cs, and w, x, y, and z are a positive integer, the greatest common divisor of w, x, y, and z being 1.

The flux composition (3) according to the third embodiment of the invention includes only the component (A) and the component (B). Note that the expression "includes only the component (A) and the component (B)" means that the flux composition (3) substantially includes only the component (A) and the component (B), and may include unavoidable impurities.

The content of the component (A) in the flux composition (3) according to the third embodiment of the invention is 50 mass % or more, preferably 70 mass % or more, and particularly preferably 80 mass % or more. When the content of the component (A) in the flux composition is within the above range, a Zn diffusion layer is formed in a stable manner, and excellent flux properties are obtained even when brazing is performed in an atmosphere having a high oxygen concentration, or an atmosphere having high humidity, and a brazing defect and discoloration do not occur. If the content of the component (A) in the flux composition is less than the above range, a brazing defect or discoloration may occur when brazing is performed in an atmosphere having a high oxygen concentration, or an atmosphere having high humidity.

The average particle size of the flux composition (3) according to the third embodiment of the invention is preferably 80 μm or less, and particularly preferably 1 to 50 μm. When the average particle size of the flux composition is within the above range, the flux composition exhibits high reactivity with an aluminum alloy, and the effect of suppressing a chemical reaction with oxygen is improved. This ensures that a Zn diffusion layer is formed in a stable manner, and excellent flux properties are obtained even in an atmosphere having a high oxygen concentration, or an atmosphere having high humidity, and a brazing defect and discoloration do not occur.

A flux composition according to a fourth embodiment of the invention (hereinafter may be referred as "flux composition (4)") includes the component (A) (i.e., a powder of an alkali metal zinc fluoroaluminate represented by the following general formula (1)), and the component (C) (i.e., one type of metal powder or two or more types of metal powders selected from a powder of an aluminum alloy that includes one type of metal element or two or more types of metal elements among Si, Cu, and Zn, an Al powder, an Si powder, a Cu powder, and a Zn powder), the content of the component (A) in the flux composition being 50 mass % or more.

$$M_w Zn_x Al_y F_z \qquad (1)$$

wherein M is K or Cs, and w, x, y, and z are a positive integer, the greatest common divisor of w, x, y, and z being 1.

The flux composition (4) according to the fourth embodiment of the invention includes only the component (A) and the component (C). Note that the expression "includes only the component (A) and the component (C)" means that the flux composition (4) substantially includes only the component (A) and the component (C), and may include unavoidable impurities.

The content of the component (A) in the flux composition (4) according to the fourth embodiment of the invention is 50 mass % or more, preferably 70 mass % or more, and particularly preferably 80 mass % or more. When the content of the component (A) in the flux composition is within the above range, a Zn diffusion layer is formed in a stable manner, and excellent flux properties are obtained even when brazing is performed in an atmosphere having a high oxygen concentration, or an atmosphere having high humidity, and a brazing defect and discoloration do not occur. If the content of the component (A) in the flux composition is less than the above range, a brazing defect or discoloration may occur when brazing is performed in an atmosphere having a high oxygen concentration, or an atmosphere having high humidity.

The flux composition (4) according to the fourth embodiment of the invention includes the component (C). When the flux composition includes the component (C), it is possible to improve the properties of an aluminum alloy member that is joined by flux brazing, and provide an aluminum alloy member that is joined by flux brazing with a filler metal-producing function, a sacrificial anode layer-forming function, a function of reducing the melting point of the filler metal, and the like. For example, it is possible to provide or adjust the amount of filler metal required for a fillet that is formed at the brazing target joint by utilizing a powder of an aluminum alloy that includes Si, an Al powder, an Si powder, or a combination thereof. It is possible to adjust the potential difference between the brazing target members, and provide a sacrificial anode by utilizing a powder of an aluminum alloy that includes Cu, a powder of an aluminum alloy that includes Zn, a Zn powder, a Cu powder, or a combination thereof. Since the melting point of the filler metal can be decreased, it is possible to decrease the brazing temperature. It is possible to improve the strength of the brazing target members by utilizing a powder of an aluminum alloy that includes Zn, a Zn powder, or a combination thereof.

The average particle size of the component (A) included in the flux composition (4) according to the fourth embodiment of the invention is preferably 80 μm or less, and particularly preferably 1 to 50 μm. When the average particle size of the component (A) included in the flux composition is within the above range, the component (A) exhibits high reactivity with an aluminum alloy, and the effect of suppressing a chemical reaction with oxygen is improved. This ensures that a Zn diffusion layer is formed in a stable manner, and excellent flux properties are obtained even in an atmosphere having a high oxygen concentration, or an atmosphere having high humidity, and a brazing defect and discoloration do not occur.

Examples of a modification of the flux composition (4) according to the fourth embodiment of the invention include a flux composition (4') (see below). The flux composition (4') includes a component (C') that is one type of metal powder or two or more types of metal powders selected from a powder of an aluminum alloy that includes one type of metal element or two or more types of metal elements among Si, Cu, Zn, Sr, Bi, and Ge, an Al powder, an Si powder, a Cu powder, a Zn powder, an Sr powder, a Bi powder, and a Ge powder, instead of the component (C) included in the flux composition (4) according to the fourth embodiment of the invention. It is possible to improve the fluidity of the filler metal, and improve brazability by utilizing Sr or Bi. It is possible to reduce the temperature of reaction with an aluminum alloy member, and adjust the brazing temperature by utilizing Ge.

A flux composition according to a fifth embodiment of the invention (hereinafter may be referred as "flux composition (5)") includes the component (A) (i.e., a powder of an alkali metal zinc fluoroaluminate represented by the following general formula (1)), the component (B) (i.e., one type of powder or two or more types of powders selected from a powder of an alkali metal fluoroaluminate and a powder of an alkali metal fluorozincate), and the component (C) (i.e., one type of metal powder or two or more types of metal powders selected from a powder of an aluminum alloy that includes one type of metal element or two or more types of metal elements among Si, Cu, and Zn, an Al powder, an Si powder, a Cu powder, and a Zn powder), the content of the component (A) in the flux composition being 50 mass % or more.

$$M_w Zn_x Al_y F_z \quad (1)$$

wherein M is K or Cs, and w, x, y, and z are a positive integer, the greatest common divisor of w, x, y, and z being 1.

The flux composition (5) according to the fifth embodiment of the invention includes only the component (A), the component (B), and the component (C). Note that the expression "includes only the component (A), the component (B), and the component (C)" means that the flux composition (5) substantially includes only the component (A), the component (B), and the component (C), and may include unavoidable impurities.

The content of the component (A) in the flux composition (5) according to the fifth embodiment of the invention is 50 mass % or more, and preferably 70 mass % or more. When the content of the component (A) in the flux composition is within the above range, a Zn diffusion layer is formed in a stable manner, and excellent flux properties are obtained even when brazing is performed in an atmosphere having a high oxygen concentration, or an atmosphere having high humidity, and a brazing defect and discoloration do not occur.

The flux composition (5) according to the fifth embodiment of the invention includes the component (C). When the flux composition includes the component (C), it is possible to improve the properties of an aluminum alloy member that is joined by flux brazing, and provide an aluminum alloy member that is joined by flux brazing with a filler metal-producing function, a sacrificial anode layer-forming function, a function of reducing the melting point of the filler metal, and the like.

The content of the component (B) and the component (C) in the flux composition (5) according to the fifth embodiment of the invention is appropriately selected so that the content of the component (A) falls within the above range.

The average particle size of the component (A) and the component (B) included in the flux composition (5) according to the fifth embodiment of the invention is preferably 80 μm or less, and particularly preferably 1 to 50 μm. When the average particle size of the component (A) and the component (B) included in the flux composition is within the above range, the component (A) and the component (B) exhibit high reactivity with an aluminum alloy, and the effect of suppressing a chemical reaction with oxygen is improved. This ensures that a Zn diffusion layer is formed in a stable manner, and excellent flux properties are obtained even in an atmosphere having a high oxygen concentration, or an atmosphere having high humidity, and a brazing defect and discoloration do not occur.

Examples of a modification of the flux composition (5) according to the fifth embodiment of the invention include a flux composition (5') (see below). The flux composition (5') includes a component (C') that is one type of metal powder or two or more types of metal powders selected from a powder of an aluminum alloy that includes one type of metal element or two or more types of metal elements among Si, Cu, Zn, Sr, Bi, and Ge, an Al powder, an Si powder, a Cu powder, a Zn powder, an Sr powder, a Bi powder, and a Ge powder, instead of the component (C) included in the flux composition (5) according to the fifth embodiment of the invention. It is possible to improve the fluidity of the filler metal, and improve brazability by utilizing Sr or Bi. It is possible to reduce the temperature of reaction with an aluminum alloy member, and adjust the brazing temperature by utilizing Ge.

A method for using the flux compositions according to the embodiments of the invention is described below. The flux composition (or the flux composition and an organic resin binder) is dispersed in water or a volatile solvent to prepare a slurry (i.e., a flux coating material that includes the flux composition). The flux coating material is applied to the surface of an aluminum alloy member, and dried at 100 to 200° C. so that the flux composition is applied to the surface of the aluminum alloy member. The aluminum alloy member to which the flux composition is applied is brazed by heating at 570 to 620° C.

The flux coating material that includes the flux composition is thus used to apply the flux composition to the surface of the aluminum alloy member.

The dispersion medium included in the flux coating material in which the flux composition is dispersed, is a volatile solvent such as an alcohol (e.g., isopropanol), or water. The content of the flux composition in the flux coating material is appropriately selected taking account of the coating method, the application amount, and the like.

The flux coating material that includes the flux composition may include an organic resin binder. The organic resin binder is used to improve the adhesion of the flux composition to the aluminum alloy member when the flux composition is applied to the aluminum alloy member.

The organic resin binder is an organic resin that has a decomposition temperature of 500° C. or less, and does not impair brazability. The organic resin binder is not particularly limited as long as the organic resin binder is normally used as an organic resin binder for flux brazing.

The flux coating material that includes the flux composition may be applied to the surface of the aluminum alloy member using an arbitrary method. For example, the flux coating material is applied to the surface of the aluminum alloy member using a known method such as a spray method, a dipping method, or a roll coating method. It is preferable to use the roll coating method due to high coating stability and high capacity. When using the roll coating method, the material that forms the surface of each roll, and the coating conditions (e.g., forward rotation and reverse rotation of the coater roll and the application roll) are appropriately determined taking account of the desired film thickness, the desired surface roughness, and the like, and the roll transfer conditions are selected taking account of the objective.

The application amount of the flux coating material that includes the flux composition is appropriately selected. The flux component is preferably applied in an amount of 1 to 50 g/m², and particularly preferably 5 to 40 g/m². Note that the term "flux component" refers to the component (A) when using the flux composition (1) according to the first embodiment of the invention, refers to the component (A) and the flux component other than the component (A) when using the flux composition (2) according to the second embodiment of the invention, refers to the component (A) and the component (B) when using the flux composition (3) according to the third embodiment of the invention, refers to the component (A) when using the flux composition (4) according to the fourth embodiment of the invention, and refers to the component (A) and the component (B) when using the flux composition (5) according to the fifth embodiment of the invention.

The flux coating material that includes the flux composition may be prepared by dispersing a mixture of the flux composition and the organic resin binder in a volatile solvent or water.

The flux compositions according to the embodiments of the invention make it possible to ensure that a Zn diffusion layer is formed in a stable manner, and excellent flux properties are obtained even when brazing is performed in an atmosphere having a high oxygen concentration, or an atmosphere having high humidity, and a brazing defect and discoloration do not occur. It is also possible to increase the wetting area, and form a uniform Zn diffusion layer. The flux compositions according to the embodiments of the invention may suitably be used for brazing as a noncorrosive flux, and may be used as a flux that is applied when brazing a condenser of an automotive heat exchanger for which corrosion resistance is mainly improved by a sacrificial corrosion prevention effect due to a Zn diffusion layer.

EXAMPLES

Example 1 and Comparative Example 1

Experimental Flux Composition

An aluminum sheet brazing test was performed using a powder of $M_w Zn_x Al_y F_z$ (content: 100 mass %) as a flux composition. A powder of $KZnAlF_6$, a powder of $K_2ZnAlF_7$, a powder of $KZn_2AlF_8$, a powder of $KZnAl_2F_9$, a powder of $CsZnAlF_6$, a powder of $Cs_2ZnAlF_7$, a powder of $CsZn_2AlF_8$, and a powder of $CsZnAl_2F_9$ (content: 100 mass %) for which the average particle size was adjusted as shown in Table 1, were provided as typical examples of $M_w Zn_x Al_y F_z$.

Table 1 shows the composition and the average particle size of each flux composition used for the brazing test.

Adjustment of Average Particle Size

The average particle size of the powder was adjusted by grinding the powder (metal salt powder) using a ball mill.

Measurement of Average Particle Size

The powder was dispersed in ethanol, and the average particle size thereof was measured using an optical transmission particle size distribution analyzer (laser diffraction/scattering particle size distribution analyzer) ("LA-700" manufactured by Horiba Ltd.). Note that the average particle size refers to the particle size (D50) at 50% in the cumulative volume particle size distribution.

Brazing Test

The flux composition was diluted with an equal amount of purified water, and the dilution was applied to the filler metal side of an aluminum alloy double-layer clad sheet (thickness: 1.0 mm, width: 25 mm, length: 60 mm, filler metal: 4045, thickness of filler metal: 50 µm, core material: A3003, thickness of core material: 950 µm) using a bar coater so that the flux component was applied in an amount of 20 g/m². As illustrated in FIG. 1, the aluminum alloy double-layer clad sheet was placed horizontally so that the side to which the flux composition was applied was situated on the upper side, and an A3003-O aluminum alloy sheet (thickness: 1.0 mm, width: 25 mm, length: 55 mm) was vertically secured on the aluminum alloy double-layer clad sheet (in the shape of the character "T") using a jig. The assembly was introduced into a furnace (nitrogen gas atmosphere, average oxygen concentration: 100 ppm, dew point: −40° C. or less), and brazed at 600° C. for 3 minutes. After cooling the assembly to 500° C. or less in the furnace, the assembly (specimen) was removed from the furnace.

Evaluation of Brazability

The joining ratio and the size of the fillet formed at the joint between the horizontal aluminum alloy double-layer clad sheet and the vertical A3003-O aluminum alloy sheet, and the presence or absence of a surface residue were evaluated. Note that the joining ratio (%) is the ratio of the length L1 of the fillet formed at the joint between the horizontal aluminum alloy double-layer clad sheet and the vertical A3003-O aluminum alloy sheet, to the length L2 of the contact area between the horizontal aluminum alloy double-layer clad sheet and the vertical A3003-O aluminum alloy sheet (joining ratio (%)=(L1/L2)×100). The specimen was embedded in a resin, and a magnified photograph of the cross section of the joint was captured to evaluate the size of the fillet. Specifically, the size of the evaluation target fillet was determined to be "large" when the size of the evaluation target fillet was close to the size of the fillet of specimen Ab1 of Example 1, determined to be "medium" when the size of the evaluation target fillet was close to the size of the fillet of specimen Aa2 of Example 1, and determined to be "small" when the size of the evaluation target fillet was smaller the size of the fillet of specimen Ab2. The presence or absence of a surface residue was determined with the naked eye. When a white residue (unreacted flux) and whitening were observed, or when a discolored residue and discoloring were observed, the specimen was determined to be unacceptable even when the joining ratio was 100%. When a significant residue was not observed, the specimen was determined to be acceptable even when the surface after brazing was dull white. The evaluation results are shown in Table 1.

TABLE 1

| | Specimen | Flux composition | Average particle size (µm) | | Specimen | Joining ratio (%) | Size of fillet | External appearance of surface of aluminum | Residue on surface of aluminum |
|---|---|---|---|---|---|---|---|---|---|
| Example 1 | Ab1 | $KZnAlF_6$ | 20 | Example 1 | Ab1 | 100 | Large | Not discolored | Absent |
| | Ab2 | $KZnAlF_6$ | 70 | | Ab2 | 100 | Medium | Not discolored | Absent |
| | Bb1 | $K_2ZnAlF_7$ | 20 | | Bb1 | 100 | Large | Not discolored | Absent |
| | Bb2 | $K_2ZnAlF_7$ | 70 | | Bb2 | 100 | Medium | Not discolored | Absent |
| | Cb1 | $KZn_2AlF_8$ | 20 | | Cb1 | 100 | Large | Not discolored | Absent |
| | Cb2 | $KZn_2AlF_8$ | 70 | | Cb2 | 100 | Medium | Not discolored | Absent |
| | Db1 | $KZnAl_2F_9$ | 20 | | Db1 | 100 | Large | Not discolored | Absent |
| | Db2 | $KZnAl_2F_9$ | 70 | | Db2 | 100 | Medium | Not discolored | Absent |

TABLE 1-continued

| Specimen | Flux composition | Average particle size (μm) | Specimen | Joining ratio (%) | Size of fillet | External appearance of surface of aluminum | Residue on surface of aluminum |
|---|---|---|---|---|---|---|---|
| Eb1 | $CsZnAlF_6$ | 20 | Eb1 | 100 | Large | Not discolored | Absent |
| Eb2 | $CsZnAlF_6$ | 70 | Eb2 | 100 | Medium | Not discolored | Absent |
| Fb1 | $Cs_2ZnAlF_7$ | 20 | Fb1 | 100 | Large | Not discolored | Absent |
| Fb2 | $Cs_2ZnAlF_7$ | 70 | Fb2 | 100 | Medium | Not discolored | Absent |
| Gb1 | $CsZn_2AlF_8$ | 20 | Gb1 | 100 | Large | Not discolored | Absent |
| Gb2 | $CsZn_2AlF_8$ | 70 | Gb2 | 100 | Medium | Not discolored | Absent |
| Hb1 | $CsZnAl_2F_9$ | 20 | Hb1 | 100 | Large | Not discolored | Absent |
| Hb2 | $CsZnAl_2F_9$ | 70 | Hb2 | 100 | Medium | Not discolored | Absent |

As shown in Table 1, good results were obtained in Example 1.

Example 2 and Comparative Example 2

Flux Composition

A powder of $KZnAlF_6$, a powder of $KZn_2AlF_8$, a powder of $KZnAl_2F_9$, a powder of $CsZnAlF_6$, a powder of $Cs_2ZnAlF_7$, a powder of $CsZn_2AlF_8$, and a powder of $CsZnAl_2F_9$ (content: 100 mass %) (average particle size: 10 μm) (see Table 2) were provided as a flux composition.

A powder of $KZnF_3$ (content: 100 mass %) (average particle size: 10 μm) was provided as a comparative flux composition.

Brazing Test

The brazing test was performed in the same manner as in Example 1 and Comparative Example 1, except that the average oxygen concentration in the furnace was changed as shown in Table 2.

Evaluation of Brazability

The brazability was evaluated in the same manner as in Example 1 and Comparative Example 1. The evaluation results are shown in Table 2.

TABLE 2

|  | Specimen | Flux composition | Average oxygen concentration (ppm) |  | Specimen | Joining ratio (%) | Size of fillet | External appearance of surface of aluminum | Residue on surface of aluminum |
|---|---|---|---|---|---|---|---|---|---|
| Example 2 | Ac1 | $KZnAlF_6$ | 50 | Example 2 | Ac1 | 100 | Large | Not discolored | Absent |
|  | Ac2 | $KZnAlF_6$ | 500 |  | Ac2 | 100 | Medium | Not discolored | Absent |
|  | Ac3 | $KZnAlF_6$ | 1000 |  | Ac3 | 100 | Medium | Dull white | Absent |
|  | Bc1 | $K_2ZnAlF_7$ | 50 |  | Bc1 | 100 | Large | Not discolored | Absent |
|  | Bc2 | $K_2ZnAlF_7$ | 500 |  | Bc2 | 100 | Medium | Not discolored | Absent |
|  | Bc3 | $K_2ZnAlF_7$ | 1000 |  | Bc3 | 100 | Medium | Dull white | Absent |
|  | Cc1 | $KZn_2AlF_8$ | 50 |  | Cc1 | 100 | Large | Not discolored | Absent |
|  | Cc2 | $KZn_2AlF_8$ | 500 |  | Cc2 | 100 | Medium | Not discolored | Absent |
|  | Cc3 | $KZn_2AlF_8$ | 1000 |  | Cc3 | 100 | Medium | Dull white | Absent |
|  | Dc1 | $KZnAl_2F_9$ | 50 |  | Dc1 | 100 | Large | Not discolored | Absent |
|  | Dc2 | $KZnAl_2F_9$ | 500 |  | Dc2 | 100 | Medium | Not discolored | Absent |
|  | Dc3 | $KZnAl_2F_9$ | 1000 |  | Dc3 | 100 | Medium | Dull white | Absent |
|  | Ec1 | $CsZnAlF_6$ | 50 |  | Ec1 | 100 | Large | Not discolored | Absent |
|  | Ec2 | $CsZnAlF_6$ | 500 |  | Ec2 | 100 | Medium | Not discolored | Absent |
|  | Ec3 | $CsZnAlF_6$ | 1000 |  | Ec3 | 100 | Medium | Dull white | Absent |
|  | Fc1 | $Cs_2ZnAlF_7$ | 50 |  | Fc1 | 100 | Large | Not discolored | Absent |
|  | Fc2 | $Cs_2ZnAlF_7$ | 500 |  | Fc2 | 100 | Medium | Not discolored | Absent |
|  | Fc3 | $Cs_2ZnAlF_7$ | 1000 |  | Fc3 | 100 | Medium | Dull white | Absent |
|  | Gc1 | $CsZn_2AlF_8$ | 50 |  | Gc1 | 100 | Large | Not discolored | Absent |
|  | Gc2 | $CsZn_2AlF_8$ | 500 |  | Gc2 | 100 | Medium | Not discolored | Absent |
|  | Gc3 | $CsZn_2AlF_8$ | 1000 |  | Gc3 | 100 | Medium | Dull white | Absent |
|  | Hc1 | $CsZnAl_2F_9$ | 50 |  | Hc1 | 100 | Large | Not discolored | Absent |
|  | Hc2 | $CsZnAl_2F_9$ | 500 |  | Hc2 | 100 | Medium | Not discolored | Absent |
|  | Hc3 | $CsZnAl_2F_9$ | 1000 |  | Hc3 | 100 | Medium | Dull white | Absent |
| Comparative Example 2 | Ic1 | $KZnF_3$ | 50 | Comparative Example 2 | Ic1 | 100 | Large | Not discolored | Absent |
|  | Ic2 | $KZnF_3$ | 500 |  | Ic2 | 60 | Small | Discolored | Present (discolored) |
|  | Ic3 | $KZnF_3$ | 1000 |  | Ic3 | 0 | — | White | Present (white) |

As shown in Table 2, good results were obtained in Example 2 even when the oxygen concentration in the atmosphere during brazing was high. The surface of aluminum of specimens Ac3, Bc3, Dc3, Ec3, Fc3, and Hc3 was dull white to some extent, but the degree of whitening was at an acceptable level.

In Comparative Example 2, no problem occurred when the oxygen concentration in the atmosphere during brazing was low (Ic1). However, when the oxygen concentration in the atmosphere during brazing was high, a discolored residue and discoloring were observed (Ic2), or most of $KZnF_3$ remained unreacted, and a fillet was not formed (Ic3).

Example 3 and Comparative Example 3

Flux Composition

The materials shown in Tables 3-1 to 3-4 were mixed in the mixing ratio shown in Tables 3-1 to 3-4 to prepare a powder mixture (flux composition) (average particle size: 10 μm).

The materials shown in Tables 3-5 to 3-8 were mixed in the mixing ratio shown in Tables 3-5 to 3-8 to prepare a powder mixture (comparative flux composition) (average particle size: 10 μm).

Brazing Test

The brazing test was performed in the same manner as in Example 1 and Comparative Example 1, except that the average oxygen concentration in the furnace was changed to 500 ppm.

Evaluation of Brazability

The brazability was evaluated in the same manner as in Example 1 and Comparative Example 1. The evaluation results are shown in Tables 3-1 to 3-8.

TABLE 3-1

| | Specimen | Flux composition | Mixing ratio (%) | | Specimen | Joining ratio (%) | Size of fillet | External appearance of surface of aluminum | Residue on surface of aluminum |
|---|---|---|---|---|---|---|---|---|---|
| Example 3 | Ad1 | $KZnAlF_6/KAlF_4$ | 90/10 | Example 3 | Ad1 | 100 | Medium | Not discolored | Absent |
| | Ad2 | $KZnAlF_6/KAlF_4$ | 55/45 | | Ad2 | 100 | Medium | Not discolored | Absent |
| | Ad3 | $KZnAlF_6/K_2AlF_4$ | 90/10 | | Ad3 | 100 | Medium | Not discolored | Absent |
| | Ad4 | $KZnAlF_6/K_2AlF_4$ | 55/45 | | Ad4 | 100 | Medium | Not discolored | Absent |
| | Ad5 | $KZnAlF_6/K_3AlF_4$ | 90/10 | | Ad5 | 100 | Medium | Not discolored | Absent |
| | Ad6 | $KZnAlF_6/K_3AlF_4$ | 55/45 | | Ad6 | 100 | Medium | Not discolored | Absent |
| | Ad7 | $KZnAlF_6/CsAlF_4$ | 90/10 | | Ad7 | 100 | Medium | Not discolored | Absent |
| | Ad8 | $KZnAlF_6/CsAlF_4$ | 55/45 | | Ad8 | 100 | Medium | Not discolored | Absent |
| | Ad9 | $KZnAlF_6/Cs_2AlF_5$ | 90/10 | | Ad9 | 100 | Medium | Not discolored | Absent |
| | Ad10 | $KZnAlF_6/Cs_2AlF_5$ | 55/45 | | Ad10 | 100 | Medium | Not discolored | Absent |
| | Ad11 | $KZnAlF_6/Cs_3AlF_6$ | 90/10 | | Ad11 | 100 | Medium | Not discolored | Absent |
| | Ad12 | $KZnAlF_6/Cs_3AlF_6$ | 55/45 | | Ad12 | 100 | Medium | Not discolored | Absent |
| | Ad13 | $KZnAlF_6/KZnF_3$ | 90/10 | | Ad13 | 100 | Medium | Not discolored | Absent |
| | Ad14 | $KZnAlF_6/KZnF_3$ | 55/45 | | Ad14 | 100 | Medium | Not discolored | Absent |
| | Ad15 | $KZnAlF_6/K_2ZnF_4$ | 90/10 | | Ad15 | 100 | Medium | Not discolored | Absent |
| | Ad16 | $KZnAlF_6/K_2ZnF_4$ | 55/45 | | Ad16 | 100 | Medium | Not discolored | Absent |
| | Ad17 | $KZnAlF_6/K_3Zn_2F_7$ | 90/10 | | Ad17 | 100 | Medium | Not discolored | Absent |
| | Ad18 | $KZnAlF_6/K_3Zn_2F_7$ | 55/45 | | Ad18 | 100 | Medium | Not discolored | Absent |
| | Ad19 | $KZnAlF_6/CsZnF_3$ | 90/10 | | Ad19 | 100 | Medium | Not discolored | Absent |
| | Ad20 | $KZnAlF_6/CsZnF_3$ | 55/45 | | Ad20 | 100 | Medium | Not discolored | Absent |
| | Ad21 | $KZnAlF_6/Cs_2ZnF_4$ | 90/10 | | Ad21 | 100 | Medium | Not discolored | Absent |
| | Ad22 | $KZnAlF_6/Cs_2ZnF_4$ | 55/45 | | Ad22 | 100 | Medium | Not discolored | Absent |
| | Ad23 | $KZnAlF_6/Cs_3Zn_2F_7$ | 90/10 | | Ad23 | 100 | Medium | Not discolored | Absent |
| | Ad24 | $KZnAlF_6/Cs_3Zn_2F_7$ | 55/45 | | Ad24 | 100 | Medium | Not discolored | Absent |
| | Bd1 | $K_2ZnAlF_7/KAlF_4$ | 90/10 | | Bd1 | 100 | Medium | Not discolored | Absent |
| | Bd2 | $K_2ZnAlF_7/KAlF_4$ | 55/45 | | Bd2 | 100 | Medium | Not discolored | Absent |
| | Bd3 | $K_2ZnAlF_7/K_2AlF_5$ | 90/10 | | Bd3 | 100 | Medium | Not discolored | Absent |
| | Bd4 | $K_2ZnAlF_7/K_2AlF_5$ | 55/45 | | Bd4 | 100 | Medium | Not discolored | Absent |
| | Bd5 | $K_2ZnAlF_7/K_3AlF_6$ | 90/10 | | Bd5 | 100 | Medium | Not discolored | Absent |
| | Bd6 | $K_2ZnAlF_7/K_3AlF_6$ | 55/45 | | Bd6 | 100 | Medium | Not discolored | Absent |
| | Bd7 | $K_2ZnAlF_7/CsAlF_4$ | 90/10 | | Bd7 | 100 | Medium | Not discolored | Absent |
| | Bd8 | $K_2ZnAlF_7/CsAlF_4$ | 55/45 | | Bd8 | 100 | Medium | Not discolored | Absent |
| | Bd9 | $K_2ZnAlF_7/Cs_2AlF_5$ | 90/10 | | Bd9 | 100 | Medium | Not discolored | Absent |
| | Bd10 | $K_2ZnAlF_7/Cs_2AlF_5$ | 55/45 | | Bd10 | 100 | Medium | Not discolored | Absent |
| | Bd11 | $K_2ZnAlF_7/Cs_3AlF_6$ | 90/10 | | Bd11 | 100 | Medium | Not discolored | Absent |
| | Bd12 | $K_2ZnAlF_7/Cs_3AlF_6$ | 55/45 | | Bd12 | 100 | Medium | Not discolored | Absent |
| | Bd13 | $K_2ZnAlF_7/KZnF_3$ | 90/10 | | Bd13 | 100 | Medium | Not discolored | Absent |
| | Bd14 | $K_2ZnAlF_7/KZnF_3$ | 55/45 | | Bd14 | 100 | Medium | Not discolored | Absent |
| | Bd15 | $K_2ZnAlF_7/K_2ZnF_4$ | 90/10 | | Bd15 | 100 | Medium | Not discolored | Absent |
| | Bd16 | $K_2ZnAlF_7/K_2ZnF_4$ | 55/45 | | Bd16 | 100 | Medium | Not discolored | Absent |
| | Bd17 | $K_2ZnAlF_7/K_3Zn_2F_7$ | 90/10 | | Bd17 | 100 | Medium | Not discolored | Absent |
| | Bd18 | $K_2ZnAlF_7/K_3Zn_2F_7$ | 55/45 | | Bd18 | 100 | Medium | Not discolored | Absent |
| | Bd19 | $K_2ZnAlF_7/CsZnF_3$ | 90/10 | | Bd19 | 100 | Medium | Not discolored | Absent |
| | Bd20 | $K_2ZnAlF_7/CsZnF_3$ | 55/45 | | Bd20 | 100 | Medium | Not discolored | Absent |
| | Bd21 | $K_2ZnAlF_7/Cs_2ZnF_4$ | 90/10 | | Bd21 | 100 | Medium | Not discolored | Absent |
| | Bd22 | $K_2ZnAlF_7/Cs_2ZnF_4$ | 55/45 | | Bd22 | 100 | Medium | Not discolored | Absent |
| | Bd23 | $K_2ZnAlF_7/Cs_3Zn_2F_7$ | 90/10 | | Bd23 | 100 | Medium | Not discolored | Absent |
| | Bd24 | $K_2ZnAlF_7/Cs_3Zn_2F_7$ | 55/45 | | Bd24 | 100 | Medium | Not discolored | Absent |

TABLE 3-2

| | Specimen | Flux composition | Mixing ratio (%) | | Specimen | Joining ratio (%) | Size of fillet | External appearance of surface of aluminum | Residue on surface of aluminum |
|---|---|---|---|---|---|---|---|---|---|
| Example 3 | Cd1 | $KZn_2AlF_8/KAlF_4$ | 90/10 | Example 3 | Cd1 | 100 | Medium | Not discolored | Absent |
| | Cd2 | $KZn_2AlF_8/KAlF_4$ | 55/45 | | Cd2 | 100 | Medium | Not discolored | Absent |
| | Cd3 | $KZn_2AlF_8/K_2AlF_5$ | 90/10 | | Cd3 | 100 | Medium | Not discolored | Absent |
| | Cd4 | $KZn_2AlF_8/K_2AlF_5$ | 55/45 | | Cd4 | 100 | Medium | Not discolored | Absent |
| | Cd5 | $KZn_2AlF_8/K_3AlF_6$ | 90/10 | | Cd5 | 100 | Medium | Not discolored | Absent |
| | Cd6 | $KZn_2AlF_8/K_3AlF_6$ | 55/45 | | Cd6 | 100 | Medium | Not discolored | Absent |
| | Cd7 | $KZn_2AlF_8/CsAlF_4$ | 90/10 | | Cd7 | 100 | Medium | Not discolored | Absent |
| | Cd8 | $KZn_2AlF_8/CsAlF_4$ | 55/45 | | Cd8 | 100 | Medium | Not discolored | Absent |
| | Cd9 | $KZn_2AlF_8/Cs_2AlF_5$ | 90/10 | | Cd9 | 100 | Medium | Not discolored | Absent |
| | Cd10 | $KZn_2AlF_8/Cs_2AlF_5$ | 55/45 | | Cd10 | 100 | Medium | Not discolored | Absent |
| | Cd11 | $KZn_2AlF_8/Cs_3AlF_6$ | 90/10 | | Cd11 | 100 | Medium | Not discolored | Absent |
| | Cd12 | $KZn_2AlF_8/Cs_3AlF_6$ | 55/45 | | Cd12 | 100 | Medium | Not discolored | Absent |
| | Cd13 | $KZn_2AlF_8/KZnF_3$ | 90/10 | | Cd13 | 100 | Medium | Not discolored | Absent |
| | Cd14 | $KZn_2AlF_8/KZnF_3$ | 55/45 | | Cd14 | 100 | Medium | Not discolored | Absent |
| | Cd15 | $KZn_2AlF_8/K_2ZnF_4$ | 90/10 | | Cd15 | 100 | Medium | Not discolored | Absent |
| | Cd16 | $KZn_2AlF_8/K_2ZnF_4$ | 55/45 | | Cd16 | 100 | Medium | Not discolored | Absent |
| | Cd17 | $KZn_2AlF_8/K_3Zn_2F_7$ | 90/10 | | Cd17 | 100 | Medium | Not discolored | Absent |
| | Cd18 | $KZn_2AlF_8/K_3Zn_2F_7$ | 55/45 | | Cd18 | 100 | Medium | Not discolored | Absent |
| | Cd19 | $KZn_2AlF_8/CsZnF_3$ | 90/10 | | Cd19 | 100 | Medium | Not discolored | Absent |
| | Cd20 | $KZn_2AlF_8/CsZnF_3$ | 55/45 | | Cd20 | 100 | Medium | Not discolored | Absent |
| | Cd21 | $KZn_2AlF_8/Cs_2ZnF_4$ | 90/10 | | Cd21 | 100 | Medium | Not discolored | Absent |
| | Cd22 | $KZn_2AlF_8/Cs_2ZnF_4$ | 55/45 | | Cd22 | 100 | Medium | Not discolored | Absent |
| | Cd23 | $KZn_2AlF_8/Cs_3Zn_2F_7$ | 90/10 | | Cd23 | 100 | Medium | Not discolored | Absent |
| | Cd24 | $KZn_2AlF_8/Cs_3Zn_2F_7$ | 55/45 | | Cd24 | 100 | Medium | Not discolored | Absent |
| | Dd1 | $KZnAl_2F_9/KAlF_4$ | 90/10 | | Dd1 | 100 | Medium | Not discolored | Absent |
| | Dd2 | $KZnAl_2F_9/KAlF_4$ | 55/45 | | Dd2 | 100 | Medium | Not discolored | Absent |
| | Dd3 | $KZnAl_2F_9/K_2AlF_5$ | 90/10 | | Dd3 | 100 | Medium | Not discolored | Absent |
| | Dd4 | $KZnAl_2F_9/K_2AlF_5$ | 55/45 | | Dd4 | 100 | Medium | Not discolored | Absent |
| | Dd5 | $KZnAl_2F_9/K_3AlF_6$ | 90/10 | | Dd5 | 100 | Medium | Not discolored | Absent |
| | Dd6 | $KZnAl_2F_9/K_3AlF_6$ | 55/45 | | Dd6 | 100 | Medium | Not discolored | Absent |
| | Dd7 | $KZnAl_2F_9/CsAlF_4$ | 90/10 | | Dd7 | 100 | Medium | Not discolored | Absent |
| | Dd8 | $KZnAl_2F_9/CsAlF_4$ | 55/45 | | Dd8 | 100 | Medium | Not discolored | Absent |
| | Dd9 | $KZnAl_2F_9/Cs_2AlF_5$ | 90/10 | | Dd9 | 100 | Medium | Not discolored | Absent |
| | Dd10 | $KZnAl_2F_9/Cs_2AlF_5$ | 55/45 | | Dd10 | 100 | Medium | Not discolored | Absent |
| | Dd11 | $KZnAl_2F_9/Cs_3AlF_6$ | 90/10 | | Dd11 | 100 | Medium | Not discolored | Absent |
| | Dd12 | $KZnAl_2F_9/Cs_3AlF_6$ | 55/45 | | Dd12 | 100 | Medium | Not discolored | Absent |
| | Dd13 | $KZnAl_2F_9/KZnF_3$ | 90/10 | | Dd13 | 100 | Medium | Not discolored | Absent |
| | Dd14 | $KZnAl_2F_9/KZnF_3$ | 55/45 | | Dd14 | 100 | Medium | Not discolored | Absent |
| | Dd15 | $KZnAl_2F_9/K_2ZnF_4$ | 90/10 | | Dd15 | 100 | Medium | Not discolored | Absent |
| | Dd16 | $KZnAl_2F_9/K_2ZnF_4$ | 55/45 | | Dd16 | 100 | Medium | Not discolored | Absent |
| | Dd17 | $KZnAl_2F_9/K_3Zn_2F_7$ | 90/10 | | Dd17 | 100 | Medium | Not discolored | Absent |
| | Dd18 | $KZnAl_2F_9/K_3Zn_2F_7$ | 55/45 | | Dd18 | 100 | Medium | Not discolored | Absent |
| | Dd19 | $KZnAl_2F_9/CsZnF_3$ | 90/10 | | Dd19 | 100 | Medium | Not discolored | Absent |
| | Dd20 | $KZnAl_2F_9/CsZnF_3$ | 55/45 | | Dd20 | 100 | Medium | Not discolored | Absent |
| | Dd21 | $KZnAl_2F_9/Cs_2ZnF_4$ | 90/10 | | Dd21 | 100 | Medium | Not discolored | Absent |
| | Dd22 | $KZnAl_2F_9/Cs_2ZnF_4$ | 55/45 | | Dd22 | 100 | Medium | Not discolored | Absent |
| | Dd23 | $KZnAl_2F_9/Cs_3Zn_2F_7$ | 90/10 | | Dd23 | 100 | Medium | Not discolored | Absent |
| | Dd24 | $KZnAl_2F_9/Cs_3Zn_2F_7$ | 55/45 | | Dd24 | 100 | Medium | Not discolored | Absent |

TABLE 3-3

| | Specimen | Flux composition | Mixing ratio (%) | | Specimen | Joining ratio (%) | Size of fillet | External appearance of surface of aluminum | Residue on surface of aluminum |
|---|---|---|---|---|---|---|---|---|---|
| Example 3 | Ed1 | $CsZnAlF_6/KAlF_4$ | 90/10 | Example 3 | Ed1 | 100 | Medium | Not discolored | Absent |
| | Ed2 | $CsZnAlF_6/KAlF_4$ | 55/45 | | Ed2 | 100 | Medium | Not discolored | Absent |
| | Ed3 | $CsZnAlF_6/K_2AlF_5$ | 90/10 | | Ed3 | 100 | Medium | Not discolored | Absent |
| | Ed4 | $CsZnAlF_6/K_2AlF_5$ | 55/45 | | Ed4 | 100 | Medium | Not discolored | Absent |
| | Ed5 | $CsZnAlF_6/K_3AlF_6$ | 90/10 | | Ed5 | 100 | Medium | Not discolored | Absent |
| | Ed6 | $CsZnAlF_6/K_3AlF_6$ | 55/45 | | Ed6 | 100 | Medium | Not discolored | Absent |
| | Ed7 | $CsZnAlF_6/CsAlF_4$ | 90/10 | | Ed7 | 100 | Medium | Not discolored | Absent |
| | Ed8 | $CsZnAlF_6/CsAlF_4$ | 55/45 | | Ed8 | 100 | Medium | Not discolored | Absent |
| | Ed9 | $CsZnAlF_6/Cs_2AlF_5$ | 90/10 | | Ed9 | 100 | Medium | Not discolored | Absent |
| | Ed10 | $CsZnAlF_6/Cs_2AlF_5$ | 55/45 | | Ed10 | 100 | Medium | Not discolored | Absent |
| | Ed11 | $CsZnAlF_6/Cs_3AlF_6$ | 90/10 | | Ed11 | 100 | Medium | Not discolored | Absent |
| | Ed12 | $CsZnAlF_6/Cs_3AlF_6$ | 55/45 | | Ed12 | 100 | Medium | Not discolored | Absent |
| | Ed13 | $CsZnAlF_6/KZnF_3$ | 90/10 | | Ed13 | 100 | Medium | Not discolored | Absent |
| | Ed14 | $CsZnAlF_6/KZnF_3$ | 55/45 | | Ed14 | 100 | Medium | Not discolored | Absent |
| | Ed15 | $CsZnAlF_6/K_2ZnF_4$ | 90/10 | | Ed15 | 100 | Medium | Not discolored | Absent |
| | Ed16 | $CsZnAlF_6/K_2ZnF_4$ | 55/45 | | Ed16 | 100 | Medium | Not discolored | Absent |

TABLE 3-3-continued

| Specimen | Flux composition | Mixing ratio (%) | Specimen | Joining ratio (%) | Size of fillet | External appearance of surface of aluminum | Residue on surface of aluminum |
|---|---|---|---|---|---|---|---|
| Ed17 | $CsZnAlF_6/K_3Zn_2F_7$ | 90/10 | Ed17 | 100 | Medium | Not discolored | Absent |
| Ed18 | $CsZnAlF_6/K_3Zn_2F_7$ | 55/45 | Ed18 | 100 | Medium | Not discolored | Absent |
| Ed19 | $CsZnAlF_6/CsZnF_3$ | 90/10 | Ed19 | 100 | Medium | Not discolored | Absent |
| Ed20 | $CsZnAlF_6/CsZnF_3$ | 55/45 | Ed20 | 100 | Medium | Not discolored | Absent |
| Ed21 | $CsZnAlF_6/Cs_2ZnF_4$ | 90/10 | Ed21 | 100 | Medium | Not discolored | Absent |
| Ed22 | $CsZnAlF_6/Cs_2ZnF_4$ | 55/45 | Ed22 | 100 | Medium | Not discolored | Absent |
| Ed23 | $CsZnAlF_6/Cs_3Zn_2F_7$ | 90/10 | Ed23 | 100 | Medium | Not discolored | Absent |
| Ed24 | $CsZnAlF_6/Cs_3Zn_2F_7$ | 55/45 | Ed24 | 100 | Medium | Not discolored | Absent |
| Fd1 | $Cs_2ZnAlF_7/KAlF_4$ | 90/10 | Fd1 | 100 | Medium | Not discolored | Absent |
| Fd2 | $Cs_2ZnAlF_7/KAlF_4$ | 55/45 | Fd2 | 100 | Medium | Not discolored | Absent |
| Fd3 | $Cs_2ZnAlF_7/K_2AlF_5$ | 90/10 | Fd3 | 100 | Medium | Not discolored | Absent |
| Fd4 | $Cs_2ZnAlF_7/K_2AlF_5$ | 55/45 | Fd4 | 100 | Medium | Not discolored | Absent |
| Fd5 | $Cs_2ZnAlF_7/K_3AlF_6$ | 90/10 | Fd5 | 100 | Medium | Not discolored | Absent |
| Fd6 | $Cs_2ZnAlF_7/K_3AlF_6$ | 55/45 | Fd6 | 100 | Medium | Not discolored | Absent |
| Fd7 | $Cs_2ZnAlF_7/CsAlF_4$ | 90/10 | Fd7 | 100 | Medium | Not discolored | Absent |
| Fd8 | $Cs_2ZnAlF_7/CsAlF_4$ | 55/45 | Fd8 | 100 | Medium | Not discolored | Absent |
| Fd9 | $Cs_2ZnAlF_7/Cs_2AlF_5$ | 90/10 | Fd9 | 100 | Medium | Not discolored | Absent |
| Fd10 | $Cs_2ZnAlF_7/Cs_2AlF_5$ | 55/45 | Fd10 | 100 | Medium | Not discolored | Absent |
| Fd11 | $Cs_2ZnAlF_7/Cs_3AlF_6$ | 90/10 | Fd11 | 100 | Medium | Not discolored | Absent |
| Fd12 | $Cs_2ZnAlF_7/Cs_3AlF_6$ | 55/45 | Fd12 | 100 | Medium | Not discolored | Absent |
| Fd13 | $Cs_2ZnAlF_7/KZnF_3$ | 90/10 | Fd13 | 100 | Medium | Not discolored | Absent |
| Fd14 | $Cs_2ZnAlF_7/KZnF_3$ | 55/45 | Fd14 | 100 | Medium | Not discolored | Absent |
| Fd15 | $Cs_2ZnAlF_7/K_2ZnF_4$ | 90/10 | Fd15 | 100 | Medium | Not discolored | Absent |
| Fd16 | $Cs_2ZnAlF_7/K_2ZnF_4$ | 55/45 | Fd16 | 100 | Medium | Not discolored | Absent |
| Fd17 | $Cs_2ZnAlF_7/K_3Zn_2F_7$ | 90/10 | Fd17 | 100 | Medium | Not discolored | Absent |
| Fd18 | $Cs_2ZnAlF_7/K_3Zn_2F_7$ | 55/45 | Fd18 | 100 | Medium | Not discolored | Absent |
| Fd19 | $Cs_2ZnAlF_7/CsZnF_3$ | 90/10 | Fd19 | 100 | Medium | Not discolored | Absent |
| Fd20 | $Cs_2ZnAlF_7/CsZnF_3$ | 55/45 | Fd20 | 100 | Medium | Not discolored | Absent |
| Fd21 | $Cs_2ZnAlF_7/Cs_2ZnF_4$ | 90/10 | Fd21 | 100 | Medium | Not discolored | Absent |
| Fd22 | $Cs_2ZnAlF_7/Cs_2ZnF_4$ | 55/45 | Fd22 | 100 | Medium | Not discolored | Absent |
| Fd23 | $Cs_2ZnAlF_7/Cs_3Zn_2F_7$ | 90/10 | Fd23 | 100 | Medium | Not discolored | Absent |
| Fd24 | $Cs_2ZnAlF_7/Cs_3Zn_2F_7$ | 55/45 | Fd24 | 100 | Medium | Not discolored | Absent |

TABLE 3-4

| | Specimen | Flux composition | Mixing ratio (%) | | Specimen | Joining ratio (%) | Size of fillet | External appearance of surface of aluminum | Residue on surface of aluminum |
|---|---|---|---|---|---|---|---|---|---|
| Example 3 | Gd1 | $Cs_2ZnAlF_8/KAlF_4$ | 90/10 | Example 3 | Gd1 | 100 | Medium | Not discolored | Absent |
| | Gd2 | $Cs_2ZnAlF_8/KAlF_4$ | 55/45 | | Gd2 | 100 | Medium | Not discolored | Absent |
| | Gd3 | $Cs_2ZnAlF_8/K_2AlF_5$ | 90/10 | | Gd3 | 100 | Medium | Not discolored | Absent |
| | Gd4 | $Cs_2ZnAlF_8/K_2AlF_5$ | 55/45 | | Gd4 | 100 | Medium | Not discolored | Absent |
| | Gd5 | $Cs_2ZnAlF_8/K_3AlF_6$ | 90/10 | | Gd5 | 100 | Medium | Not discolored | Absent |
| | Gd6 | $Cs_2ZnAlF_8/K_3AlF_6$ | 55/45 | | Gd6 | 100 | Medium | Not discolored | Absent |
| | Gd7 | $Cs_2ZnAlF_8/CsAlF_4$ | 90/10 | | Gd7 | 100 | Medium | Not discolored | Absent |
| | Gd8 | $Cs_2ZnAlF_8/CsAlF_4$ | 55/45 | | Gd8 | 100 | Medium | Not discolored | Absent |
| | Gd9 | $Cs_2ZnAlF_8/Cs_2AlF_5$ | 90/10 | | Gd9 | 100 | Medium | Not discolored | Absent |
| | Gd10 | $Cs_2ZnAlF_8/Cs_2AlF_5$ | 55/45 | | Gd10 | 100 | Medium | Not discolored | Absent |
| | Gd11 | $Cs_2ZnAlF_8/Cs_3AlF_6$ | 90/10 | | Gd11 | 100 | Medium | Not discolored | Absent |
| | Gd12 | $Cs_2ZnAlF_8/Cs_3AlF_6$ | 55/45 | | Gd12 | 100 | Medium | Not discolored | Absent |
| | Gd13 | $Cs_2ZnAlF_8/KZnF_3$ | 90/10 | | Gd13 | 100 | Medium | Not discolored | Absent |
| | Gd14 | $Cs_2ZnAlF_8/KZnF_3$ | 55/45 | | Gd14 | 100 | Medium | Not discolored | Absent |
| | Gd15 | $Cs_2ZnAlF_8/K_2ZnF_4$ | 90/10 | | Gd15 | 100 | Medium | Not discolored | Absent |
| | Gd16 | $Cs_2ZnAlF_8/K_2ZnF_4$ | 55/45 | | Gd16 | 100 | Medium | Not discolored | Absent |
| | Gd17 | $Cs_2ZnAlF_8/K_3Zn_2F_7$ | 90/10 | | Gd17 | 100 | Medium | Not discolored | Absent |
| | Gd18 | $Cs_2ZnAlF_8/K_3Zn_2F_7$ | 55/45 | | Gd18 | 100 | Medium | Not discolored | Absent |
| | Gd19 | $Cs_2ZnAlF_8/CsZnF_3$ | 90/10 | | Gd19 | 100 | Medium | Not discolored | Absent |
| | Gd20 | $Cs_2ZnAlF_8/CsZnF_3$ | 55/45 | | Gd20 | 100 | Medium | Not discolored | Absent |
| | Gd21 | $Cs_2ZnAlF_8/Cs_2ZnF_4$ | 90/10 | | Gd21 | 100 | Medium | Not discolored | Absent |
| | Gd22 | $Cs_2ZnAlF_8/Cs_2ZnF_4$ | 55/45 | | Gd22 | 100 | Medium | Not discolored | Absent |
| | Gd23 | $Cs_2ZnAlF_8/Cs_3Zn_2F_7$ | 90/10 | | Gd23 | 100 | Medium | Not discolored | Absent |
| | Gd24 | $Cs_2ZnAlF_8/Cs_3Zn_2F_7$ | 55/45 | | Gd24 | 100 | Medium | Not discolored | Absent |
| | Hd1 | $CsZnAl_2F_9/KAlF_4$ | 90/10 | | Hd1 | 100 | Medium | Not discolored | Absent |
| | Hd2 | $CsZnAl_2F_9/KAlF_4$ | 55/45 | | Hd2 | 100 | Medium | Not discolored | Absent |
| | Hd3 | $CsZnAl_2F_9/K_2AlF_5$ | 90/10 | | Hd3 | 100 | Medium | Not discolored | Absent |
| | Hd4 | $CsZnAl_2F_9/K_2AlF_5$ | 55/45 | | Hd4 | 100 | Medium | Not discolored | Absent |
| | Hd5 | $CsZnAl_2F_9/K_3AlF_6$ | 90/10 | | Hd5 | 100 | Medium | Not discolored | Absent |
| | Hd6 | $CsZnAl_2F_9/K_3AlF_6$ | 55/45 | | Hd6 | 100 | Medium | Not discolored | Absent |
| | Hd7 | $CsZnAl_2F_9/CsAlF_4$ | 90/10 | | Hd7 | 100 | Medium | Not discolored | Absent |
| | Hd8 | $CsZnAl_2F_9/CsAlF_4$ | 55/45 | | Hd8 | 100 | Medium | Not discolored | Absent |

TABLE 3-4-continued

| Specimen | Flux composition | Mixing ratio (%) | Specimen | Joining ratio (%) | Size of fillet | External appearance of surface of aluminum | Residue on surface of aluminum |
|---|---|---|---|---|---|---|---|
| Hd9  | CsZnAl$_2$F$_9$/Cs$_2$AlF$_5$   | 90/10 | Hd9  | 100 | Medium | Not discolored | Absent |
| Hd10 | CsZnAl$_2$F$_9$/Cs$_2$AlF$_5$   | 55/45 | Hd10 | 100 | Medium | Not discolored | Absent |
| Hd11 | CsZnAl$_2$F$_9$/Cs$_3$AlF$_6$   | 90/10 | Hd11 | 100 | Medium | Not discolored | Absent |
| Hd12 | CsZnAl$_2$F$_9$/Cs$_3$AlF$_6$   | 55/45 | Hd12 | 100 | Medium | Not discolored | Absent |
| Hd13 | CsZnAl$_2$F$_9$/KZnF$_3$        | 90/10 | Hd13 | 100 | Medium | Not discolored | Absent |
| Hd14 | CsZnAl$_2$F$_9$/KZnF$_3$        | 55/45 | Hd14 | 100 | Medium | Not discolored | Absent |
| Hd15 | CsZnAl$_2$F$_9$/K$_2$ZnF$_4$    | 90/10 | Hd15 | 100 | Medium | Not discolored | Absent |
| Hd16 | CsZnAl$_2$F$_9$/K$_2$ZnF$_4$    | 55/45 | Hd16 | 100 | Medium | Not discolored | Absent |
| Hd17 | CsZnAl$_2$F$_9$/K$_3$Zn$_2$F$_7$| 90/10 | Hd17 | 100 | Medium | Not discolored | Absent |
| Hd18 | CsZnAl$_2$F$_9$/K$_3$Zn$_2$F$_7$| 55/45 | Hd18 | 100 | Medium | Not discolored | Absent |
| Hd19 | CsZnAl$_2$F$_9$/CsZnF$_3$       | 90/10 | Hd19 | 100 | Medium | Not discolored | Absent |
| Hd20 | CsZnAl$_2$F$_9$/CsZnF$_3$       | 55/45 | Hd20 | 100 | Medium | Not discolored | Absent |
| Hd21 | CsZnAl$_2$F$_9$/Cs$_2$ZnF$_4$   | 90/10 | Hd21 | 100 | Medium | Not discolored | Absent |
| Hd22 | CsZnAl$_2$F$_9$/Cs$_2$ZnF$_4$   | 55/45 | Hd22 | 100 | Medium | Not discolored | Absent |
| Hd23 | CsZnAl$_2$F$_9$/Cs$_3$Zn$_2$F$_7$| 90/10 | Hd23 | 100 | Medium | Not discolored | Absent |
| Hd24 | CsZnAl$_2$F$_9$/Cs$_3$Zn$_2$F$_7$| 55/45 | Hd24 | 100 | Medium | Not discolored | Absent |

TABLE 3-5

| | Specimen | Flux composition | Mixing ratio (%) | | Specimen | Joining ratio (%) | Size of fillet | External appearance of surface of aluminum | Residue on surface of aluminum |
|---|---|---|---|---|---|---|---|---|---|
| Comparative Example 3 | Ad25 | KZnAlF$_6$/KAlF$_4$ | 10/90 | Comparative Example 3 | Ad25 | 90 | Small | White | Present (white) |
| | Ad26 | KZnAlF$_6$/K$_2$AlF$_5$ | 10/90 | | Ad26 | 90 | Small | White | Present (white) |
| | Ad27 | KZnAlF$_6$/K$_3$AlF$_6$ | 10/90 | | Ad27 | 90 | Small | White | Present (white) |
| | Ad28 | KZnAlF$_6$/CsAlF$_4$ | 10/90 | | Ad28 | 90 | Small | White | Present (white) |
| | Ad29 | KZnAlF$_6$/Cs$_2$AlF$_5$ | 10/90 | | Ad29 | 90 | Small | White | Present (white) |
| | Ad30 | KZnAlF$_6$/Cs$_3$AlF$_6$ | 10/90 | | Ad30 | 90 | Small | White | Present (white) |
| | Ad31 | KZnAlF$_6$/KZnF$_3$ | 10/90 | | Ad31 | 70 | Small | Discolored | Present (white) |
| | Ad32 | KZnAlF$_6$/K$_2$ZnF$_4$ | 10/90 | | Ad32 | 70 | Small | Discolored | Present (discolored) |
| | Ad33 | KZnAlF$_6$/K$_3$Zn$_2$F$_7$ | 10/90 | | Ad33 | 70 | Small | Discolored | Present (discolored) |
| | Ad34 | KZnAlF$_6$/CsZnF$_3$ | 10/90 | | Ad34 | 70 | Small | Discolored | Present (discolored) |
| | Ad35 | KZnAlF$_6$/Cs$_2$ZnF$_4$ | 10/90 | | Ad35 | 70 | Small | Discolored | Present (discolored) |
| | Ad36 | KZnAlF$_6$/Cs$_3$Zn$_2$F$_7$ | 10/90 | | Ad36 | 70 | Small | Discolored | Present (discolored) |
| | Bd25 | K$_2$ZnAlF$_7$/KAlF$_4$ | 10/90 | | Bd25 | 90 | Small | White | Present (white) |
| | Bd26 | K$_2$ZnAlF$_7$/K$_2$AlF$_5$ | 10/90 | | Bd26 | 90 | Small | White | Present (white) |
| | Bd27 | K$_2$ZnAlF$_7$/K$_3$AlF$_6$ | 10/90 | | Bd27 | 90 | Small | White | Present (white) |
| | Bd28 | K$_2$ZnAlF$_7$/CsAlF$_4$ | 10/90 | | Bd28 | 90 | Small | White | Present (white) |
| | Bd29 | K$_2$ZnAlF$_7$/Cs$_2$AlF$_5$ | 10/90 | | Bd29 | 90 | Small | White | Present (white) |
| | Bd30 | K$_2$ZnAlF$_7$/Cs$_3$AlF$_6$ | 10/90 | | Bd30 | 90 | Small | White | Present (white) |
| | Bd31 | K$_2$ZnAlF$_7$/KZnF$_3$ | 10/90 | | Bd31 | 90 | Small | Discolored | Present (discolored) |
| | Bd32 | K$_2$ZnAlF$_7$/K$_2$ZnF$_4$ | 10/90 | | Bd32 | 70 | Small | Discolored | Present (discolored) |
| | Bd33 | K$_2$ZnAlF$_7$/K$_3$Zn$_2$F$_7$ | 10/90 | | Bd33 | 70 | Small | Discolored | Present (discolored) |
| | Bd34 | K$_2$ZnAlF$_7$/CsZnF$_3$ | 10/90 | | Bd34 | 70 | Small | Discolored | Present (discolored) |
| | Bd35 | K$_2$ZnAlF$_7$/Cs$_2$ZnF$_4$ | 10/90 | | Bd35 | 70 | Small | Discolored | Present (discolored) |
| | Bd36 | K$_2$ZnAlF$_7$/Cs$_3$Zn$_2$F$_7$ | 10/90 | | Bd36 | 70 | Small | Discolored | Present (discolored) |
| | Cd25 | KZn$_2$AlF$_8$/KAlF$_4$ | 10/90 | | Cd25 | 90 | Small | White | Present (white) |
| | Cd26 | KZn$_2$AlF$_8$/K$_2$AlF$_5$ | 10/90 | | Cd26 | 90 | Small | White | Present (white) |
| | Cd27 | KZn$_2$AlF$_8$/K$_3$AlF$_6$ | 10/90 | | Cd27 | 90 | Small | White | Present (white) |
| | Cd28 | KZn$_2$AlF$_8$/CsAlF$_4$ | 10/90 | | Cd28 | 90 | Small | White | Present (white) |
| | Cd29 | KZn$_2$AlF$_8$/Cs$_2$AlF$_5$ | 10/90 | | Cd29 | 90 | Small | White | Present ( white) |
| | Cd30 | KZn$_2$AlF$_8$/Cs$_3$AlF$_6$ | 10/90 | | Cd30 | 90 | Small | White | Present (white) |
| | Cd31 | KZn$_2$AlF$_8$/KZnF$_3$ | 10/90 | | Cd31 | 70 | Small | Discolored | Present (white) |
| | Cd32 | KZn$_2$AlF$_8$/K$_2$ZnF$_4$ | 10/90 | | Cd32 | 70 | Small | Discolored | Present (discolored) |
| | Cd33 | KZn$_2$AlF$_8$/K$_3$Zn$_2$F$_7$ | 10/90 | | Cd33 | 70 | Small | Discolored | Present (discolored) |
| | Cd34 | KZn$_2$AlF$_8$/CsZnF$_3$ | 10/90 | | Cd34 | 70 | Small | Discolored | Present (discolored) |
| | Cd35 | KZn$_2$AlF$_8$/Cs$_2$ZnF$_4$ | 10/90 | | Cd35 | 70 | Small | Discolored | Present (discolored) |
| | Cd36 | KZn$_2$AlF$_8$/Cs$_3$Zn$_2$F$_7$ | 10/90 | | Cd36 | 70 | Small | Discolored | Present (discolored) |
| | Dd25 | KZnAl$_2$F$_9$/KAlF$_4$ | 10/90 | | Dd25 | 90 | Small | White | Present (white) |
| | Dd26 | KZnAl$_2$F$_9$/K$_2$AlF$_5$ | 10/90 | | Dd26 | 90 | Small | White | Present (white) |
| | Dd27 | KZnAl$_2$F$_9$/K$_3$AlF$_6$ | 10/90 | | Dd27 | 90 | Small | White | Present (white) |
| | Dd28 | KZnAl$_2$F$_9$/CsAlF$_4$ | 10/90 | | Dd28 | 90 | Small | White | Present (white) |
| | Dd29 | KZnAl$_2$F$_9$/Cs$_2$AlF$_5$ | 10/90 | | Dd29 | 90 | Small | White | Present (white) |
| | Dd30 | KZnAl$_2$F$_9$/Cs$_3$AlF$_6$ | 10/90 | | Dd30 | 90 | Small | White | Present (white) |
| | Dd31 | KZnAl$_2$F$_9$/KZnF$_3$ | 10/90 | | Dd31 | 70 | Small | Discolored | Present (white) |
| | Dd32 | KZnAl$_2$F$_9$/K$_2$ZnF$_4$ | 10/90 | | Dd32 | 70 | Small | Discolored | Present (discolored) |
| | Dd33 | KZnAl$_2$F$_9$/K$_3$Zn$_2$F$_7$ | 10/90 | | Dd33 | 70 | Small | Discolored | Present (discolored) |
| | Dd34 | KZnAl$_2$F$_9$/CsZnF$_3$ | 10/90 | | Dd34 | 70 | Small | Discolored | Present (discolored) |

TABLE 3-5-continued

| Specimen | Flux composition | Mixing ratio (%) | Specimen | Joining ratio (%) | Size of fillet | External appearance of surface of aluminum | Residue on surface of aluminum |
|---|---|---|---|---|---|---|---|
| Dd35 | $KZnAl_2F_9/Cs_2ZnF_4$ | 10/90 | Dd35 | 70 | Small | Discolored | Present (discolored) |
| Dd36 | $KZnAl_2F_9/Cs_3Zn_2F_7$ | 10/90 | Dd36 | 70 | Small | Discolored | Present (discolored) |

TABLE 3-6

| | Specimen | Flux composition | Mixing ratio (%) | | Specimen | Joining ratio (%) | Size of fillet | External appearance of surface of aluminum | Residue on surface of aluminum |
|---|---|---|---|---|---|---|---|---|---|
| Comparative Example 3 | Ed25 | $CsZnAlF_6/KAlF_4$ | 10/90 | Comparative Example 3 | Ed25 | 90 | Small | White | Present (white) |
| | Ed26 | $CsZnAlF_6/K_2AlF_5$ | 10/90 | | Ed26 | 90 | Small | White | Present (white) |
| | Ed27 | $CsZnAlF_6/K_3AlF_6$ | 10/90 | | Ed27 | 90 | Small | White | Present (white) |
| | Ed28 | $CsZnAlF_6/CsAlF_4$ | 10/90 | | Ed28 | 90 | Small | White | Present (white) |
| | Ed29 | $CsZnAlF_6/Cs_2AlF_5$ | 10/90 | | Ed29 | 90 | Small | White | Present (white) |
| | Ed30 | $CsZnAlF_6/Cs_3AlF_6$ | 10/90 | | Ed30 | 90 | Small | White | Present (white) |
| | Ed31 | $CsZnAlF_6/KZnF_3$ | 10/90 | | Ed31 | 70 | Small | Discolored | Present (white) |
| | Ed32 | $CsZnAlF_6/K_2ZnF_4$ | 10/90 | | Ed32 | 70 | Small | Discolored | Present (discolored) |
| | Ed33 | $CsZnAlF_6/K_3Zn_2F_7$ | 10/90 | | Ed33 | 70 | Small | Discolored | Present (discolored) |
| | Ed34 | $CsZnAlF_6/CsZnF_3$ | 10/90 | | Ed34 | 70 | Small | Discolored | Present (discolored) |
| | Ed35 | $CsZnAlF_6/Cs_2ZnF_4$ | 10/90 | | Ed35 | 70 | Small | Discolored | Present (discolored) |
| | Ed36 | $CsZnAlF_6/Cs_3Zn_2F_7$ | 10/90 | | Ed36 | 70 | Small | Discolored | Present (discolored) |
| | Fd25 | $Cs_2ZnAlF_7/KAlF_4$ | 10/90 | | Fd25 | 90 | Small | White | Present (white) |
| | Fd26 | $Cs_2ZnAlF_7/K_2AlF_5$ | 10/90 | | Fd26 | 90 | Small | White | Present (white) |
| | Fd27 | $Cs_2ZnAlF_7/K_3AlF_6$ | 10/90 | | Fd27 | 90 | Small | White | Present (white) |
| | Fd28 | $Cs_2ZnAlF_7/CsAlF_4$ | 10/90 | | Fd28 | 90 | Small | White | Present (white) |
| | Fd29 | $Cs_2ZnAlF_7/Cs_2AlF_5$ | 10/90 | | Fd29 | 90 | Small | White | Present (white) |
| | Fd30 | $Cs_2ZnAlF_7/Cs_3AlF_6$ | 10/90 | | Fd30 | 90 | Small | White | Present (white) |
| | Fd31 | $Cs_2ZnAlF_7/KZnF_3$ | 10/90 | | Fd31 | 70 | Small | Discolored | Present (white) |
| | Fd32 | $Cs_2ZnAlF_7/K_2ZnF_4$ | 10/90 | | Fd32 | 70 | Small | Discolored | Present (discolored) |
| | Fd33 | $Cs_2ZnAlF_7/K_3Zn_2F_7$ | 10/90 | | Fd33 | 70 | Small | Discolored | Present (discolored) |
| | Fd34 | $Cs_2ZnAlF_7/CsZnF_3$ | 10/90 | | Fd34 | 70 | Small | Discolored | Present (discolored) |
| | Fd35 | $Cs_2ZnAlF_7/Cs_2ZnF_4$ | 10/90 | | Fd35 | 70 | Small | Discolored | Present (discolored) |
| | Fd36 | $Cs_2ZnAlF_7/Cs_3Zn_2F_7$ | 10/90 | | Fd36 | 70 | Small | Discolored | Present (discolored) |
| | Gd25 | $CsZn_2AlF_8/KAlF_4$ | 10/90 | | Gd25 | 90 | Small | White | Present (white) |
| | Gd26 | $CsZn_2AlF_8/K_2AlF_5$ | 10/90 | | Gd26 | 90 | Small | White | Present (white) |
| | Gd27 | $CsZn_2AlF_8/K_3AlF_6$ | 10/90 | | Gd27 | 90 | Small | White | Present (white) |
| | Gd28 | $CsZn_2AlF_8/CsAlF_4$ | 10/90 | | Gd28 | 90 | Small | White | Present (white) |
| | Gd29 | $CsZn_2AlF_8/Cs_2AlF_5$ | 10/90 | | Gd29 | 90 | Small | White | Present ( white) |
| | Gd30 | $CsZn_2AlF_8/Cs_3AlF_6$ | 10/90 | | Gd30 | 90 | Small | White | Present (white) |
| | Gd31 | $CsZn_2AlF_8/KZnF_3$ | 10/90 | | Gd31 | 70 | Small | Discolored | Present (white) |
| | Gd32 | $CsZn_2AlF_8/K_2ZnF_4$ | 10/90 | | Gd32 | 70 | Small | Discolored | Present (discolored) |
| | Gd33 | $CsZn_2AlF_8/K_3Zn_2F_7$ | 10/90 | | Gd33 | 70 | Small | Discolored | Present (discolored) |
| | Gd34 | $CsZn_2AlF_8/CsZnF_3$ | 10/90 | | Gd34 | 70 | Small | Discolored | Present (discolored) |
| | Gd35 | $CsZn_2AlF_8/Cs_2ZnF_4$ | 10/90 | | Gd35 | 70 | Small | Discolored | Present (discolored) |
| | Gd36 | $CsZn_2AlF_8/Cs_3Zn_2F_7$ | 10/90 | | Gd36 | 70 | Small | Discolored | Present (discolored) |
| | Hd25 | $CsZnAl_2F_9/KAlF_4$ | 10/90 | | Hd25 | 90 | Small | White | Present (white) |
| | Hd26 | $CsZnAl_2F_9/K_2AlF_5$ | 10/90 | | Hd26 | 90 | Small | White | Present(white) |
| | Hd27 | $CsZnAl_2F_9/K_3AlF_6$ | 10/90 | | Hd27 | 90 | Small | White | Present (white) |
| | Hd28 | $CsZnAl_2F_9/CsAlF_4$ | 10/90 | | Hd28 | 90 | Small | White | Present (white) |
| | Hd29 | $CsZnAl_2F_9/Cs_2AlF_5$ | 10/90 | | Hd29 | 90 | Small | White | Present (white) |
| | Hd30 | $CsZnAl_2F_9/Cs_3AlF_6$ | 10/90 | | Hd30 | 90 | Small | White | Present (white) |
| | Hd31 | $CsZnAl_2F_9/KZnF_3$ | 10/90 | | Hd31 | 70 | Small | Discolored | Present (white) |
| | Hd32 | $CsZnAl_2F_9/K_2ZnF_4$ | 10/90 | | Hd32 | 70 | Small | Discolored | Present (discolored) |
| | Hd33 | $CsZnAl_2F_9/K_3Zn_2F_7$ | 10/90 | | Hd33 | 70 | Small | Discolored | Present (discolored) |
| | Hd34 | $CsZnAl_2F_9/CsZnF_3$ | 10/90 | | Hd34 | 70 | Small | Discolored | Present (discolored) |
| | Hd35 | $CsZnAl_2F_9/Cs_2ZnF_4$ | 10/90 | | Hd35 | 70 | Small | Discolored | Present (discolored) |
| | Hd36 | $CsZnAl_2F_9/Cs_3Zn_2F_7$ | 10/90 | | Hd36 | 70 | Small | Discolored | Present (discolored) |

TABLE 3-7

| | Specimen | Flux composition | Mixing ratio (%) | | Specimen | Joining ratio (%) | Size of fillet | External appearance of surface of aluminum | Residue on surface of aluminum |
|---|---|---|---|---|---|---|---|---|---|
| Comparative Example 3 | Id1 | $KAlF_4/K_2AlF_5$ | 90/10 | Comparative Example 3 | Id1 | 80 | Small | White | Present (white) |
| | Id2 | $KAlF_4/K_2AlF_5$ | 55/45 | | Id2 | 80 | Small | White | Present (white) |
| | Id3 | $KAlF_4/K_2AlF_5$ | 10/90 | | Id3 | 80 | Small | White | Present (white) |
| | Id4 | $KAlF_4/K_3AlF_6$ | 90/10 | | Id4 | 80 | Small | White | Present (white) |

TABLE 3-7-continued

| Specimen | Flux composition | Mixing ratio (%) | Specimen | Joining ratio (%) | Size of fillet | External appearance of surface of aluminum | Residue on surface of aluminum |
|---|---|---|---|---|---|---|---|
| Id5 | $KAlF_4/K_3AlF_6$ | 55/45 | Id5 | 80 | Small | White | Present (white) |
| Id6 | $KAlF_4/K_3AlF_6$ | 10/90 | Id6 | 80 | Small | White | Present (white) |
| Id7 | $KAlF_4/CsAlF_4$ | 90/10 | Id7 | 80 | Small | White | Present (white) |
| Id8 | $KAlF_4/CsAlF_4$ | 55/45 | Id8 | 80 | Small | White | Present (white) |
| Id9 | $KAlF_4/CsAlF_4$ | 10/90 | Id9 | 80 | Small | White | Present (white) |
| Id10 | $KAlF_4/Cs_2AlF_5$ | 90/10 | Id10 | 80 | Small | White | Present (white) |
| Id11 | $KAlF_4/Cs_2AlF_5$ | 55/45 | Id11 | 80 | Small | White | Present (white) |
| Id12 | $KAlF_4/Cs_2AlF_5$ | 10/90 | Id12 | 80 | Small | White | Present (white) |
| Id13 | $KAlF_4/Cs_3AlF_6$ | 90/10 | Id13 | 80 | Small | White | Present (white) |
| Id14 | $KAlF_4/Cs_3AlF_6$ | 55/45 | Id14 | 80 | Small | White | Present (white) |
| Id15 | $KAlF_4/Cs_3AlF_6$ | 10/90 | Id15 | 80 | Small | White | Present (white) |
| Id16 | $KAlF_4/KZnF_3$ | 90/10 | Id16 | 60 | Small | Discolored | Present (white) |
| Id17 | $KAlF_4/KZnF_3$ | 55/45 | Id17 | 60 | Small | Discolored | Present (discolored) |
| Id18 | $KAlF_4/KZnF_3$ | 10/90 | Id18 | 60 | Small | Discolored | Present (discolored) |
| Id19 | $KAlF_4/K_2ZnF_4$ | 90/10 | Id19 | 60 | Small | Discolored | Present (white) |
| Id20 | $KAlF_4/K_2ZnF_4$ | 55/45 | Id20 | 60 | Small | Discolored | Present (discolored) |
| Id21 | $KAlF_4/K_2ZnF_4$ | 10/90 | Id21 | 60 | Small | Discolored | Present (discolored) |
| Id22 | $KAlF_4/K_3Zn_2F_7$ | 90/10 | Id22 | 60 | Small | Discolored | Present (white) |
| Id23 | $KAlF_4/K_3Zn_2F_7$ | 55/45 | Id23 | 60 | Small | Discolored | Present (discolored) |
| Id24 | $KAlF_4/K_3Zn_2F_7$ | 10/90 | Id24 | 60 | Small | Discolored | Present (discolored) |
| Id25 | $KAlF_4/CsZnF_3$ | 90/10 | Id25 | 60 | Small | Discolored | Present (white) |
| Id26 | $KAlF_4/CsZnF_3$ | 55/45 | Id26 | 60 | Small | Discolored | Present (discolored) |
| Id27 | $KAlF_4/CsZnF_3$ | 10/90 | Id27 | 60 | Small | Discolored | Present (discolored) |
| Id28 | $KAlF_4/Cs_2ZnF_4$ | 90/10 | Id28 | 60 | Small | Discolored | Present (white) |
| Id29 | $KAlF_4/Cs_2ZnF_4$ | 55/45 | Id29 | 60 | Small | Discolored | Present (discolored) |
| Id30 | $KAlF_4/Cs_2ZnF_4$ | 10/90 | Id30 | 60 | Small | Discolored | Present (discolored) |
| Id31 | $KAlF_4/Cs_3Zn_2F_7$ | 90/10 | Id31 | 60 | Small | Discolored | Present (white) |
| Id32 | $KAlF_4/Cs_3Zn_2F_7$ | 55/45 | Id32 | 60 | Small | Discolored | Present (discolored) |
| Id33 | $KAlF_4/Cs_3Zn_2F_7$ | 10/90 | Id33 | 60 | Small | Discolored | Present (discolored) |

TABLE 3-8

| | Specimen | Flux composition | Mixing ratio (%) | | Specimen | Joining ratio (%) | Size of fillet | External appearance of surface of aluminum | Residue on surface of aluminum |
|---|---|---|---|---|---|---|---|---|---|
| Comparative Example 3 | Jd1 | $KZnF_3/KAlF_4$ | 90/10 | Comparative Example 3 | Jd1 | 60 | Small | Discolored | Present (discolored) |
| | Jd2 | $KZnF_3/KAlF_4$ | 55/45 | | Jd2 | 60 | Small | Discolored | Present (discolored) |
| | Jd3 | $KZnF_3/KAlF_4$ | 10/90 | | Jd3 | 60 | Small | Discolored | Present (discolored) |
| | Jd4 | $KZnF_3/K_2AlF_5$ | 90/10 | | Jd4 | 60 | Small | Discolored | Present (discolored) |
| | Jd5 | $KZnF_3/K_2AlF_5$ | 55/45 | | Jd5 | 60 | Small | Discolored | Present (discolored) |
| | Jd6 | $KZnF_3/K_2AlF_5$ | 10/90 | | Jd6 | 60 | Small | Discolored | Present (discolored) |
| | Jd7 | $KZnF_3/K_3AlF_6$ | 90/10 | | Jd7 | 60 | Small | Discolored | Present (discolored) |
| | Jd8 | $KZnF_3/K_3AlF_6$ | 55/45 | | Jd8 | 60 | Small | Discolored | Present (discolored) |
| | Jd9 | $KZnF_3/K_3AlF_6$ | 10/90 | | Jd9 | 60 | Small | Discolored | Present (discolored) |
| | Jd10 | $KZnF_3/CsAlF_4$ | 90/10 | | Jd10 | 60 | Small | Discolored | Present (discolored) |
| | Jd11 | $KZnF_3/CsAlF_4$ | 55/45 | | Jd11 | 60 | Small | Discolored | Present (discolored) |
| | Jd12 | $KZnF_3/CsAlF_4$ | 10/90 | | Jd12 | 60 | Small | Discolored | Present (discolored) |
| | Jd13 | $KZnF_3/Cs_2AlF_5$ | 90/10 | | Jd13 | 60 | Small | Discolored | Present (discolored) |
| | Jd14 | $KZnF_3/Cs_2AlF_5$ | 55/45 | | Jd14 | 60 | Small | Discolored | Present (discolored) |
| | Jd15 | $KZnF_3/Cs_2AlF_5$ | 10/90 | | Jd15 | 60 | Small | Discolored | Present (discolored) |
| | Jd16 | $KZnF_3/Cs_3AlF_6$ | 90/10 | | Jd16 | 60 | Small | Discolored | Present (discolored) |
| | Jd17 | $KZnF_3/Cs_3AlF_6$ | 55/45 | | Jd17 | 60 | Small | Discolored | Present (discolored) |
| | Jd18 | $KZnF_3/Cs_3AlF_6$ | 10/90 | | Jd18 | 60 | Small | Discolored | Present (discolored) |
| | Jd19 | $KZnF_3/K_2ZnF_4$ | 90/10 | | Jd19 | 60 | Small | Discolored | Present (discolored) |
| | Jd20 | $KZnF_3/K_2ZnF_4$ | 55/45 | | Jd20 | 60 | Small | Discolored | Present (discolored) |
| | Jd21 | $KZnF_3/K_2ZnF_4$ | 10/90 | | Jd21 | 60 | Small | Discolored | Present (discolored) |
| | Jd22 | $KZnF_3/K_3Zn_2F_7$ | 90/10 | | Jd22 | 60 | Small | Discolored | Present (discolored) |
| | Jd23 | $KZnF_3/K_3Zn_2F_7$ | 55/45 | | Jd23 | 60 | Small | Discolored | Present (discolored) |
| | Jd24 | $KZnF_3/K_3Zn_2F_7$ | 10/90 | | Jd24 | 60 | Small | Discolored | Present (discolored) |
| | Jd25 | $KZnF_3/CsZnF_3$ | 90/10 | | Jd25 | 60 | Small | Discolored | Present (discolored) |
| | Jd26 | $KZnF_3/CsZnF_3$ | 55/45 | | Jd26 | 60 | Small | Discolored | Present (discolored) |
| | Jd27 | $KZnF_3/CsZnF_3$ | 10/90 | | Jd27 | 60 | Small | Discolored | Present (discolored) |
| | Jd28 | $KZnF_3/Cs_2ZnF_4$ | 90/10 | | Jd28 | 60 | Small | Discolored | Present (discolored) |
| | Jd29 | $KZnF_3/Cs_2ZnF_4$ | 55/45 | | Jd29 | 60 | Small | Discolored | Present (discolored) |
| | Jd30 | $KZnF_3/Cs_2ZnF_4$ | 10/90 | | Jd30 | 60 | Small | Discolored | Present (discolored) |
| | Jd31 | $KZnF_3/Cs_3Zn_2F_7$ | 90/10 | | Jd31 | 60 | Small | Discolored | Present (discolored) |
| | Jd32 | $KZnF_3/Cs_3Zn_2F_7$ | 55/45 | | Jd32 | 60 | Small | Discolored | Present (discolored) |
| | Jd33 | $KZnF_3/Cs_3Zn_2F_7$ | 10/90 | | Jd33 | 60 | Small | Discolored | Present (discolored) |

As shown in Tables 3-1 to 3-4, good results (brazability) were obtained in Example 3 even when the oxygen concentration during brazing was high. On the other hand, when the ratio of the component (A) was low, and the ratio of the alkali metal fluoroaluminate was high (Ad25 to Ad30, Bd25 to Bd30, Cd25 to Cd30, Dd25 to Dd30, Ed25 to Ed30, Fd25 to Fd30, Gd25 to Gd30, and Hd25 to Hd30 of Comparative Example 3), a white residue was observed on the surface of the aluminum alloy when the oxygen concentration was high, and the joining ratio decreased due to the residue. When the ratio of the component (A) was low, and the ratio of the alkali metal fluorozincate was high (Ad31 to Ad36, Bd31 to Bd36, Cd31 to Cd36, Dd31 to Dd36, Ed31 to Ed36, Fd31 to Fd36, Gd31 to Gd36, and Hd31 to Hd36), a discolored residue and discoloring were observed on the surface of the aluminum alloy when the oxygen concentration was high, and the joining ratio decreased due to the residue. When the component (A) was not used (Id1 to Id33 and Jd1 to Jd33), a white residue (unreacted flux) or a discolored residue and discoloration were observed on the surface of the aluminum alloy, and the joining ratio decreased due to the residue.

Example 4 and Comparative Example 4

Flux Composition

The materials shown in Tables 4-1 to 4-16 were mixed in the mixing ratio shown in Tables 4-1 to 4-16 to prepare a powder mixture (flux composition) (average particle size: 10 mm). In Example 4 and Comparative Example 4, a powder of an alkali metal zinc fluoroaluminate and a metal powder or a metal alloy powder were mixed. In Tables 4-1 to 4-16, the content (mass %) of each element in each metal alloy is indicated by a numeral. For example, "$KZnAlF_6$/Al-25Si-25Cu" is a mixture of a $KZnAlF_6$ powder and an Al alloy powder having an Si content of 25 mass % and a Cu content of 25 mass %.

Brazing Test

The brazing test was performed in the same manner as in Example 1 and Comparative Example 1.

Evaluation of Brazability

The brazability was evaluated in the same manner as in Example 1 and Comparative Example 1. The evaluation results are shown in Tables 4-1 to 4-16.

TABLE 4-1

| | Specimen | Flux composition | Mixing ratio (%) | | Specimen | Joining ratio (%) | Size of fillet | External appearance of surface of aluminum | Residue on surface of aluminum |
|---|---|---|---|---|---|---|---|---|---|
| Example 4 | Aa1 | $KZnAlF_6$/Al | 70/30 | Example 4 | Aa1 | 100 | Large | Not discolored | Absent |
| | Aa2 | $KZnAlF_6$/Si | 70/30 | | Aa2 | 100 | Large | Not discolored | Absent |
| | Aa3 | $KZnAlF_6$/Cu | 70/30 | | Aa3 | 100 | Large | Not discolored | Absent |
| | Aa4 | $KZnAlF_6$/Zn | 70/30 | | Aa4 | 100 | Large | Not discolored | Absent |
| | Aa5 | $KZnAlF_6$/Al-1Si | 70/30 | | Aa5 | 100 | Large | Not discolored | Absent |
| | Aa6 | $KZnAlF_6$/Al-10Si | 70/30 | | Aa6 | 100 | Large | Not discolored | Absent |
| | Aa7 | $KZnAlF_6$/Al-50Si | 70/30 | | Aa7 | 100 | Large | Not discolored | Absent |
| | Aa8 | $KZnAlF_6$/Al-90Si | 70/30 | | Aa8 | 100 | Large | Not discolored | Absent |
| | Aa9 | $KZnAlF_6$/Al-1Cu | 70/30 | | Aa9 | 100 | Large | Not discolored | Absent |
| | Aa10 | $KZnAlF_6$/Al-10Cu | 70/30 | | Aa10 | 100 | Large | Not discolored | Absent |
| | Aa11 | $KZnAlF_6$/Al-50Cu | 70/30 | | Aa11 | 100 | Large | Not discolored | Absent |
| | Aa12 | $KZnAlF_6$/Al-90Cu | 70/30 | | Aa12 | 100 | Large | Not discolored | Absent |
| | Aa13 | $KZnAlF_6$/Al-1Zn | 70/30 | | Aa13 | 100 | Large | Not discolored | Absent |
| | Aa14 | $KZnAlF_6$/Al-10Zn | 70/30 | | Aa14 | 100 | Large | Not discolored | Absent |
| | Aa15 | $KZnAlF_6$/Al-50Zn | 70/30 | | Aa15 | 100 | Large | Not discolored | Absent |
| | Aa16 | $KZnAlF_6$/Al-90Zn | 70/30 | | Aa16 | 100 | Large | Not discolored | Absent |
| | Aa17 | $KZnAlF_6$/Cu-10Zn | 70/30 | | Aa17 | 100 | Large | Not discolored | Absent |
| | Aa18 | $KZnAlF_6$/Cu-50Zn | 70/30 | | Aa18 | 100 | Large | Not discolored | Absent |
| | Aa19 | $KZnAlF_6$/Cu-90Zn | 70/30 | | Aa19 | 100 | Large | Not discolored | Absent |
| | Aa20 | $KZnAlF_6$/Al-1Si-1Cu | 70/30 | | Aa20 | 100 | Large | Not discolored | Absent |
| | Aa21 | $KZnAlF_6$/Al-10Si-10Cu | 70/30 | | Aa21 | 100 | Large | Not discolored | Absent |
| | Aa22 | $KZnAlF_6$/Al-25Si-25Cu | 70/30 | | Aa22 | 100 | Large | Not discolored | Absent |
| | Aa23 | $KZnAlF_6$/Al-45Si-45Cu | 70/30 | | Aa23 | 100 | Large | Not discolored | Absent |
| | Aa24 | $KZnAlF_6$/Al-90Si-1Cu | 70/30 | | Aa24 | 100 | Large | Not discolored | Absent |
| | Aa25 | $KZnAlF_6$/Al-1Si-90Cu | 70/30 | | Aa25 | 100 | Large | Not discolored | Absent |
| | Aa26 | $KZnAlF_6$/Al-1Si-1Zn | 70/30 | | Aa26 | 100 | Large | Not discolored | Absent |
| | Aa27 | $KZnAlF_6$/Al-10Si-10Zn | 70/30 | | Aa27 | 100 | Large | Not discolored | Absent |
| | Aa28 | $KZnAlF_6$/Al-25Si-25Zn | 70/30 | | Aa28 | 100 | Large | Not discolored | Absent |
| | Aa29 | $KZnAlF_6$/Al-45Si-45Zn | 70/30 | | Aa29 | 100 | Large | Not discolored | Absent |
| | Aa30 | $KZnAlF_6$/Al-90Si-1Zn | 70/30 | | Aa30 | 100 | Large | Not discolored | Absent |
| | Aa31 | $KZnAlF_6$/Al-1Si-90Zn | 70/30 | | Aa31 | 100 | Large | Not discolored | Absent |
| | Aa32 | $KZnAlF_6$/Al-1Cu-1Zn | 70/30 | | Aa32 | 100 | Large | Not discolored | Absent |
| | Aa33 | $KZnAlF_6$/Al-10Cu-10Zn | 70/30 | | Aa33 | 100 | Large | Not discolored | Absent |
| | Aa34 | $KZnAlF_6$/Al-25Cu-25Zn | 70/30 | | Aa34 | 100 | Large | Not discolored | Absent |
| | Aa35 | $KZnAlF_6$/Al-45Cu-45Zn | 70/30 | | Aa35 | 100 | Large | Not discolored | Absent |
| | Aa36 | $KZnAlF_6$/Al-90-Cu-1Zn | 70/30 | | Aa36 | 100 | Large | Not discolored | Absent |
| | Aa37 | $KZnAlF_6$/Al-1Cu-90Zn | 70/30 | | Aa37 | 100 | Large | Not discolored | Absent |
| | Aa38 | $KZnAlF_6$/Al-1Si-1Cu-1Zn | 70/30 | | Aa38 | 100 | Large | Not discolored | Absent |
| | Aa39 | $KZnAlF_6$/Al-5Si-5Cu-5Zn | 70/30 | | Aa39 | 100 | Large | Not discolored | Absent |
| | Aa40 | $KZnAlF_6$/Al-10Si-10Cu-10Zn | 70/30 | | Aa40 | 100 | Large | Not discolored | Absent |
| | Aa41 | $KZnAlF_6$/Al-30Si-30Cu-30Zn | 70/30 | | Aa41 | 100 | Large | Not discolored | Absent |
| | Aa42 | $KZnAlF_6$/Al-90Si-1Cu-1Zn | 70/30 | | Aa42 | 100 | Large | Not discolored | Absent |
| | Aa43 | $KZnAlF_6$/Al-1Si-90Cu-1Zn | 70/30 | | Aa43 | 100 | Large | Not discolored | Absent |
| | Aa44 | $KZnAlF_6$/Al-1Si-1Cu-90Zn | 70/30 | | Aa44 | 100 | Large | Not discolored | Absent |

TABLE 4-2

| | Specimen | Flux composition | Mixing ratio (%) | | Specimen | Joining ratio (%) | Size of fillet | External appearance of surface of aluminum | Residue on surface of aluminum |
|---|---|---|---|---|---|---|---|---|---|
| Example 4 | Ba1 | K$_2$ZnAlF$_7$/Al | 70/30 | Example 4 | Ba1 | 100 | Large | Not discolored | Absent |
| | Ba2 | K$_2$ZnAlF$_7$/Si | 70/30 | | Ba2 | 100 | Large | Not discolored | Absent |
| | Ba3 | K$_2$ZnAlF$_7$/Cu | 70/30 | | Ba3 | 100 | Large | Not discolored | Absent |
| | Ba4 | K$_2$ZnAlF$_7$/Zn | 70/30 | | Ba4 | 100 | Large | Not discolored | Absent |
| | Ba5 | K$_2$ZnAlF$_7$/Al-1Si | 70/30 | | Ba5 | 100 | Large | Not discolored | Absent |
| | Ba6 | K$_2$ZnAlF$_7$/Al-10Si | 70/30 | | Ba6 | 100 | Large | Not discolored | Absent |
| | Ba7 | K$_2$ZnAlF$_7$/Al-50Si | 70/30 | | Ba7 | 100 | Large | Not discolored | Absent |
| | Ba8 | K$_2$ZnAlF$_7$/Al-90Si | 70/30 | | Ba8 | 100 | Large | Not discolored | Absent |
| | Ba9 | K$_2$ZnAlF$_7$/Al-1Cu | 70/30 | | Ba9 | 100 | Large | Not discolored | Absent |
| | Ba10 | K$_2$ZnAlF$_7$/Al-10Cu | 70/30 | | Ba10 | 100 | Large | Not discolored | Absent |
| | Ba11 | K$_2$ZnAlF$_7$/Al-50Cu | 70/30 | | Ba11 | 100 | Large | Not discolored | Absent |
| | Ba12 | K$_2$ZnAlF$_7$/Al-90Cu | 70/30 | | Ba12 | 100 | Large | Not discolored | Absent |
| | Ba13 | K$_2$ZnAlF$_7$/Al-1Zn | 70/30 | | Ba13 | 100 | Large | Not discolored | Absent |
| | Ba14 | K$_2$ZnAlF$_7$/Al-10Zn | 70/30 | | Ba14 | 100 | Large | Not discolored | Absent |
| | Ba15 | K$_2$ZnAlF$_7$/Al-50Zn | 70/30 | | Ba15 | 100 | Large | Not discolored | Absent |
| | Ba16 | K$_2$ZnAlF$_7$/Al-90Zn | 70/30 | | Ba16 | 100 | Large | Not discolored | Absent |
| | Ba17 | K$_2$ZnAlF$_7$/Cu-10Zn | 70/30 | | Ba17 | 100 | Large | Not discolored | Absent |
| | Ba18 | K$_2$ZnAlF$_7$/Cu-50Zn | 70/30 | | Ba18 | 100 | Large | Not discolored | Absent |
| | Ba19 | K$_2$ZnAlF$_7$/Cu-90Zn | 70/30 | | Ba19 | 100 | Large | Not discolored | Absent |
| | Ba20 | K$_2$ZnAlF$_7$/Al-1Si-1Cu | 70/30 | | Ba20 | 100 | Large | Not discolored | Absent |
| | Ba21 | K$_2$ZnAlF$_7$/Al-10Si-10Cu | 70/30 | | Ba21 | 100 | Large | Not discolored | Absent |
| | Ba22 | K$_2$ZnAlF$_7$/Al-25Si-25Cu | 70/30 | | Ba22 | 100 | Large | Not discolored | Absent |
| | Ba23 | K$_2$ZnAlF$_7$/Al-45Si-45Cu | 70/30 | | Ba23 | 100 | Large | Not discolored | Absent |
| | Ba24 | K$_2$ZnAlF$_7$/Al-90Si-1Cu | 70/30 | | Ba24 | 100 | Large | Not discolored | Absent |
| | Ba25 | K$_2$ZnAlF$_7$/Al-1Si-90Cu | 70/30 | | Ba25 | 100 | Large | Not discolored | Absent |
| | Ba26 | K$_2$ZnAlF$_7$/Al-1Si-1Zn | 70/30 | | Ba26 | 100 | Large | Not discolored | Absent |
| | Ba27 | K$_2$ZnAlF$_7$/Al-10Si-10Zn | 70/30 | | Ba27 | 100 | Large | Not discolored | Absent |
| | Ba28 | K$_2$ZnAlF$_7$/Al-25Si-25Zn | 70/30 | | Ba28 | 100 | Large | Not discolored | Absent |
| | Ba29 | K$_2$ZnAlF$_7$/Al-45Si-45Zn | 70/30 | | Ba29 | 100 | Large | Not discolored | Absent |
| | Ba30 | K$_2$ZnAlF$_7$/Al-90Si-1Zn | 70/30 | | Ba30 | 100 | Large | Not discolored | Absent |
| | Ba31 | K$_2$ZnAlF$_7$/Al-1Si-90Zn | 70/30 | | Ba31 | 100 | Large | Not discolored | Absent |
| | Ba32 | K$_2$ZnAlF$_7$/Al-1Cu-1Zn | 70/30 | | Ba32 | 100 | Large | Not discolored | Absent |
| | Ba33 | K$_2$ZnAlF$_7$/Al-10Cu-10Zn | 70/30 | | Ba33 | 100 | Large | Not discolored | Absent |
| | Ba34 | K$_2$ZnAlF$_7$/Al-25Cu-25Zn | 70/30 | | Ba34 | 100 | Large | Not discolored | Absent |
| | Ba35 | K$_2$ZnAlF$_7$/Al-45Cu-45Zn | 70/30 | | Ba35 | 100 | Large | Not discolored | Absent |
| | Ba36 | K$_2$ZnAlF$_7$/Al-90-Cu-1Zn | 70/30 | | Ba36 | 100 | Large | Not discolored | Absent |
| | Ba37 | K$_2$ZnAlF$_7$/Al-1Cu-90Zn | 70/30 | | Ba37 | 100 | Large | Not discolored | Absent |
| | Ba38 | K$_2$ZnAlF$_7$/Al-1Si-1Cu-1Zn | 70/30 | | Ba38 | 100 | Large | Not discolored | Absent |
| | Ba39 | K$_2$ZnAlF$_7$/Al-5Si-5Cu-5Zn | 70/30 | | Ba39 | 100 | Large | Not discolored | Absent |
| | Ba40 | K$_2$ZnAlF$_7$/Al-10Si-10Cu-10Zn | 70/30 | | Ba40 | 100 | Large | Not discolored | Absent |
| | Ba41 | K$_2$ZnAlF$_7$/Al-30Si-30Cu-30Zn | 70/30 | | Ba41 | 100 | Large | Not discolored | Absent |
| | Ba42 | K$_2$ZnAlF$_7$/Al-90Si-1Cu-1Zn | 70/30 | | Ba42 | 100 | Large | Not discolored | Absent |
| | Ba43 | K$_2$ZnAlF$_7$/Al-1Si-90Cu-1Zn | 70/30 | | Ba43 | 100 | Large | Not discolored | Absent |
| | Ba44 | K$_2$ZnAlF$_7$/Al-1Si-1Cu-90Zn | 70/30 | | Ba44 | 100 | Large | Not discolored | Absent |

TABLE 4-3

| | Specimen | Flux composition | Mixing ratio (%) | | Specimen | Joining ratio (%) | Size of fillet | External appearance of surface of aluminum | Residue on surface of aluminum |
|---|---|---|---|---|---|---|---|---|---|
| Example 4 | Ca1 | KZn$_2$AlF$_8$/Al | 70/30 | Example 4 | Ca1 | 100 | Large | Not discolored | Absent |
| | Ca2 | KZn$_2$AlF$_8$/Si | 70/30 | | Ca2 | 100 | Large | Not discolored | Absent |
| | Ca3 | KZn$_2$AlF$_8$/Cu | 70/30 | | Ca3 | 100 | Large | Not discolored | Absent |
| | Ca4 | KZn$_2$AlF$_8$/Zn | 70/30 | | Ca4 | 100 | Large | Not discolored | Absent |
| | Ca5 | KZn$_2$AlF$_8$/Al—1Si | 70/30 | | Ca5 | 100 | Large | Not discolored | Absent |
| | Ca6 | KZn$_2$AlF$_8$/Al—10Si | 70/30 | | Ca6 | 100 | Large | Not discolored | Absent |
| | Ca7 | KZn$_2$AlF$_8$/Al—50Si | 70/30 | | Ca7 | 100 | Large | Not discolored | Absent |
| | Ca8 | KZn$_2$AlF$_8$/Al—90Si | 70/30 | | Ca8 | 100 | Large | Not discolored | Absent |
| | Ca9 | KZn$_2$AlF$_8$/Al—1Cu | 70/30 | | Ca9 | 100 | Large | Not discolored | Absent |
| | Ca10 | KZn$_2$AlF$_8$/Al—10Cu | 70/30 | | Ca10 | 100 | Large | Not discolored | Absent |
| | Ca11 | KZn$_2$AlF$_8$/Al—50Cu | 70/30 | | Ca11 | 100 | Large | Not discolored | Absent |
| | Ca12 | KZn$_2$AlF$_8$/Al—90Cu | 70/30 | | Ca12 | 100 | Large | Not discolored | Absent |
| | Ca13 | KZn$_2$AlF$_8$//Al—1Zn | 70/30 | | Ca13 | 100 | Large | Not discolored | Absent |
| | Ca14 | KZn$_2$AlF$_8$/Al—10Zn | 70/30 | | Ca14 | 100 | Large | Not discolored | Absent |
| | Ca15 | KZn$_2$AlF$_8$/Al—50Zn | 70/30 | | Ca15 | 100 | Large | Not discolored | Absent |
| | Ca16 | KZn$_2$AlF$_8$/Al—90Zn | 70/30 | | Ca16 | 100 | Large | Not discolored | Absent |
| | Ca17 | KZn$_2$AlF$_8$/Cu—10Zn | 70/30 | | Ca17 | 100 | Large | Not discolored | Absent |
| | Ca18 | KZn$_2$AlF$_8$/Cu—50Zn | 70/30 | | Ca18 | 100 | Large | Not discolored | Absent |
| | Ca19 | KZn$_2$AlF$_8$/Cu—90Zn | 70/30 | | Ca19 | 100 | Large | Not discolored | Absent |

TABLE 4-3-continued

| Specimen | Flux composition | Mixing ratio (%) | Specimen | Joining ratio (%) | Size of fillet | External appearance of surface of aluminum | Residue on surface of aluminum |
|---|---|---|---|---|---|---|---|
| Ca20 | KZn₂AlF₈/Al—1Si—1Cu | 70/30 | Ca20 | 100 | Large | Not discolored | Absent |
| Ca21 | KZn₂AlF₈/Al—10Si—10Cu | 70/30 | Ca21 | 100 | Large | Not discolored | Absent |
| Ca22 | KZn₂AlF₈/Al—25Si—25Cu | 70/30 | Ca22 | 100 | Large | Not discolored | Absent |
| Ca23 | KZn₂AlF₈/Al—45Si—45Cu | 70/30 | Ca23 | 100 | Large | Not discolored | Absent |
| Ca24 | KZn₂AlF₈/Al—90Si—1Cu | 70/30 | Ca24 | 100 | Large | Not discolored | Absent |
| Ca25 | KZn₂AlF₈/Al—1Si—90Cu | 70/30 | Ca25 | 100 | Large | Not discolored | Absent |
| Ca26 | KZn₂AlF₈/Al—1Si—1Zn | 70/30 | Ca26 | 100 | Large | Not discolored | Absent |
| Ca27 | KZn₂AlF₈/Al—10Si—10Zn | 70/30 | Ca27 | 100 | Large | Not discolored | Absent |
| Ca28 | KZn₂AlF₈/Al—25Si—25Zn | 70/30 | Ca28 | 100 | Large | Not discolored | Absent |
| Ca29 | KZn₂AlF₈/Al—45Si—45Zn | 70/30 | Ca29 | 100 | Large | Not discolored | Absent |
| Ca30 | KZn₂AlF₈/Al—90Si—1Zn | 70/30 | Ca30 | 100 | Large | Not discolored | Absent |
| Ca31 | KZn₂AlF₈/Al—1Si—90Zn | 70/30 | Ca31 | 100 | Large | Not discolored | Absent |
| Ca32 | KZn₂AlF₈/Al—1Cu—1Zn | 70/30 | Ca32 | 100 | Large | Not discolored | Absent |
| Ca33 | KZn₂AlF₈/Al—10Cu—10Zn | 70/30 | Ca33 | 100 | Large | Not discolored | Absent |
| Ca34 | KZn₂AlF₈/Al—25Cu—25Zn | 70/30 | Ca34 | 100 | Large | Not discolored | Absent |
| Ca35 | KZn₂AlF₈/Al—45Cu—45Zn | 70/30 | Ca35 | 100 | Large | Not discolored | Absent |
| Ca36 | KZn₂AlF₈/Al—90Cu—1Zn | 70/30 | Ca36 | 100 | Large | Not discolored | Absent |
| Ca37 | KZn₂AlF₈/Al—1Cu—90Zn | 70/30 | Ca37 | 100 | Large | Not discolored | Absent |
| Ca38 | KZn₂AlF₈/Al—1Si—1Cu—1Zn | 70/30 | Ca38 | 100 | Large | Not discolored | Absent |
| Ca39 | KZn₂AlF₈/Al—5Si—5Cu—5Zn | 70/30 | Ca39 | 100 | Large | Not discolored | Absent |
| Ca40 | KZn₂AlF₈/Al—10Si—10Cu—10Zn | 70/30 | Ca40 | 100 | Large | Not discolored | Absent |
| Ca41 | KZn₂AlF₈/Al—30Si—30Cu—30Cu | 70/30 | Ca41 | 100 | Large | Not discolored | Absent |
| Ca42 | KZn₂AlF₈/Al—90Si—1Cu—1Zn | 70/30 | Ca42 | 100 | Large | Not discolored | Absent |
| Ca43 | KZn₂AlF₈/Al—1Si—90Cu—1Zn | 70/30 | Ca43 | 100 | Large | Not discolored | Absent |
| Ca44 | KZn₂AlF₈/Al—1Si—1Cu—90Zn | 70/30 | Ca44 | 100 | Large | Not discolored | Absent |

TABLE 4-4

| | Specimen | Flux composition | Mixing ratio (%) | | Specimen | Joining ratio (%) | Size of fillet | External appearance of surface of aluminum | Residue on surface of aluminum |
|---|---|---|---|---|---|---|---|---|---|
| Example 4 | Da1 | KZnAl₂F₉/Al | 70/30 | Example 4 | Da1 | 100 | Large | Not discolored | Absent |
| | Da2 | KZnAl₂F₉/Si | 70/30 | | Da2 | 100 | Large | Not discolored | Absent |
| | Da3 | KZnAl₂F₉/Cu | 70/30 | | Da3 | 100 | Large | Not discolored | Absent |
| | Da4 | KZnAl₂F₉/Zn | 70/30 | | Da4 | 100 | Large | Not discolored | Absent |
| | Da5 | KZnAl₂F₉/Al—1Si | 70/30 | | Da5 | 100 | Large | Not discolored | Absent |
| | Da6 | KZnAl₂F₉/Al—10Si | 70/30 | | Da6 | 100 | Large | Not discolored | Absent |
| | Da7 | KZnAl₂F₉/Al—50Si | 70/30 | | Da7 | 100 | Large | Not discolored | Absent |
| | Dab | KZnAl₂F₉/Al—90Si | 70/30 | | Dab | 100 | Large | Not discolored | Absent |
| | Da9 | KZnAl₂F₉/Al—1Cu | 70/30 | | Da9 | 100 | Large | Not discolored | Absent |
| | Da10 | KZnAl₂F₉/Al—10Cu | 70/30 | | Da10 | 100 | Large | Not discolored | Absent |
| | Da11 | KZnAl₂F₉/Al—50Cu | 70/30 | | Da11 | 100 | Large | Not discolored | Absent |
| | Da12 | KZnAl₂F₉/Al—90Cu | 70/30 | | Da12 | 100 | Large | Not discolored | Absent |
| | Da13 | KZnAl₂F₉/Al—1Zn | 70/30 | | Da13 | 100 | Large | Not discolored | Absent |
| | Da14 | KZnAl₂F₉/Al—10Zn | 70/30 | | Da14 | 100 | Large | Not discolored | Absent |
| | Da15 | KZnAl₂F₉/Al—50Zn | 70/30 | | Da15 | 100 | Large | Not discolored | Absent |
| | Da16 | KZnAl₂F₉/Al—90Zn | 70/30 | | Da16 | 100 | Large | Not discolored | Absent |
| | Da17 | KZnAl₂F₉/Cu—10Zn | 70/30 | | Da17 | 100 | Large | Not discolored | Absent |
| | Da18 | KZnAl₂F₉/Cu—50Zn | 70/30 | | Da18 | 100 | Large | Not discolored | Absent |
| | Da19 | KZnAl₂F₉/Cu—90Zn | 70/30 | | Da19 | 100 | Large | Not discolored | Absent |
| | Da20 | KZnAl₂F₉/Al—1Si—1Cu | 70/30 | | Da20 | 100 | Large | Not discolored | Absent |
| | Da21 | KZnAl₂F₉/Al—10Si—10Cu | 70/30 | | Da21 | 100 | Large | Not discolored | Absent |
| | Da22 | KZnAl₂F₉/Al—25Si—25Cu | 70/30 | | Da22 | 100 | Large | Not discolored | Absent |
| | Da23 | KZnAl₂F₉/Al—45Si—45Cu | 70/30 | | Da23 | 100 | Large | Not discolored | Absent |
| | Da24 | KZnAl₂F₉/Al—90Si—1Cu | 70/30 | | Da24 | 100 | Large | Not discolored | Absent |
| | Da25 | KZnAl₂F₉/Al—1Si—90Cu | 70/30 | | Da25 | 100 | Large | Not discolored | Absent |
| | Da26 | KZnAl₂F₉/Al—1Si—1Zn | 70/30 | | Da26 | 100 | Large | Not discolored | Absent |
| | Da27 | KZnAl₂F₉/Al—10Si—10Zn | 70/30 | | Da27 | 100 | Large | Not discolored | Absent |
| | Da28 | KZnAl₂F₉/Al—25Si—25Zn | 70/30 | | Da28 | 100 | Large | Not discolored | Absent |
| | Da29 | KZnAl₂F₉/Al—45Si—45Zn | 70/30 | | Da29 | 100 | Large | Not discolored | Absent |
| | Da30 | KZnAl₂F₉/Al—90Si—1Zn | 70/30 | | Da30 | 100 | Large | Not discolored | Absent |
| | Da31 | KZnAl₂F₉/Al—1Si—90Zn | 70/30 | | Da31 | 100 | Large | Not discolored | Absent |
| | Da32 | KZnAl₂F₉/Al—1Cu—1Zn | 70/30 | | Da32 | 100 | Large | Not discolored | Absent |
| | Da33 | KZnAl₂F₉/Al—10Cu—10Zn | 70/30 | | Da33 | 100 | Large | Not discolored | Absent |
| | Da34 | KZnAl₂F₉/Al—25Cu—25Zn | 70/30 | | Da34 | 100 | Large | Not discolored | Absent |
| | Da35 | KZnAl₂F₉/Al—45Cu—45Zn | 70/30 | | Da35 | 100 | Large | Not discolored | Absent |
| | Da36 | KZnAl₂F₉/Al—90Cu—1Zn | 70/30 | | Da36 | 100 | Large | Not discolored | Absent |
| | Da37 | KZnAl₂F₉/Al—1Cu—90Zn | 70/30 | | Da37 | 100 | Large | Not discolored | Absent |
| | Da38 | KZnAl₂F₉/Al—1Si—1Cu—1Zn | 70/30 | | Da38 | 100 | Large | Not discolored | Absent |

TABLE 4-4-continued

| Specimen | Flux composition | Mixing ratio (%) | Specimen | Joining ratio (%) | Size of fillet | External appearance of surface of aluminum | Residue on surface of aluminum |
|---|---|---|---|---|---|---|---|
| Da39 | KZnAl$_2$F$_9$/Al—5Si—5Cu—5Zn | 70/30 | Da39 | 100 | Large | Not discolored | Absent |
| Da40 | KZnAl$_2$F$_9$/Al—10Si—10Cu—10Zn | 70/30 | Da40 | 100 | Large | Not discolored | Absent |
| Da41 | KZnAl$_2$F$_9$/Al—30Si—30Cu—30Cu | 70/30 | Da41 | 100 | Large | Not discolored | Absent |
| Da42 | KZnAl$_2$F$_9$/Al—90Si—1Cu—1Zn | 70/30 | Da42 | 100 | Large | Not discolored | Absent |
| Da43 | KZnAl$_2$F$_9$/Al—1Si—90Cu—1Zn | 70/30 | Da43 | 100 | Large | Not discolored | Absent |
| Da44 | KZnAl$_2$F$_9$/Al—1Si—1Cu—90Zn | 70/30 | Da44 | 100 | Large | Not discolored | Absent |

TABLE 4-5

| | Specimen | Flux composition | Mixing ratio (%) | | Specimen | Joining ratio (%) | Size of fillet | External appearance of surface of aluminum | Residue on surface of aluminum |
|---|---|---|---|---|---|---|---|---|---|
| Example 4 | Ea1 | CsZnAlF$_6$/Al | 70/30 | Example 4 | Ea1 | 100 | Large | Not discolored | Absent |
| | Ea2 | CsZnAlF$_6$/Si | 70/30 | | Ea2 | 100 | Large | Not discolored | Absent |
| | Ea3 | CsZnAlF$_6$/Cu | 70/30 | | Ea3 | 100 | Large | Not discolored | Absent |
| | Ea4 | CsZnAlF$_6$/Zn | 70/30 | | Ea4 | 100 | Large | Not discolored | Absent |
| | Ea5 | CsZnAlF$_6$/Al—1Si | 70/30 | | Ea5 | 100 | Large | Not discolored | Absent |
| | Ea6 | CsZnAlF$_6$/Al—10Si | 70/30 | | Ea6 | 100 | Large | Not discolored | Absent |
| | Ea7 | CsZnAlF$_6$/Al—50Si | 70/30 | | Ea7 | 100 | Large | Not discolored | Absent |
| | Ea8 | CsZnAlF$_6$/Al—90Si | 70/30 | | Ea8 | 100 | Large | Not discolored | Absent |
| | Ea9 | CsZnAlF$_6$/Al—1Cu | 70/30 | | Ea9 | 100 | Large | Not discolored | Absent |
| | Ea10 | CsZnAlF$_6$/Al—10Cu | 70/30 | | Ea10 | 100 | Large | Not discolored | Absent |
| | Ea11 | CsZnAlF$_6$/Al—50Cu | 70/30 | | Ea11 | 100 | Large | Not discolored | Absent |
| | Ea12 | CsZnAlF$_6$/Al—90Cu | 70/30 | | Ea12 | 100 | Large | Not discolored | Absent |
| | Ea13 | CsZnAlF$_6$/Al—1Zn | 70/30 | | Ea13 | 100 | Large | Not discolored | Absent |
| | Ea14 | CsZnAlF$_6$/Al—10Zn | 70/30 | | Ea14 | 100 | Large | Not discolored | Absent |
| | Ea15 | CsZnAlF$_6$/Al—50Zn | 70/30 | | Ea15 | 100 | Large | Not discolored | Absent |
| | Ea16 | CsZnAlF$_6$/Al—90Zn | 70/30 | | Ea16 | 100 | Large | Not discolored | Absent |
| | Ea17 | CsZnAlF$_6$/Cu—10Zn | 70/30 | | Ea17 | 100 | Large | Not discolored | Absent |
| | Ea18 | CsZnAlF$_6$/Cu—50Zn | 70/30 | | Ea18 | 100 | Large | Not discolored | Absent |
| | Ea19 | CsZnAlF$_6$/Cu—90Zn | 70/30 | | Ea19 | 100 | Large | Not discolored | Absent |
| | Ea20 | CsZnAlF$_6$/Al—1Si—1Cu | 70/30 | | Ea20 | 100 | Large | Not discolored | Absent |
| | Ea21 | CsZnAlF$_6$/Al—10Si—10Cu | 70/30 | | Ea21 | 100 | Large | Not discolored | Absent |
| | Ea22 | CsZnAlF$_6$/Al—25Si—25Cu | 70/30 | | Ea22 | 100 | Large | Not discolored | Absent |
| | Ea23 | CsZnAlF$_6$/Al—45Si—45Cu | 70/30 | | Ea23 | 100 | Large | Not discolored | Absent |
| | Ea24 | CsZnAlF$_6$/Al—90Si—1Cu | 70/30 | | Ea24 | 100 | Large | Not discolored | Absent |
| | Ea25 | CsZnAlF$_6$/Al—1Si—90Cu | 70/30 | | Ea25 | 100 | Large | Not discolored | Absent |
| | Ea26 | CsZnAlF$_6$/Al—1Si—1Zn | 70/30 | | Ea26 | 100 | Large | Not discolored | Absent |
| | Ea27 | CsZnAlF$_6$/Al—10Si—10Zn | 70/30 | | Ea27 | 100 | Large | Not discolored | Absent |
| | Ea28 | CsZnAlF$_6$/Al—25Si—25Zn | 70/30 | | Ea28 | 100 | Large | Not discolored | Absent |
| | Ea29 | CsZnAlF$_6$/Al—45Si—45Zn | 70/30 | | Ea29 | 100 | Large | Not discolored | Absent |
| | Ea30 | CsZnAlF$_6$/Al—90Si—1Zn | 70/30 | | Ea30 | 100 | Large | Not discolored | Absent |
| | Ea31 | CsZnAlF$_6$/Al—1Si—90Zn | 70/30 | | Ea31 | 100 | Large | Not discolored | Absent |
| | Ea32 | CsZnAlF$_6$/Al—1Cu—1Zn | 70/30 | | Ea32 | 100 | Large | Not discolored | Absent |
| | Ea33 | CsZnAlF$_6$/Al—10Cu—10Zn | 70/30 | | Ea33 | 100 | Large | Not discolored | Absent |
| | Ea34 | CsZnAlF$_6$/Al—25Cu—25Zn | 70/30 | | Ea34 | 100 | Large | Not discolored | Absent |
| | Ea35 | CsZnAlF$_6$/Al—45Cu—45Zn | 70/30 | | Ea35 | 100 | Large | Not discolored | Absent |
| | Ea36 | CsZnAlF$_6$/Al—90Cu—1Zn | 70/30 | | Ea36 | 100 | Large | Not discolored | Absent |
| | Ea37 | CsZnAlF$_6$/Al—1Cu—90Zn | 70/30 | | Ea37 | 100 | Large | Not discolored | Absent |
| | Ea38 | CsZnAlF$_6$/Al—1Si—1Cu—1Zn | 70/30 | | Ea38 | 100 | Large | Not discolored | Absent |
| | Ea39 | CsZnAlF$_6$/Al—5Si—5Cu—5Zn | 70/30 | | Ea39 | 100 | Large | Not discolored | Absent |
| | Ea40 | CsZnAlF$_6$/Al—10Si—10Cu—10Zn | 70/30 | | Ea40 | 100 | Large | Not discolored | Absent |
| | Ea41 | CsZnAlF$_6$/Al—30Si—30Cu—30Cu | 70/30 | | Ea41 | 100 | Large | Not discolored | Absent |
| | Ea42 | CsZnAlF$_6$/Al—90Si—1Cu—1Zn | 70/30 | | Ea42 | 100 | Large | Not discolored | Absent |
| | Ea43 | CsZnAlF$_6$/Al—1Si—90Cu—1Zn | 70/30 | | Ea43 | 100 | Large | Not discolored | Absent |
| | Ea44 | CsZnAlF$_6$/Al—1Si—1Cu—90Zn | 70/30 | | Ea44 | 100 | Large | Not discolored | Absent |

TABLE 4-6

| | Specimen | Flux composition | Mixing ratio (%) | | Specimen | Joining ratio (%) | Size of fillet | External appearance of surface of aluminum | Residue on surface of aluminum |
|---|---|---|---|---|---|---|---|---|---|
| Example 4 | Fa1 | Cs$_2$ZnAlF$_7$/Al | 70/30 | Example 4 | Fa1 | 100 | Large | Not discolored | Absent |
| | Fa2 | Cs$_2$ZnAlF$_7$/Si | 70/30 | | Fa2 | 100 | Large | Not discolored | Absent |
| | Fa3 | Cs$_2$ZnAlF$_7$/Cu | 70/30 | | Fa3 | 100 | Large | Not discolored | Absent |
| | Fa4 | Cs$_2$ZnAlF$_7$/Zn | 70/30 | | Fa4 | 100 | Large | Not discolored | Absent |

TABLE 4-6-continued

| Specimen | Flux composition | Mixing ratio (%) | Specimen | Joining ratio (%) | Size of fillet | External appearance of surface of aluminum | Residue on surface of aluminum |
|---|---|---|---|---|---|---|---|
| Fa5 | $Cs_2ZnAlF_7$/Al—1Si | 70/30 | Fa5 | 100 | Large | Not discolored | Absent |
| Fa6 | $Cs_2ZnAlF_7$/Al—10Si | 70/30 | Fa6 | 100 | Large | Not discolored | Absent |
| Fa7 | $Cs_2ZnAlF_7$/Al—50Si | 70/30 | Fa7 | 100 | Large | Not discolored | Absent |
| Fa8 | $Cs_2ZnAlF_7$/Al—90Si | 70/30 | Fa8 | 100 | Large | Not discolored | Absent |
| Fa9 | $Cs_2ZnAlF_7$/Al—1Cu | 70/30 | Fa9 | 100 | Large | Not discolored | Absent |
| Fa10 | $Cs_2ZnAlF_7$/Al—10Cu | 70/30 | Fa10 | 100 | Large | Not discolored | Absent |
| Fa11 | $Cs_2ZnAlF_7$/Al—50Cu | 70/30 | Fa11 | 100 | Large | Not discolored | Absent |
| Fa12 | $Cs_2ZnAlF_7$/Al—90Cu | 70/30 | Fa12 | 100 | Large | Not discolored | Absent |
| Fa13 | $Cs_2ZnAlF_7$/Al—1Zn | 70/30 | Fa13 | 100 | Large | Not discolored | Absent |
| Fa14 | $Cs_2ZnAlF_7$/Al—10Zn | 70/30 | Fa14 | 100 | Large | Not discolored | Absent |
| Fa15 | $Cs_2ZnAlF_7$/Al—50Zn | 70/30 | Fa15 | 100 | Large | Not discolored | Absent |
| Fa16 | $Cs_2ZnAlF_7$/Al—90Zn | 70/30 | Fa16 | 100 | Large | Not discolored | Absent |
| Fa17 | $Cs_2ZnAlF_7$/Cu—10Zn | 70/30 | Fa17 | 100 | Large | Not discolored | Absent |
| Fa18 | $Cs_2ZnAlF_7$/Cu—50Zn | 70/30 | Fa18 | 100 | Large | Not discolored | Absent |
| Fa19 | $Cs_2ZnAlF_7$/Cu—90Zn | 70/30 | Fa19 | 100 | Large | Not discolored | Absent |
| Fa20 | $Cs_2ZnAlF_7$/Al—1Si—1Cu | 70/30 | Fa20 | 100 | Large | Not discolored | Absent |
| Fa21 | $Cs_2ZnAlF_7$/Al—10Si—10Cu | 70/30 | Fa21 | 100 | Large | Not discolored | Absent |
| Fa22 | $Cs_2ZnAlF_7$/Al—25Si—25Cu | 70/30 | Fa22 | 100 | Large | Not discolored | Absent |
| Fa23 | $Cs_2ZnAlF_7$/Al—45Si—45Cu | 70/30 | Fa23 | 100 | Large | Not discolored | Absent |
| Fa24 | $Cs_2ZnAlF_7$/Al—90Si—1Cu | 70/30 | Fa24 | 100 | Large | Not discolored | Absent |
| Fa25 | $Cs_2ZnAlF_7$/Al—1Si—90Cu | 70/30 | Fa25 | 100 | Large | Not discolored | Absent |
| Fa26 | $Cs_2ZnAlF_7$/Al—1Si—1Zn | 70/30 | Fa26 | 100 | Large | Not discolored | Absent |
| Fa27 | $Cs_2ZnAlF_7$/Al—10Si—10Zn | 70/30 | Fa27 | 100 | Large | Not discolored | Absent |
| Fa28 | $Cs_2ZnAlF_7$/Al—25Si—25Zn | 70/30 | Fa28 | 100 | Large | Not discolored | Absent |
| Fa29 | $Cs_2ZnAlF_7$/Al—45Si—45Zn | 70/30 | Fa29 | 100 | Large | Not discolored | Absent |
| Fa30 | $Cs_2ZnAlF_7$/Al—90Si—1Zn | 70/30 | Fa30 | 100 | Large | Not discolored | Absent |
| Fa31 | $Cs_2ZnAlF_7$/Al—1Si—90Zn | 70/30 | Fa31 | 100 | Large | Not discolored | Absent |
| Fa32 | $Cs_2ZnAlF_7$/Al—1Cu—1Zn | 70/30 | Fa32 | 100 | Large | Not discolored | Absent |
| Fa33 | $Cs_2ZnAlF_7$/Al—10Cu—10Zn | 70/30 | Fa33 | 100 | Large | Not discolored | Absent |
| Fa34 | $Cs_2ZnAlF_7$/Al—25Cu—25Zn | 70/30 | Fa34 | 100 | Large | Not discolored | Absent |
| Fa35 | $Cs_2ZnAlF_7$/Al—45Cu—45Zn | 70/30 | Fa35 | 100 | Large | Not discolored | Absent |
| Fa36 | $Cs_2ZnAlF_7$/Al—90Cu—1Zn | 70/30 | Fa36 | 100 | Large | Not discolored | Absent |
| Fa37 | $Cs_2ZnAlF_7$/Al—1Cu—90Zn | 70/30 | Fa37 | 100 | Large | Not discolored | Absent |
| Fa38 | $Cs_2ZnAlF_7$/Al—1Si—1Cu—1Zn | 70/30 | Fa38 | 100 | Large | Not discolored | Absent |
| Fa39 | $Cs_2ZnAlF_7$/Al—5Si—5Cu—5Zn | 70/30 | Fa39 | 100 | Large | Not discolored | Absent |
| Fa40 | $Cs_2ZnAlF_7$/Al—10Si—10Cu—10Zn | 70/30 | Fa40 | 100 | Large | Not discolored | Absent |
| Fa41 | $Cs_2ZnAlF_7$/Al—30Si—30Cu—30Cu | 70/30 | Fa41 | 100 | Large | Not discolored | Absent |
| Fa42 | $Cs_2ZnAlF_7$/Al—90Si—1Cu—1Zn | 70/30 | Fa42 | 100 | Large | Not discolored | Absent |
| Fa43 | $Cs_2ZnAlF_7$/Al—1Si—90Cu—1Zn | 70/30 | Fa43 | 100 | Large | Not discolored | Absent |
| Fa44 | $Cs_2ZnAlF_7$/Al—1Si—1Cu—90Zn | 70/30 | Fa44 | 100 | Large | Not discolored | Absent |

TABLE 4-7

| | Specimen | Flux composition | Mixing ratio (%) | | Specimen | Joining ratio (%) | Size of fillet | External appearance of surface of aluminum | Residue on surface of aluminum |
|---|---|---|---|---|---|---|---|---|---|
| Example 4 | Ga1 | $CsZn_2AlF_8$/Al | 70/30 | Example 4 | Ga1 | 100 | Large | Not discolored | Absent |
| | Ga2 | $CsZn_2AlF_8$/Si | 70/30 | | Ga2 | 100 | Large | Not discolored | Absent |
| | Ga3 | $CsZn_2AlF_8$/Cu | 70/30 | | Ga3 | 100 | Large | Not discolored | Absent |
| | Ga4 | $CsZn_2AlF_8$/Zn | 70/30 | | Ga4 | 100 | Large | Not discolored | Absent |
| | Ga5 | $CsZn_2AlF_8$/Al—1Si | 70/30 | | Ga5 | 100 | Large | Not discolored | Absent |
| | Ga6 | $CsZn_2AlF_8$/Al—10Si | 70/30 | | Ga6 | 100 | Large | Not discolored | Absent |
| | Ga7 | $CsZn_2AlF_8$/Al—50Si | 70/30 | | Ga7 | 100 | Large | Not discolored | Absent |
| | Ga8 | $CsZn_2AlF_8$/Al—90Si | 70/30 | | Ga8 | 100 | Large | Not discolored | Absent |
| | Ga9 | $CsZn_2AlF_8$/Al—1Cu | 70/30 | | Ga9 | 100 | Large | Not discolored | Absent |
| | Ga10 | $CsZn_2AlF_8$/Al—10Cu | 70/30 | | Ga10 | 100 | Large | Not discolored | Absent |
| | Ga11 | $CsZn_2AlF_8$/Al—50Cu | 70/30 | | Ga11 | 100 | Large | Not discolored | Absent |
| | Ga12 | $CsZn_2AlF_8$/Al—90Cu | 70/30 | | Ga12 | 100 | Large | Not discolored | Absent |
| | Ga13 | $CsZn_2AlF_8$/Al—1Zn | 70/30 | | Ga13 | 100 | Large | Not discolored | Absent |
| | Ga14 | $CsZn_2AlF_8$/Al—10Zn | 70/30 | | Ga14 | 100 | Large | Not discolored | Absent |
| | Ga15 | $CsZn_2AlF_8$/Al—50Zn | 70/30 | | Ga15 | 100 | Large | Not discolored | Absent |
| | Ga16 | $CsZn_2AlF_8$/Al—90Zn | 70/30 | | Ga16 | 100 | Large | Not discolored | Absent |
| | Ga17 | $CsZn_2AlF_8$/Cu—10Zn | 70/30 | | Ga17 | 100 | Large | Not discolored | Absent |
| | Ga18 | $CsZn_2AlF_8$/Cu—50Zn | 70/30 | | Ga18 | 100 | Large | Not discolored | Absent |
| | Ga19 | $CsZn_2AlF_8$/Cu—90Zn | 70/30 | | Ga19 | 100 | Large | Not discolored | Absent |
| | Ga20 | $CsZn_2AlF_8$/Al—1Si—1Cu | 70/30 | | Ga20 | 100 | Large | Not discolored | Absent |
| | Ga21 | $CsZn_2AlF_8$/Al—10Si—10Cu | 70/30 | | Ga21 | 100 | Large | Not discolored | Absent |
| | Ga22 | $CsZn_2AlF_8$/Al—25Si—25Cu | 70/30 | | Ga22 | 100 | Large | Not discolored | Absent |
| | Ga23 | $CsZn_2AlF_8$/Al—45Si—45Cu | 70/30 | | Ga23 | 100 | Large | Not discolored | Absent |

TABLE 4-7-continued

| Specimen | Flux composition | Mixing ratio (%) | Specimen | Joining ratio (%) | Size of fillet | External appearance of surface of aluminum | Residue on surface of aluminum |
|---|---|---|---|---|---|---|---|
| Ga24 | $CsZn_2AlF_8$/Al—90Si—1Cu | 70/30 | Ga24 | 100 | Large | Not discolored | Absent |
| Ga25 | $CsZn_2AlF_8$/Al—1Si—90Cu | 70/30 | Ga25 | 100 | Large | Not discolored | Absent |
| Ga26 | $CsZn_2AlF_8$/Al—1Si—1Zn | 70/30 | Ga26 | 100 | Large | Not discolored | Absent |
| Ga27 | $CsZn_2AlF_8$/Al—10Si—10Zn | 70/30 | Ga27 | 100 | Large | Not discolored | Absent |
| Ga28 | $CsZn_2AlF_8$/Al—25Si—25Zn | 70/30 | Ga28 | 100 | Large | Not discolored | Absent |
| Ga29 | $CsZn_2AlF_8$/Al—45Si—45Zn | 70/30 | Ga29 | 100 | Large | Not discolored | Absent |
| Ga30 | $CsZn_2AlF_8$/Al—90Si—1Zn | 70/30 | Ga30 | 100 | Large | Not discolored | Absent |
| Ga31 | $CsZn_2AlF_8$/Al—1Si—90Zn | 70/30 | Ga31 | 100 | Large | Not discolored | Absent |
| Ga32 | $CsZn_2AlF_8$/Al—1Cu—1Zn | 70/30 | Ga32 | 100 | Large | Not discolored | Absent |
| Ga33 | $CsZn_2AlF_8$/Al—10Cu—10Zn | 70/30 | Ga33 | 100 | Large | Not discolored | Absent |
| Ga34 | $CsZn_2AlF_8$/Al—25Cu—25Zn | 70/30 | Ga34 | 100 | Large | Not discolored | Absent |
| Ga35 | $CsZn_2AlF_8$/Al—45Cu—45Zn | 70/30 | Ga35 | 100 | Large | Not discolored | Absent |
| Ga36 | $CsZn_2AlF_8$/Al—90Cu—1Zn | 70/30 | Ga36 | 100 | Large | Not discolored | Absent |
| Ga37 | $CsZn_2AlF_8$/Al—1Cu—90Zn | 70/30 | Ga37 | 100 | Large | Not discolored | Absent |
| Ga38 | $CsZn_2AlF_8$/Al—1Si—1Cu—1Zn | 70/30 | Ga38 | 100 | Large | Not discolored | Absent |
| Ga39 | $CsZn_2AlF_8$/Al—5Si—5Cu—5Zn | 70/30 | Ga39 | 100 | Large | Not discolored | Absent |
| Ga40 | $CsZn_2AlF_8$/Al—10Si—10Cu—10Zn | 70/30 | Ga40 | 100 | Large | Not discolored | Absent |
| Ga41 | $CsZn_2AlF_8$/Al—30Si—30Cu—30Cu | 70/30 | Ga41 | 100 | Large | Not discolored | Absent |
| Ga42 | $CsZn_2AlF_8$/Al—90Si—1Cu—1Zn | 70/30 | Ga42 | 100 | Large | Not discolored | Absent |
| Ga43 | $CsZn_2AlF_8$/Al—1Si—90Cu—1Zn | 70/30 | Ga43 | 100 | Large | Not discolored | Absent |
| Ga44 | $CsZn_2AlF_8$/Al—1Si—1Cu—90Zn | 70/30 | Ga44 | 100 | Large | Not discolored | Absent |

TABLE 4-8

| | Specimen | Flux composition | Mixing ratio (%) | Specimen | Joining ratio (%) | Size of fillet | External appearance of surface of aluminum | Residue on surface of aluminum |
|---|---|---|---|---|---|---|---|---|
| Example 4 | Ha1 | $CsZnAl_2F_9$/Al | 70/30 | Example 4 Ha1 | 100 | Large | Not discolored | Absent |
| | Ha2 | $CsZnAl_2F_9$/Si | 70/30 | Ha2 | 100 | Large | Not discolored | Absent |
| | Ha3 | $CsZnAl_2F_9$/Cu | 70/30 | Ha3 | 100 | Large | Not discolored | Absent |
| | Ha4 | $CsZnAl_2F_9$/Zn | 70/30 | Ha4 | 100 | Large | Not discolored | Absent |
| | Ha5 | $CsZnAl_2F_9$/Al—1Si | 70/30 | Ha5 | 100 | Large | Not discolored | Absent |
| | Ha6 | $CsZnAl_2F_9$/Al—10Si | 70/30 | Ha6 | 100 | Large | Not discolored | Absent |
| | Ha7 | $CsZnAl_2F_9$/Al—50Si | 70/30 | Ha7 | 100 | Large | Not discolored | Absent |
| | Ha8 | $CsZnAl_2F_9$/Al—90Si | 70/30 | Ha8 | 100 | Large | Not discolored | Absent |
| | Ha9 | $CsZnAl_2F_9$/Al—1Cu | 70/30 | Ha9 | 100 | Large | Not discolored | Absent |
| | Ha10 | $CsZnAl_2F_9$/Al—10Cu | 70/30 | Ha10 | 100 | Large | Not discolored | Absent |
| | Ha11 | $CsZnAl_2F_9$/Al—50Cu | 70/30 | Ha11 | 100 | Large | Not discolored | Absent |
| | Ha12 | $CsZnAl_2F_9$/Al—90Cu | 70/30 | Ha12 | 100 | Large | Not discolored | Absent |
| | Ha13 | $CsZnAl_2F_9$/Al—1Zn | 70/30 | Ha13 | 100 | Large | Not discolored | Absent |
| | Ha14 | $CsZnAl_2F_9$/Al—10Zn | 70/30 | Ha14 | 100 | Large | Not discolored | Absent |
| | Ha15 | $CsZnAl_2F_9$/Al—50Zn | 70/30 | Ha15 | 100 | Large | Not discolored | Absent |
| | Ha16 | $CsZnAl_2F_9$/Al—90Zn | 70/30 | Ha16 | 100 | Large | Not discolored | Absent |
| | Ha17 | $CsZnAl_2F_9$/Cu—10Zn | 70/30 | Ha17 | 100 | Large | Not discolored | Absent |
| | Ha18 | $CsZnAl_2F_9$/Cu—50Zn | 70/30 | Ha18 | 100 | Large | Not discolored | Absent |
| | Ha19 | $CsZnAl_2F_9$/Cu—90Zn | 70/30 | Ha19 | 100 | Large | Not discolored | Absent |
| | Ha20 | $CsZnAl_2F_9$/Al—1Si—1Cu | 70/30 | Ha20 | 100 | Large | Not discolored | Absent |
| | Ha21 | $CsZnAl_2F_9$/Al—10Si—10Cu | 70/30 | Ha21 | 100 | Large | Not discolored | Absent |
| | Ha22 | $CsZnAl_2F_9$/Al—25Si—25Cu | 70/30 | Ha22 | 100 | Large | Not discolored | Absent |
| | Ha23 | $CsZnAl_2F_9$/Al—45Si—45Cu | 70/30 | Ha23 | 100 | Large | Not discolored | Absent |
| | Ha24 | $CsZnAl_2F_9$/Al—90Si—1Cu | 70/30 | Ha24 | 100 | Large | Not discolored | Absent |
| | Ha25 | $CsZnAl_2F_9$/Al—1Si—90Cu | 70/30 | Ha25 | 100 | Large | Not discolored | Absent |
| | Ha26 | $CsZnAl_2F_9$/Al—1Si—1Zn | 70/30 | Ha26 | 100 | Large | Not discolored | Absent |
| | Ha27 | $CsZnAl_2F_9$/Al—10Si—10Zn | 70/30 | Ha27 | 100 | Large | Not discolored | Absent |
| | Ha28 | $CsZnAl_2F_9$/Al—25Si—25Zn | 70/30 | Ha28 | 100 | Large | Not discolored | Absent |
| | Ha29 | $CsZnAl_2F_9$/Al—45Si—45Zn | 70/30 | Ha29 | 100 | Large | Not discolored | Absent |
| | Ha30 | $CsZnAl_2F_9$/Al—90Si—1Zn | 70/30 | Ha30 | 100 | Large | Not discolored | Absent |
| | Ha31 | $CsZnAl_2F_9$/Al—1Si—90Zn | 70/30 | Ha31 | 100 | Large | Not discolored | Absent |
| | Ha32 | $CsZnAl_2F_9$/Al—1Cu—1Zn | 70/30 | Ha32 | 100 | Large | Not discolored | Absent |
| | Ha33 | $CsZnAl_2F_9$/Al—10Cu—10Zn | 70/30 | Ha33 | 100 | Large | Not discolored | Absent |
| | Ha34 | $CsZnAl_2F_9$/Al—25Cu—25Zn | 70/30 | Ha34 | 100 | Large | Not discolored | Absent |
| | Ha35 | $CsZnAl_2F_9$/Al—45Cu—45Zn | 70/30 | Ha35 | 100 | Large | Not discolored | Absent |
| | Ha36 | $CsZnAl_2F_9$/Al—90Cu—1Zn | 70/30 | Ha36 | 100 | Large | Not discolored | Absent |
| | Ha37 | $CsZnAl_2F_9$/Al—1Cu—90Zn | 70/30 | Ha37 | 100 | Large | Not discolored | Absent |
| | Ha38 | $CsZnAl_2F_9$/Al—1Si—1Cu—1Zn | 70/30 | Ha38 | 100 | Large | Not discolored | Absent |
| | Ha39 | $CsZnAl_2F_9$/Al—5Si—5Cu—5Zn | 70/30 | Ha39 | 100 | Large | Not discolored | Absent |
| | Ha40 | $CsZnAl_2F_9$/Al—10Si—10Cu—10Zn | 70/30 | Ha40 | 100 | Large | Not discolored | Absent |
| | Ha41 | $CsZnAl_2F_9$/Al—30Si—30Cu—30Cu | 70/30 | Ha41 | 100 | Large | Not discolored | Absent |

TABLE 4-8-continued

| Specimen | Flux composition | Mixing ratio (%) | Specimen | Joining ratio (%) | Size of fillet | External appearance of surface of aluminum | Residue on surface of aluminum |
|---|---|---|---|---|---|---|---|
| Ha42 | CsZnAl$_2$F$_9$/Al—90Si—1Cu—1Zn | 70/30 | Ha42 | 100 | Large | Not discolored | Absent |
| Ha43 | CsZnAl$_2$F$_9$/Al—1Si—90Cu—1Zn | 70/30 | Ha43 | 100 | Large | Not discolored | Absent |
| Ha44 | CsZnAl$_2$F$_9$/Al—1Si—1Cu—90Zn | 70/30 | Ha44 | 100 | Large | Not discolored | Absent |

TABLE 4-9

| | Specimen | Flux composition | Mixing ratio (%) | | Specimen | Joining ratio (%) | Size of fillet | External appearance of surface of aluminum | Residue on surface of aluminum |
|---|---|---|---|---|---|---|---|---|---|
| Comparative Example 4 | Aa45 | KZnAlF$_6$/Al | 30/70 | Comparative Example 4 | Aa45 | 30 | Small | Not discolored | Present |
| | Aa46 | KZnAlF$_6$/Si | 30/70 | | Aa46 | 90 | Large | Not discolored | Present |
| | Aa47 | KZnAlF$_6$/Cu | 30/70 | | Aa47 | 60 | Small | Not discolored | Present |
| | Aa48 | KZnAlF$_6$/Zn | 30/70 | | Aa48 | 50 | Small | Not discolored | Present |
| | Aa49 | KZnAlF$_6$/Al—1Si | 30/70 | | Aa49 | 35 | Small | Not discolored | Present |
| | Aa50 | KZnAlF$_6$/Al—10Si | 30/70 | | Aa50 | 40 | Small | Not discolored | Present |
| | Aa51 | KZnAlF$_6$/Al—50Si | 30/70 | | Aa51 | 70 | Medium | Not discolored | Present |
| | Aa52 | KZnAlF$_6$/Al—90Si | 30/70 | | Aa52 | 80 | Large | Not discolored | Present |
| | Aa53 | KZnAlF$_6$/Al—1Cu | 30/70 | | Aa53 | 30 | Small | Not discolored | Present |
| | Aa54 | KZnAlF$_6$/Al—10Cu | 30/70 | | Aa54 | 35 | Small | Not discolored | Present |
| | Aa55 | KZnAlF$_6$/Al—50Cu | 30/70 | | Aa55 | 50 | Small | Not discolored | Present |
| | Aa56 | KZnAlF$_6$/Al—90Cu | 30/70 | | Aa56 | 60 | Small | Not discolored | Present |
| | Aa57 | KZnAlF$_6$/Al—1Zn | 30/70 | | Aa57 | 30 | Small | Not discolored | Present |
| | Aa58 | KZnAlF$_6$/Al—10Zn | 30/70 | | Aa58 | 35 | Small | Not discolored | Present |
| | Aa59 | KZnAlF$_6$/Al—50Zn | 30/70 | | Aa59 | 40 | Small | Not discolored | Present |
| | Aa60 | KZnAlF$_6$/Al—90Zn | 30/70 | | Aa60 | 50 | Small | Not discolored | Present |
| | Aa61 | KZnAlF$_6$/Cu—10Zn | 30/70 | | Aa61 | 60 | Small | Not discolored | Present |
| | Aa62 | KZnAlF$_6$/Cu—50Zn | 30/70 | | Aa62 | 55 | Small | Not discolored | Present |
| | Aa63 | KZnAlF$_6$/Cu—90Zn | 30/70 | | Aa63 | 50 | Small | Not discolored | Present |
| | Aa64 | KZnAlF$_6$/Al—1Si—1Cu | 30/70 | | Aa64 | 30 | Small | Not discolored | Present |
| | Aa65 | KZnAlF$_6$/Al—10Si—10Cu | 30/70 | | Aa65 | 40 | Small | Not discolored | Present |
| | Aa66 | KZnAlF$_6$/Al—25Si—25Cu | 30/70 | | Aa66 | 50 | Medium | Not discolored | Present |
| | Aa67 | KZnAlF$_6$/Al—45Si—45Cu | 30/70 | | Aa67 | 60 | Medium | Not discolored | Present |
| | Aa68 | KZnAlF$_6$/Al—90Si—1Cu | 30/70 | | Aa68 | 80 | Large | Not discolored | Present |
| | Aa69 | KZnAlF$_6$/Al—1Si—90Cu | 30/70 | | Aa69 | 60 | Small | Not discolored | Present |
| | Aa70 | KZnAlF$_6$/Al—1Si—1Zn | 30/70 | | Aa70 | 35 | Small | Not discolored | Present |
| | Aa71 | KZnAlF$_6$/Al—10Si—10Zn | 30/70 | | Aa71 | 40 | Small | Not discolored | Present |
| | Aa72 | KZnAlF$_6$/Al—25Si—25Zn | 30/70 | | Aa72 | 45 | Medium | Not discolored | Present |
| | Aa73 | KZnAlF$_6$/Al—45Si—45Zn | 30/70 | | Aa73 | 55 | Medium | Not discolored | Present |
| | Aa74 | KZnAlF$_6$/Al—90Si—1Zn | 30/70 | | Aa74 | 80 | Large | Not discolored | Present |
| | Aa75 | KZnAlF$_6$/Al—1Si—90Zn | 30/70 | | Aa75 | 60 | Small | Not discolored | Present |
| | Aa76 | KZnAlF$_6$/Al—1Cu—1Zn | 30/70 | | Aa76 | 30 | Small | Not discolored | Present |
| | Aa77 | KZnAlF$_6$/Al—10Cu—10Zn | 30/70 | | Aa77 | 35 | Small | Not discolored | Present |
| | Aa78 | KZnAlF$_6$/Al—25Cu—25Zn | 30/70 | | Aa78 | 40 | Small | Not discolored | Present |
| | Aa79 | KZnAlF$_6$/Al—45Cu—45Zn | 30/70 | | Aa79 | 50 | Small | Not discolored | Present |
| | Aa80 | KZnAlF$_6$/Al—90Cu—1Zn | 30/70 | | Aa80 | 60 | Small | Not discolored | Present |
| | Aa81 | KZnAlF$_6$/Al—1Cu—90Zn | 30/70 | | Aa81 | 50 | Small | Not discolored | Present |
| | Aa82 | KZnAlF$_6$/Al—1Si—1Cu—1Zn | 30/70 | | Aa82 | 35 | Small | Not discolored | Present |
| | Aa83 | KZnAlF$_6$/Al—5Si—5Cu—5Zn | 30/70 | | Aa83 | 40 | Small | Not discolored | Present |
| | Aa84 | KZnAlF$_6$/Al—10Si—10Cu—10Zn | 30/70 | | Aa84 | 50 | Small | Not discolored | Present |
| | Aa85 | KZnAlF$_6$/Al—30Si—30Cu—30Cu | 30/70 | | Aa85 | 55 | Medium | Not discolored | Present |
| | Aa86 | KZnAlF$_6$/Al—90Si—1Cu—1Zn | 30/70 | | Aa86 | 80 | Large | Not discolored | Present |
| | Aa87 | KZnAlF$_6$/Al—1Si—90Cu—1Zn | 30/70 | | Aa87 | 60 | Small | Not discolored | Present |
| | Aa88 | KZnAlF$_6$/Al—1Si—1Cu—90Zn | 30/70 | | Aa88 | 50 | Small | Not discolored | Present |

TABLE 4-10

| | Specimen | Flux composition | Mixing ratio (%) | | Specimen | Joining ratio (%) | Size of fillet | External appearance of surface of aluminum | Residue on surface of aluminum |
|---|---|---|---|---|---|---|---|---|---|
| Comparative Example 4 | Ba45 | K$_2$ZnAlF$_7$/Al | 30/70 | Comparative Example 4 | Ba45 | 30 | Small | Not discolored | Present |
| | Ba46 | K$_2$ZnAlF$_7$/Si | 30/70 | | Ba46 | 90 | Large | Not discolored | Present |
| | Ba47 | K$_2$ZnAlF$_7$/Cu | 30/70 | | Ba47 | 60 | Small | Not discolored | Present |
| | Ba48 | K$_2$ZnAlF$_7$/Zn | 30/70 | | Ba48 | 50 | Small | Not discolored | Present |
| | Ba49 | K$_2$ZnAlF$_7$/Al—1Si | 30/70 | | Ba49 | 35 | Small | Not discolored | Present |
| | Ba50 | K$_2$ZnAlF$_7$/Al—10Si | 30/70 | | Ba50 | 40 | Small | Not discolored | Present |
| | Ba51 | K$_2$ZnAlF$_7$/Al—50Si | 30/70 | | Ba51 | 70 | Medium | Not discolored | Present |

TABLE 4-10-continued

| Specimen | Flux composition | Mixing ratio (%) | Specimen | Joining ratio (%) | Size of fillet | External appearance of surface of aluminum | Residue on surface of aluminum |
|---|---|---|---|---|---|---|---|
| Ba52 | $K_2ZnAlF_7$/Al—90Si | 30/70 | Ba52 | 80 | Small | Not discolored | Present |
| Ba53 | $K_2ZnAlF_7$/Al—1Cu | 30/70 | Ba53 | 30 | Small | Not discolored | Present |
| Ba54 | $K_2ZnAlF_7$/Al—10Cu | 30/70 | Ba54 | 35 | Small | Not discolored | Present |
| Ba55 | $K_2ZnAlF_7$/Al—50Cu | 30/70 | Ba55 | 50 | Large | Not discolored | Present |
| Ba56 | $K_2ZnAlF_7$/Al—90Cu | 30/70 | Ba56 | 60 | Small | Not discolored | Present |
| Ba57 | $K_2ZnAlF_7$/Al—1Zn | 30/70 | Ba57 | 30 | Small | Not discolored | Present |
| Ba58 | $K_2ZnAlF_7$/Al—10Zn | 30/70 | Ba58 | 35 | Small | Not discolored | Present |
| Ba59 | $K_2ZnAlF_7$/Al—50Zn | 30/70 | Ba59 | 40 | Small | Not discolored | Present |
| Ba60 | $K_2ZnAlF_7$/Al—90Zn | 30/70 | Ba60 | 50 | Small | Not discolored | Present |
| Ba61 | $K_2ZnAlF_7$/Cu—10Zn | 30/70 | Ba61 | 60 | Small | Not discolored | Present |
| Ba62 | $K_2ZnAlF_7$/Cu—50Zn | 30/70 | Ba62 | 55 | Small | Not discolored | Present |
| Ba63 | $K_2ZnAlF_7$/Cu—90Zn | 30/70 | Ba63 | 50 | Small | Not discolored | Present |
| Ba64 | $K_2ZnAlF_7$/Al—1Si—1Cu | 30/70 | Ba64 | 30 | Small | Not discolored | Present |
| Ba65 | $K_2ZnAlF_7$/Al—10Si—10Cu | 30/70 | Ba65 | 40 | Small | Not discolored | Present |
| Ba66 | $K_2ZnAlF_7$/Al—25Si—25Cu | 30/70 | Ba66 | 50 | Medium | Not discolored | Present |
| Ba67 | $K_2ZnAlF_7$/Al—45Si—45Cu | 30/70 | Ba67 | 60 | Medium | Not discolored | Present |
| Ba68 | $K_2ZnAlF_7$/Al—90Si—1Cu | 30/70 | Ba68 | 80 | Large | Not discolored | Present |
| Ba69 | $K_2ZnAlF_7$/Al—1Si—90Cu | 30/70 | Ba69 | 60 | Small | Not discolored | Present |
| Ba70 | $K_2ZnAlF_7$/Al—1Si—1Zn | 30/70 | Ba70 | 35 | Small | Not discolored | Present |
| Ba71 | $K_2ZnAlF_7$/Al—10Si—10Zn | 30/70 | Ba71 | 40 | Small | Not discolored | Present |
| Ba72 | $K_2ZnAlF_7$/Al—25Si—25Zn | 30/70 | Ba72 | 45 | Medium | Not discolored | Present |
| Ba73 | $K_2ZnAlF_7$/Al—45Si—45Zn | 30/70 | Ba73 | 55 | Medium | Not discolored | Present |
| Ba74 | $K_2ZnAlF_7$/Al—90Si—1Zn | 30/70 | Ba74 | 80 | Large | Not discolored | Present |
| Ba75 | $K_2ZnAlF_7$/Al—1Si—90Zn | 30/70 | Ba75 | 60 | Small | Not discolored | Present |
| Ba76 | $K_2ZnAlF_7$/Al—1Cu—1Zn | 30/70 | Ba76 | 30 | Small | Not discolored | Present |
| Ba77 | $K_2ZnAlF_7$/Al—10Cu—10Zn | 30/70 | Ba77 | 35 | Small | Not discolored | Present |
| Ba78 | $K_2ZnAlF_7$/Al—25Cu—25Zn | 30/70 | Ba78 | 40 | Small | Not discolored | Present |
| Ba79 | $K_2ZnAlF_7$/Al—45Cu—45Zn | 30/70 | Ba79 | 50 | Small | Not discolored | Present |
| Ba80 | $K_2ZnAlF_7$/Al—90Cu—1Zn | 30/70 | Ba80 | 60 | Small | Not discolored | Present |
| Ba81 | $K_2ZnAlF_7$/Al—1Cu—90Zn | 30/70 | Ba81 | 50 | Small | Not discolored | Present |
| Ba82 | $K_2ZnAlF_7$/Al—1Si—1Cu—1Zn | 30/70 | Ba82 | 35 | Small | Not discolored | Present |
| Ba83 | $K_2ZnAlF_7$/Al—5Si—5Cu—5Zn | 30/70 | Ba83 | 40 | Small | Not discolored | Present |
| Ba84 | $K_2ZnAlF_7$/Al—10Si—10Cu—10Zn | 30/70 | Ba84 | 50 | Small | Not discolored | Present |
| Ba85 | $K_2ZnAlF_7$/Al—30Si—30Cu—30Cu | 30/70 | Ba85 | 55 | Medium | Not discolored | Present |
| Ba86 | $K_2ZnAlF_7$/Al—90Si—1Cu—1Zn | 30/70 | Ba86 | 80 | Large | Not discolored | Present |
| Ba87 | $K_2ZnAlF_7$/Al—1Si—90Cu—1Zn | 30/70 | Ba87 | 60 | Small | Not discolored | Present |
| Ba88 | $K_2ZnAlF_7$/Al—1Si—1Cu—90Zn | 30/70 | Ba88 | 50 | Small | Not discolored | Present |

TABLE 4-11

| | Specimen | Flux composition | Mixing ratio (%) | | Specimen | Joining ratio (%) | Size of fillet | External appearance of surface of aluminum | Residue on surface of aluminum |
|---|---|---|---|---|---|---|---|---|---|
| Comparative Example 4 | Ca45 | $KZn_2AlF_8$/Al | 30/70 | Comparative Example 4 | Ca45 | 30 | Small | Not discolored | Present |
| | Ca46 | $KZn_2AlF_8$/Si | 30/70 | | Ca46 | 90 | Large | Not discolored | Present |
| | Ca47 | $KZn_2AlF_8$/Cu | 30/70 | | Ca47 | 60 | Small | Not discolored | Present |
| | Ca48 | $KZn_2AlF_8$/Zn | 30/70 | | Ca48 | 50 | Small | Not discolored | Present |
| | Ca49 | $KZn_2AlF_8$/Al—1Si | 30/70 | | Ca49 | 35 | Small | Not discolored | Present |
| | Ca50 | $KZn_2AlF_8$/Al—10Si | 30/70 | | Ca50 | 40 | Small | Not discolored | Present |
| | Ca51 | $KZn_2AlF_8$/Al—50Si | 30/70 | | Ca51 | 70 | Medium | Not discolored | Present |
| | Ca52 | $KZn_2AlF_8$/Al—90Si | 30/70 | | Ca52 | 80 | Large | Not discolored | Present |
| | Ca53 | $KZn_2AlF_8$/Al—1Cu | 30/70 | | Ca53 | 30 | Small | Not discolored | Present |
| | Ca54 | $KZn_2AlF_8$/Al—10Cu | 30/70 | | Ca54 | 35 | Small | Not discolored | Present |
| | Ca55 | $KZn_2AlF_8$/Al—50Cu | 30/70 | | Ca55 | 50 | Medium | Not discolored | Present |
| | Ca56 | $KZn_2AlF_8$/Al—90Cu | 30/70 | | Ca56 | 60 | Small | Not discolored | Present |
| | Ca57 | $KZn_2AlF_8$/Al—1Zn | 30/70 | | Ca57 | 30 | Small | Not discolored | Present |
| | Ca58 | $KZn_2AlF_8$/Al—10Zn | 30/70 | | Ca58 | 35 | Small | Not discolored | Present |
| | Ca59 | $KZn_2AlF_8$/Al—50Zn | 30/70 | | Ca59 | 40 | Small | Not discolored | Present |
| | Ca60 | $KZn_2AlF_8$/Al—90Zn | 30/70 | | Ca60 | 50 | Small | Not discolored | Present |
| | Ca61 | $KZn_2AlF_8$/Cu—10Zn | 30/70 | | Ca61 | 60 | Small | Not discolored | Present |
| | Ca62 | $KZn_2AlF_8$/Cu—50Zn | 30/70 | | Ca62 | 55 | Small | Not discolored | Present |
| | Ca63 | $KZn_2AlF_8$/Cu—90Zn | 30/70 | | Ca63 | 50 | Small | Not discolored | Present |
| | Ca64 | $KZn_2AlF_8$/Al—1Si—1Cu | 30/70 | | Ca64 | 30 | Small | Not discolored | Present |
| | Ca65 | $KZn_2AlF_8$/Al—10Si—10Cu | 30/70 | | Ca65 | 40 | Small | Not discolored | Present |
| | Ca66 | $KZn_2AlF_8$/Al—25Si—25Cu | 30/70 | | Ca66 | 50 | Medium | Not discolored | Present |
| | Ca67 | $KZn_2AlF_8$/Al—45Si—45Cu | 30/70 | | Ca67 | 60 | Medium | Not discolored | Present |
| | Ca68 | $KZn_2AlF_8$/Al—90Si—1Cu | 30/70 | | Ca68 | 80 | Large | Not discolored | Present |
| | Ca69 | $KZn_2AlF_8$/Al—1Si—90Cu | 30/70 | | Ca69 | 60 | Small | Not discolored | Present |
| | Ca70 | $KZn_2AlF_8$/Al—1Si—1Zn | 30/70 | | Ca70 | 35 | Small | Not discolored | Present |

TABLE 4-11-continued

| Specimen | Flux composition | Mixing ratio (%) | Specimen | Joining ratio (%) | Size of fillet | External appearance of surface of aluminum | Residue on surface of aluminum |
|---|---|---|---|---|---|---|---|
| Ca71 | KZn₂AlF₈/Al—10Si—10Zn | 30/70 | Ca71 | 40 | Small | Not discolored | Present |
| Ca72 | KZn₂AlF₈/Al—25Si—25Zn | 30/70 | Ca72 | 45 | Medium | Not discolored | Present |
| Ca73 | KZn₂AlF₈/Al—45Si—45Zn | 30/70 | Ca73 | 55 | Medium | Not discolored | Present |
| Ca74 | KZn₂AlF₈/Al—90Si—1Zn | 30/70 | Ca74 | 80 | Large | Not discolored | Present |
| Ca75 | KZn₂AlF₈/Al—1Si—90Zn | 30/70 | Ca75 | 60 | Small | Not discolored | Present |
| Ca76 | KZn₂AlF₈/Al—1Cu—1Zn | 30/70 | Ca76 | 30 | Small | Not discolored | Present |
| Ca77 | KZn₂AlF₈/Al—10Cu—10Zn | 30/70 | Ca77 | 35 | Small | Not discolored | Present |
| Ca78 | KZn₂AlF₈/Al—25Cu—25Zn | 30/70 | Ca78 | 40 | Small | Not discolored | Present |
| Ca79 | KZn₂AlF₈/Al—45Cu—45Zn | 30/70 | Ca79 | 50 | Small | Not discolored | Present |
| Ca80 | KZn₂AlF₈/Al—90Cu—1Zn | 30/70 | Ca80 | 60 | Small | Not discolored | Present |
| Ca81 | KZn₂AlF₈/Al—1Cu—90Zn | 30/70 | Ca81 | 50 | Small | Not discolored | Present |
| Ca82 | KZn₂AlF₈/Al—1Si—1Cu—1Zn | 30/70 | Ca82 | 35 | Small | Not discolored | Present |
| Ca83 | KZn₂AlF₈/Al—5Si—5Cu—5Zn | 30/70 | Ca83 | 40 | Small | Not discolored | Present |
| Ca84 | KZn₂AlF₈/Al—10Si—10Cu—10Zn | 30/70 | Ca84 | 50 | Small | Not discolored | Present |
| Ca85 | KZn₂AlF₈/Al—30Si—30Cu—30Cu | 30/70 | Ca85 | 55 | Medium | Not discolored | Present |
| Ca86 | KZn₂AlF₈/Al—90Si—1Cu—1Zn | 30/70 | Ca86 | 80 | Large | Not discolored | Present |
| Ca87 | KZn₂AlF₈/Al—1Si—90Cu—1Zn | 30/70 | Ca87 | 60 | Small | Not discolored | Present |
| Ca88 | KZn₂AlF₈/Al—1Si—1Cu—90Zn | 30/70 | Ca88 | 50 | Small | Not discolored | Present |

TABLE 4-12

| | Specimen | Flux composition | Mixing ratio (%) | | Specimen | Joining ratio (%) | Size of fillet | External appearance of surface of aluminum | Residue on surface of aluminum |
|---|---|---|---|---|---|---|---|---|---|
| Comparative Example 4 | Da45 | KZnAl₂F₉/Al | 30/70 | Comparative Example 4 | Da45 | 30 | Small | Not discolored | Present |
| | Da46 | KZnAl₂F₉/Si | 30/70 | | Da46 | 90 | Large | Not discolored | Present |
| | Da47 | KZnAl₂F₉/Cu | 30/70 | | Da47 | 60 | Small | Not discolored | Present |
| | Da48 | KZnAl₂F₉/Zn | 30/70 | | Da48 | 50 | Small | Not discolored | Present |
| | Da49 | KZnAl₂F₉/Al—1Si | 30/70 | | Da49 | 35 | Large | Not discolored | Present |
| | Da50 | KZnAl₂F₉/Al—10Si | 30/70 | | Da50 | 40 | Small | Not discolored | Present |
| | Da51 | KZnAl₂F₉/Al—50Si | 30/70 | | Da51 | 70 | Small | Not discolored | Present |
| | Da52 | KZnAl₂F₉/Al—90Si | 30/70 | | Da52 | 80 | Small | Not discolored | Present |
| | Da53 | KZnAl₂F₉/Al—1Cu | 30/70 | | Da53 | 30 | Small | Not discolored | Present |
| | Da54 | KZnAl₂F₉/Al—10Cu | 30/70 | | Da54 | 35 | Medium | Not discolored | Present |
| | Da55 | KZnAl₂F₉/Al—50Cu | 30/70 | | Da55 | 50 | Large | Not discolored | Present |
| | Da56 | KZnAl₂F₉/Al—90Cu | 30/70 | | Da56 | 60 | Small | Not discolored | Present |
| | Da57 | KZnAl₂F₉/Al—1Zn | 30/70 | | Da57 | 30 | Small | Not discolored | Present |
| | Da58 | KZnAl₂F₉/Al—10Zn | 30/70 | | Da58 | 35 | Small | Not discolored | Present |
| | Da59 | KZnAl₂F₉/Al—50Zn | 30/70 | | Da59 | 40 | Small | Not discolored | Present |
| | Da60 | KZnAl₂F₉/Al—90Zn | 30/70 | | Da60 | 50 | Small | Not discolored | Present |
| | Da61 | KZnAl₂F₉/Cu—10Zn | 30/70 | | Da61 | 60 | Small | Not discolored | Present |
| | Da62 | KZnAl₂F₉/Cu—50Zn | 30/70 | | Da62 | 55 | Small | Not discolored | Present |
| | Da63 | KZnAl₂F₉/Cu—90Zn | 30/70 | | Da63 | 50 | Small | Not discolored | Present |
| | Da64 | KZnAl₂F₉/Al—1Si—1Cu | 30/70 | | Da64 | 30 | Small | Not discolored | Present |
| | Da65 | KZnAl₂F₉/Al—10Si—10Cu | 30/70 | | Da65 | 40 | Small | Not discolored | Present |
| | Da66 | KZnAl₂F₉/Al—25Si—25Cu | 30/70 | | Da66 | 50 | Medium | Not discolored | Present |
| | Da67 | KZnAl₂F₉/Al—45Si—45Cu | 30/70 | | Da67 | 60 | Medium | Not discolored | Present |
| | Da68 | KZnAl₂F₉/Al—90Si—1Cu | 30/70 | | Da68 | 80 | Large | Not discolored | Present |
| | Da69 | KZnAl₂F₉/Al—1Si—90Cu | 30/70 | | Da69 | 60 | Small | Not discolored | Present |
| | Da70 | KZnAl₂F₉/Al—1Si—1Zn | 30/70 | | Da70 | 35 | Small | Not discolored | Present |
| | Da71 | KZnAl₂F₉/Al—10Si—10Zn | 30/70 | | Da71 | 40 | Small | Not discolored | Present |
| | Da72 | KZnAl₂F₉/Al—25Si—25Zn | 30/70 | | Da72 | 45 | Medium | Not discolored | Present |
| | Da73 | KZnAl₂F₉/Al—45Si—45Zn | 30/70 | | Da73 | 55 | Medium | Not discolored | Present |
| | Da74 | KZnAl₂F₉/Al—90Si—1Zn | 30/70 | | Da74 | 80 | Large | Not discolored | Present |
| | Da75 | KZnAl₂F₉/Al—1Si—90Zn | 30/70 | | Da75 | 60 | Small | Not discolored | Present |
| | Da76 | KZnAl₂F₉/Al—1Cu—1Zn | 30/70 | | Da76 | 30 | Small | Not discolored | Present |
| | Da77 | KZnAl₂F₉/Al—10Cu—10Zn | 30/70 | | Da77 | 35 | Small | Not discolored | Present |
| | Da78 | KZnAl₂F₉/Al—25Cu—25Zn | 30/70 | | Da78 | 40 | Small | Not discolored | Present |
| | Da79 | KZnAl₂F₉/Al—45Cu—45Zn | 30/70 | | Da79 | 50 | Small | Not discolored | Present |
| | Da80 | KZnAl₂F₉/Al—90Cu—1Zn | 30/70 | | Da80 | 60 | Small | Not discolored | Present |
| | Da81 | KZnAl₂F₉/Al—1Cu—90Zn | 30/70 | | Da81 | 50 | Small | Not discolored | Present |
| | Da82 | KZnAl₂F₉/Al—1Si—1Cu—1Zn | 30/70 | | Da82 | 35 | Small | Not discolored | Present |
| | Da83 | KZnAl₂F₉/Al—5Si—5Cu—5Zn | 30/70 | | Da83 | 40 | Small | Not discolored | Present |
| | Da84 | KZnAl₂F₉/Al—10Si—10Cu—10Zn | 30/70 | | Da84 | 50 | Small | Not discolored | Present |
| | Da85 | KZnAl₂F₉/Al—30Si—30Cu—30Cu | 30/70 | | Da85 | 55 | Medium | Not discolored | Present |
| | Da86 | KZnAl₂F₉/Al—90Si—1Cu—1Zn | 30/70 | | Da86 | 80 | Large | Not discolored | Present |
| | Da87 | KZnAl₂F₉/Al—1Si—90Cu—1Zn | 30/70 | | Da87 | 60 | Small | Not discolored | Present |
| | Da88 | KZnAl₂F₉/Al—1Si—1Cu—90Zn | 30/70 | | Da88 | 50 | Small | Not discolored | Present |

TABLE 4-13

| | Specimen | Flux composition | Mixing ratio (%) | | Specimen | Joining ratio (%) | Size of fillet | External appearance of surface of aluminum | Residue on surface of aluminum |
|---|---|---|---|---|---|---|---|---|---|
| Comparative Example 4 | Ea45 | $CsZnAlF_6$/Al | 30/70 | Comparative Example 4 | Ea45 | 30 | Small | Not discolored | Present |
| | Ea46 | $CsZnAlF_6$/Si | 30/70 | | Ea46 | 90 | Large | Not discolored | Present |
| | Ea47 | $CsZnAlF_6$/Cu | 30/70 | | Ea47 | 60 | Small | Not discolored | Present |
| | Ea48 | $CsZnAlF_6$/Zn | 30/70 | | Ea48 | 50 | Small | Not discolored | Present |
| | Ea49 | $CsZnAlF_6$/Al—1Si | 30/70 | | Ea49 | 35 | Small | Not discolored | Present |
| | Ea50 | $CsZnAlF_6$/Al—10Si | 30/70 | | Ea50 | 40 | Small | Not discolored | Present |
| | Ea51 | $CsZnAlF_6$/Al—50Si | 30/70 | | Ea51 | 70 | Small | Not discolored | Present |
| | Ea52 | $CsZnAlF_6$/Al—90Si | 30/70 | | Ea52 | 80 | Small | Not discolored | Present |
| | Ea53 | $CsZnAlF_6$/Al—1Cu | 30/70 | | Ea53 | 30 | Small | Not discolored | Present |
| | Ea54 | $CsZnAlF_6$/Al—10Cu | 30/70 | | Ea54 | 35 | Medium | Not discolored | Present |
| | Ea55 | $CsZnAlF_6$/Al—50Cu | 30/70 | | Ea55 | 50 | Large | Not discolored | Present |
| | Ea56 | $CsZnAlF_6$/Al—90Cu | 30/70 | | Ea56 | 60 | Small | Not discolored | Present |
| | Ea57 | $CsZnAlF_6$/Al—1Zn | 30/70 | | Ea57 | 30 | Small | Not discolored | Present |
| | Ea58 | $CsZnAlF_6$/Al—10Zn | 30/70 | | Ea58 | 35 | Small | Not discolored | Present |
| | Ea59 | $CsZnAlF_6$/Al—50Zn | 30/70 | | Ea59 | 40 | Small | Not discolored | Present |
| | Ea60 | $CsZnAlF_6$/Al—90Zn | 30/70 | | Ea60 | 50 | Small | Not discolored | Present |
| | Ea61 | $CsZnAlF_6$/Cu—10Zn | 30/70 | | Ea61 | 60 | Small | Not discolored | Present |
| | Ea62 | $CsZnAlF_6$/Cu—50Zn | 30/70 | | Ea62 | 55 | Small | Not discolored | Present |
| | Ea63 | $CsZnAlF_6$/Cu—90Zn | 30/70 | | Ea63 | 50 | Small | Not discolored | Present |
| | Ea64 | $CsZnAlF_6$/Al—1Si—1Cu | 30/70 | | Ea64 | 30 | Small | Not discolored | Present |
| | Ea65 | $CsZnAlF_6$/Al—10Si—10Cu | 30/70 | | Ea65 | 40 | Small | Not discolored | Present |
| | Ea66 | $CsZnAlF_6$/Al—25Si—25Cu | 30/70 | | Ea66 | 50 | Medium | Not discolored | Present |
| | Ea67 | $CsZnAlF_6$/Al—45Si—45Cu | 30/70 | | Ea67 | 60 | Medium | Not discolored | Present |
| | Ea68 | $CsZnAlF_6$/Al—90Si—1Cu | 30/70 | | Ea68 | 80 | Large | Not discolored | Present |
| | Ea69 | $CsZnAlF_6$/Al—1Si—90Cu | 30/70 | | Ea69 | 60 | Small | Not discolored | Present |
| | Ea70 | $CsZnAlF_6$/Al—1Si—1Zn | 30/70 | | Ea70 | 35 | Small | Not discolored | Present |
| | Ea71 | $CsZnAlF_6$/Al—10Si—10Zn | 30/70 | | Ea71 | 40 | Small | Not discolored | Present |
| | Ea72 | $CsZnAlF_6$/Al—25Si—25Zn | 30/70 | | Ea72 | 45 | Medium | Not discolored | Present |
| | Ea73 | $CsZnAlF_6$/Al—45Si—45Zn | 30/70 | | Ea73 | 55 | Medium | Not discolored | Present |
| | Ea74 | $CsZnAlF_6$/Al—90Si—1Zn | 30/70 | | Ea74 | 80 | Large | Not discolored | Present |
| | Ea75 | $CsZnAlF_6$/Al—1Si—90Zn | 30/70 | | Ea75 | 60 | Small | Not discolored | Present |
| | Ea76 | $CsZnAlF_6$/Al—1Cu—1Zn | 30/70 | | Ea76 | 30 | Small | Not discolored | Present |
| | Ea77 | $CsZnAlF_6$/Al—10Cu—10Zn | 30/70 | | Ea77 | 35 | Small | Not discolored | Present |
| | Ea78 | $CsZnAlF_6$/Al—25Cu—25Zn | 30/70 | | Ea78 | 40 | Small | Not discolored | Present |
| | Ea79 | $CsZnAlF_6$/Al—45Cu—45Zn | 30/70 | | Ea79 | 50 | Small | Not discolored | Present |
| | Ea80 | $CsZnAlF_6$/Al—90Cu—1Zn | 30/70 | | Ea80 | 60 | Small | Not discolored | Present |
| | Ea81 | $CsZnAlF_6$/Al—1Cu—90Zn | 30/70 | | Ea81 | 50 | Small | Not discolored | Present |
| | Ea82 | $CsZnAlF_6$/Al—1Si—1Cu—1Zn | 30/70 | | Ea82 | 35 | Small | Not discolored | Present |
| | Ea83 | $CsZnAlF_6$/Al—5Si—5Cu—5Zn | 30/70 | | Ea83 | 40 | Small | Not discolored | Present |
| | Ea84 | $CsZnAlF_6$/Al—10Si—10Cu—10Zn | 30/70 | | Ea84 | 50 | Small | Not discolored | Present |
| | Ea85 | $CsZnAlF_6$/Al—30Si—30Cu—30Cu | 30/70 | | Ea85 | 55 | Medium | Not discolored | Present |
| | Ea86 | $CsZnAlF_6$/Al—90Si—1Cu—1Zn | 30/70 | | Ea86 | 80 | Large | Not discolored | Present |
| | Ea87 | $CsZnAlF_6$/Al—1Si—90Cu—1Zn | 30/70 | | Ea87 | 60 | Small | Not discolored | Present |
| | Ea88 | $CsZnAlF_6$/Al—1Si—1Cu—90Zn | 30/70 | | Ea88 | 50 | Small | Not discolored | Present |

TABLE 4-14

| | Specimen | Flux composition | Mixing ratio (%) | | Specimen | Joining ratio (%) | Size of fillet | External appearance of surface of aluminum | Residue on surface of aluminum |
|---|---|---|---|---|---|---|---|---|---|
| Comparative Example 4 | Fa45 | $Cs_2ZnAlF_7$/Al | 30/70 | Comparative Example 4 | Fa45 | 30 | Small | Not discolored | Present |
| | Fa46 | $Cs_2ZnAlF_7$/Si | 30/70 | | Fa46 | 90 | Large | Not discolored | Present |
| | Fa47 | $Cs_2ZnAlF_7$/Cu | 30/70 | | Fa47 | 60 | Small | Not discolored | Present |
| | Fa48 | $Cs_2ZnAlF_7$/Zn | 30/70 | | Fa48 | 50 | Small | Not discolored | Present |
| | Fa49 | $Cs_2ZnAlF_7$/Al—1Si | 30/70 | | Fa49 | 35 | Small | Not discolored | Present |
| | Fa50 | $Cs_2ZnAlF_7$/Al—10Si | 30/70 | | Fa50 | 40 | Small | Not discolored | Present |
| | Fa51 | $Cs_2ZnAlF_7$/Al—50Si | 30/70 | | Fa51 | 70 | Small | Not discolored | Present |
| | Fa52 | $Cs_2ZnAlF_7$/Al—90Si | 30/70 | | Fa52 | 80 | Small | Not discolored | Present |
| | Fa53 | $Cs_2ZnAlF_7$/Al—1Cu | 30/70 | | Fa53 | 30 | Small | Not discolored | Present |
| | Fa54 | $Cs_2ZnAlF_7$/Al—10Cu | 30/70 | | Fa54 | 35 | Medium | Not discolored | Present |
| | Fa55 | $Cs_2ZnAlF_7$/Al—50Cu | 30/70 | | Fa55 | 50 | Large | Not discolored | Present |
| | Fa56 | $Cs_2ZnAlF_7$/Al—90Cu | 30/70 | | Fa56 | 60 | Small | Not discolored | Present |
| | Fa57 | $Cs_2ZnAlF_7$/Al—1Zn | 30/70 | | Fa57 | 30 | Small | Not discolored | Present |
| | Fa58 | $Cs_2ZnAlF_7$/Al—10Zn | 30/70 | | Fa58 | 35 | Small | Not discolored | Present |
| | Fa59 | $Cs_2ZnAlF_7$/Al—50Zn | 30/70 | | Fa59 | 40 | Small | Not discolored | Present |
| | Fa60 | $Cs_2ZnAlF_7$/Al—90Zn | 30/70 | | Fa60 | 50 | Small | Not discolored | Present |
| | Fa61 | $Cs_2ZnAlF_7$/Cu—10Zn | 30/70 | | Fa61 | 60 | Small | Not discolored | Present |
| | Fa62 | $Cs_2ZnAlF_7$/Cu—50Zn | 30/70 | | Fa62 | 55 | Small | Not discolored | Present |
| | Fa63 | $Cs_2ZnAlF_7$/Cu—90Zn | 30/70 | | Fa63 | 50 | Small | Not discolored | Present |
| | Fa64 | $Cs_2ZnAlF_7$/Al—1Si—1Cu | 30/70 | | Fa64 | 30 | Small | Not discolored | Present |

TABLE 4-14-continued

| Specimen | Flux composition | Mixing ratio (%) | Specimen | Joining ratio (%) | Size of fillet | External appearance of surface of aluminum | Residue on surface of aluminum |
|---|---|---|---|---|---|---|---|
| Fa65 | $Cs_2ZnAlF_7$/Al—10Si—10Cu | 30/70 | Fa65 | 40 | Small | Not discolored | Present |
| Fa66 | $Cs_2ZnAlF_7$/Al—25Si—25Cu | 30/70 | Fa66 | 50 | Medium | Not discolored | Present |
| Fa67 | $Cs_2ZnAlF_7$/Al—45Si—45Cu | 30/70 | Fa67 | 60 | Medium | Not discolored | Present |
| Fa68 | $Cs_2ZnAlF_7$/Al—90Si—1Cu | 30/70 | Fa68 | 80 | Large | Not discolored | Present |
| Fa69 | $Cs_2ZnAlF_7$/Al—1Si—90Cu | 30/70 | Fa69 | 60 | Small | Not discolored | Present |
| Fa70 | $Cs_2ZnAlF_7$/Al—1Si—1Zn | 30/70 | Fa70 | 35 | Small | Not discolored | Present |
| Fa71 | $Cs_2ZnAlF_7$/Al—10Si—10Zn | 30/70 | Fa71 | 40 | Small | Not discolored | Present |
| Fa72 | $Cs_2ZnAlF_7$/Al—25Si—25Zn | 30/70 | Fa72 | 45 | Medium | Not discolored | Present |
| Fa73 | $Cs_2ZnAlF_7$/Al—45Si—45Zn | 30/70 | Fa73 | 55 | Medium | Not discolored | Present |
| Fa74 | $Cs_2ZnAlF_7$/Al—90Si—1Zn | 30/70 | Fa74 | 80 | Large | Not discolored | Present |
| Fa75 | $Cs_2ZnAlF_7$/Al—1Si—90Zn | 30/70 | Fa75 | 60 | Small | Not discolored | Present |
| Fa76 | $Cs_2ZnAlF_7$/Al—1Cu—1Zn | 30/70 | Fa76 | 30 | Small | Not discolored | Present |
| Fa77 | $Cs_2ZnAlF_7$/Al—10Cu—10Zn | 30/70 | Fa77 | 35 | Small | Not discolored | Present |
| Fa78 | $Cs_2ZnAlF_7$/Al—25Cu—25Zn | 30/70 | Fa78 | 40 | Small | Not discolored | Present |
| Fa79 | $Cs_2ZnAlF_7$/Al—45Cu—45Zn | 30/70 | Fa79 | 50 | Small | Not discolored | Present |
| Fa80 | $Cs_2ZnAlF_7$/Al—90Cu—1Zn | 30/70 | Fa80 | 60 | Small | Not discolored | Present |
| Fa81 | $Cs_2ZnAlF_7$/Al—1Cu—90Zn | 30/70 | Fa81 | 50 | Small | Not discolored | Present |
| Fa82 | $Cs_2ZnAlF_7$/Al—1Si—1 Cu—1Zn | 30/70 | Fa82 | 35 | Small | Not discolored | Present |
| Fa83 | $Cs_2ZnAlF_7$/Al—5Si—5Cu—5Zn | 30/70 | Fa83 | 40 | Small | Not discolored | Present |
| Fa84 | $Cs_2ZnAlF_7$/Al—10Si—10Cu—10Zn | 30/70 | Fa84 | 50 | Small | Not discolored | Present |
| Fa85 | $Cs_2ZnAlF_7$/Al—30Si—30Cu—30Cu | 30/70 | Fa85 | 55 | Medium | Not discolored | Present |
| Fa86 | $Cs_2ZnAlF_7$/Al—90Si—1Cu—1Zn | 30/70 | Fa86 | 80 | Large | Not discolored | Present |
| Fa87 | $Cs_2ZnAlF_7$/Al—1Si—90Cu—1Zn | 30/70 | Fa87 | 60 | Small | Not discolored | Present |
| Fa88 | $Cs_2ZnAlF_7$/Al—1Si—1Cu—90Zn | 30/70 | Fa88 | 50 | Small | Not discolored | Present |

TABLE 4-15

| | Specimen | Flux composition | Mixing ratio (%) | | Specimen | Joining ratio (%) | Size of fillet | External appearance of surface of aluminum | Residue on surface of aluminum |
|---|---|---|---|---|---|---|---|---|---|
| Comparative Example 4 | Ga45 | $CsZn_2AlF_8$/Al | 30/70 | Comparative Example 4 | Ga45 | 30 | Small | Not discolored | Present |
| | Ga46 | $CsZn_2AlF_8$/Si | 30/70 | | Ga46 | 90 | Large | Not discolored | Present |
| | Ga47 | $CsZn_2AlF_8$/Cu | 30/70 | | Ga47 | 60 | Small | Not discolored | Present |
| | Ga48 | $CsZn_2AlF_8$/Zn | 30/70 | | Ga48 | 50 | Small | Not discolored | Present |
| | Ga49 | $CsZn_2AlF_8$/Al—1Si | 30/70 | | Ga49 | 35 | Small | Not discolored | Present |
| | Ga50 | $CsZn_2AlF_8$/Al—10Si | 30/70 | | Ga50 | 40 | Small | Not discolored | Present |
| | Ga51 | $CsZn_2AlF_8$/Al—50Si | 30/70 | | Ga51 | 70 | Small | Not discolored | Present |
| | Ga52 | $CsZn_2AlF_8$/Al—90Si | 30/70 | | Ga52 | 80 | Small | Not discolored | Present |
| | Ga53 | $CsZn_2AlF_8$/Al—1Cu | 30/70 | | Ga53 | 30 | Small | Not discolored | Present |
| | Ga54 | $CsZn_2AlF_8$/Al—10Cu | 30/70 | | Ga54 | 35 | Medium | Not discolored | Present |
| | Ga55 | $CsZn_2AlF_8$/Al—50Cu | 30/70 | | Ga55 | 50 | Large | Not discolored | Present |
| | Ga56 | $CsZn_2AlF_8$/Al—90Cu | 30/70 | | Ga56 | 60 | Small | Not discolored | Present |
| | Ga57 | $CsZn_2AlF_8$/Al—1Zn | 30/70 | | Ga57 | 30 | Small | Not discolored | Present |
| | Ga58 | $CsZn_2AlF_8$/Al—10Zn | 30/70 | | Ga58 | 35 | Small | Not discolored | Present |
| | Ga59 | $CsZn_2AlF_8$/Al—50Zn | 30/70 | | Ga59 | 40 | Small | Not discolored | Present |
| | Ga60 | $CsZn_2AlF_8$/Al—90Zn | 30/70 | | Ga60 | 50 | Small | Not discolored | Present |
| | Ga61 | $CsZn_2AlF_8$/Cu—10Zn | 30/70 | | Ga61 | 60 | Small | Not discolored | Present |
| | Ga62 | $CsZn_2AlF_8$/Cu—50Zn | 30/70 | | Ga62 | 55 | Small | Not discolored | Present |
| | Ga63 | $CsZn_2AlF_8$/Cu—90Zn | 30/70 | | Ga63 | 50 | Small | Not discolored | Present |
| | Ga64 | $CsZn_2AlF_8$/Al—1Si—1Cu | 30/70 | | Ga64 | 30 | Small | Not discolored | Present |
| | Ga65 | $CsZn_2AlF_8$/Al—10Si—10Cu | 30/70 | | Ga65 | 40 | Small | Not discolored | Present |
| | Ga66 | $CsZn_2AlF_8$/Al—25Si—25Cu | 30/70 | | Ga66 | 50 | Medium | Not discolored | Present |
| | Ga67 | $CsZn_2AlF_8$/Al—45Si—45Cu | 30/70 | | Ga67 | 60 | Medium | Not discolored | Present |
| | Ga68 | $CsZn_2AlF_8$/Al—90Si—1Cu | 30/70 | | Ga68 | 80 | Large | Not discolored | Present |
| | Ga69 | $CsZn_2AlF_8$/Al—1Si—90Cu | 30/70 | | Ga69 | 60 | Small | Not discolored | Present |
| | Ga70 | $CsZn_2AlF_8$/Al—1Si—1Zn | 30/70 | | Ga70 | 35 | Small | Not discolored | Present |
| | Ga71 | $CsZn_2AlF_8$/Al—10Si—10Zn | 30/70 | | Ga71 | 40 | Small | Not discolored | Present |
| | Ga72 | $CsZn_2AlF_8$/Al—25Si—25Zn | 30/70 | | Ga72 | 45 | Medium | Not discolored | Present |
| | Ga73 | $CsZn_2AlF_8$/Al—45Si—45Zn | 30/70 | | Ga73 | 55 | Medium | Not discolored | Present |
| | Ga74 | $CsZn_2AlF_8$/Al—90Si—1Zn | 30/70 | | Ga74 | 80 | Large | Not discolored | Present |
| | Ga75 | $CsZn_2AlF_8$/Al—1Si—90Zn | 30/70 | | Ga75 | 60 | Small | Not discolored | Present |
| | Ga76 | $CsZn_2AlF_8$/Al—1Cu—1Zn | 30/70 | | Ga76 | 30 | Small | Not discolored | Present |
| | Ga77 | $CsZn_2AlF_8$/Al—10Cu—10Zn | 30/70 | | Ga77 | 35 | Small | Not discolored | Present |
| | Ga78 | $CsZn_2AlF_8$/Al—25Cu—25Zn | 30/70 | | Ga78 | 40 | Small | Not discolored | Present |
| | Ga79 | $CsZn_2AlF_8$/Al—45Cu—45Zn | 30/70 | | Ga79 | 50 | Small | Not discolored | Present |
| | Ga80 | $CsZn_2AlF_8$/Al—90Cu—1Zn | 30/70 | | Ga80 | 60 | Small | Not discolored | Present |
| | Ga81 | $CsZn_2AlF_8$/Al—1Cu—90Zn | 30/70 | | Ga81 | 50 | Small | Not discolored | Present |
| | Ga82 | $CsZn_2AlF_8$/Al—1Si—1Cu—1Zn | 30/70 | | Ga82 | 35 | Small | Not discolored | Present |
| | Ga83 | $CsZn_2AlF_8$/Al—5Si—5Cu—5Zn | 30/70 | | Ga83 | 40 | Small | Not discolored | Present |
| | Ga84 | $CsZn_2AlF_8$/Al—10Si—10Cu—10Zn | 30/70 | | Ga84 | 50 | Small | Not discolored | Present |

TABLE 4-15-continued

| Specimen | Flux composition | Mixing ratio (%) | Specimen | Joining ratio (%) | Size of fillet | External appearance of surface of aluminum | Residue on surface of aluminum |
|---|---|---|---|---|---|---|---|
| Ga85 | $CsZn_2AlF_8$/Al—30Si—30Cu—30Cu | 30/70 | Ga85 | 55 | Medium | Not discolored | Present |
| Ga86 | $CsZn_2AlF_8$/Al—90Si—1Cu—1Zn | 30/70 | Ga86 | 80 | Large | Not discolored | Present |
| Ga87 | $CsZn_2AlF_8$/Al—1Si—90Cu—1Zn | 30/70 | Ga87 | 60 | Small | Not discolored | Present |
| Ga88 | $CsZn_2AlF_8$/Al—1Si—1Cu—90Zn | 30/70 | Ga88 | 50 | Small | Not discolored | Present |

TABLE 4-16

| | Specimen | Flux composition | Mixing ratio (%) | | Specimen | Joining ratio (%) | Size of fillet | External appearance of surface of aluminum | Residue on surface of aluminum |
|---|---|---|---|---|---|---|---|---|---|
| Comparative Example 4 | Ha45 | $CsZnAl_2F_9$/Al | 30/70 | Comparative Example 4 | Ha45 | 30 | Small | Not discolored | Present |
| | Ha46 | $CsZnAl_2F_9$/Si | 30/70 | | Ha46 | 90 | Large | Not discolored | Present |
| | Ha47 | $CsZnAl_2F_9$/Cu | 30/70 | | Ha47 | 60 | Small | Not discolored | Present |
| | Ha48 | $CsZnAl_2F_9$/Zn | 30/70 | | Ha48 | 50 | Small | Not discolored | Present |
| | Ha49 | $CsZnAl_2F_9$/Al—1Si | 30/70 | | Ha49 | 35 | Small | Not discolored | Present |
| | Ha50 | $CsZnAl_2F_9$/Al—10Si | 30/70 | | Ha50 | 40 | Small | Not discolored | Present |
| | Ha51 | $CsZnAl_2F_9$/Al—50Si | 30/70 | | Ha51 | 70 | Small | Not discolored | Present |
| | Ha52 | $CsZnAl_2F_9$/Al—90Si | 30/70 | | Ha52 | 80 | Small | Not discolored | Present |
| | Ha53 | $CsZnAl_2F_9$/Al—1Cu | 30/70 | | Ha53 | 30 | Small | Not discolored | Present |
| | Ha54 | $CsZnAl_2F_9$/Al—10Cu | 30/70 | | Ha54 | 35 | Medium | Not discolored | Present |
| | Ha55 | $CsZnAl_2F_9$/Al—50Cu | 30/70 | | Ha55 | 50 | Large | Not discolored | Present |
| | Ha56 | $CsZnAl_2F_9$/Al—90Cu | 30/70 | | Ha56 | 60 | Small | Not discolored | Present |
| | Ha57 | $CsZnAl_2F_9$/Al—1Zn | 30/70 | | Ha57 | 30 | Small | Not discolored | Present |
| | Ha58 | $CsZnAl_2F_9$/Al—10Zn | 30/70 | | Ha58 | 35 | Small | Not discolored | Present |
| | Ha59 | $CsZnAl_2F_9$/Al—50Zn | 30/70 | | Ha59 | 40 | Small | Not discolored | Present |
| | Ha60 | $CsZnAl_2F_9$/Al—90Zn | 30/70 | | Ha60 | 50 | Small | Not discolored | Present |
| | Ha61 | $CsZnAl_2F_9$/Cu—10Zn | 30/70 | | Ha61 | 60 | Small | Not discolored | Present |
| | Ha62 | $CsZnAl_2F_9$/Cu—50Zn | 30/70 | | Ha62 | 55 | Small | Not discolored | Present |
| | Ha63 | $CsZnAl_2F_9$/Cu—90Zn | 30/70 | | Ha63 | 50 | Small | Not discolored | Present |
| | Ha64 | $CsZnAl_2F_9$/Al—1Si—1Cu | 30/70 | | Ha64 | 30 | Small | Not discolored | Present |
| | Ha65 | $CsZnAl_2F_9$/Al—10Si—10Cu | 30/70 | | Ha65 | 40 | Small | Not discolored | Present |
| | Ha66 | $CsZnAl_2F_9$/Al—25Si—25Cu | 30/70 | | Ha66 | 50 | Medium | Not discolored | Present |
| | Ha67 | $CsZnAl_2F_9$/Al—45Si—45Cu | 30/70 | | Ha67 | 60 | Medium | Not discolored | Present |
| | Ha68 | $CsZnAl_2F_9$/Al—90Si—1Cu | 30/70 | | Ha68 | 80 | Large | Not discolored | Present |
| | Ha69 | $CsZnAl_2F_9$/Al—1Si—90Cu | 30/70 | | Ha69 | 60 | Small | Not discolored | Present |
| | Ha70 | $CsZnAl_2F_9$/Al—1Si—1Zn | 30/70 | | Ha70 | 35 | Small | Not discolored | Present |
| | Ha71 | $CsZnAl_2F_9$/Al—10Si—10Zn | 30/70 | | Ha71 | 40 | Small | Not discolored | Present |
| | Ha72 | $CsZnAl_2F_9$/Al—25Si—25Zn | 30/70 | | Ha72 | 45 | Medium | Not discolored | Present |
| | Ha73 | $CsZnAl_2F_9$/Al—45Si—45Zn | 30/70 | | Ha73 | 55 | Medium | Not discolored | Present |
| | Ha74 | $CsZnAl_2F_9$/Al—90Si—1Zn | 30/70 | | Ha74 | 80 | Large | Not discolored | Present |
| | Ha75 | $CsZnAl_2F_9$/Al—1Si—90Zn | 30/70 | | Ha75 | 60 | Small | Not discolored | Present |
| | Ha76 | $CsZnAl_2F_9$/Al—1Cu—1Zn | 30/70 | | Ha76 | 30 | Small | Not discolored | Present |
| | Ha77 | $CsZnAl_2F_9$/Al—10Cu—10Zn | 30/70 | | Ha77 | 35 | Small | Not discolored | Present |
| | Ha78 | $CsZnAl_2F_9$/Al—25Cu—25Zn | 30/70 | | Ha78 | 40 | Small | Not discolored | Present |
| | Ha79 | $CsZnAl_2F_9$/Al—45Cu—45Zn | 30/70 | | Ha79 | 50 | Small | Not discolored | Present |
| | Ha80 | $CsZnAl_2F_9$/Al—90Cu—1Zn | 30/70 | | Ha80 | 60 | Small | Not discolored | Present |
| | Ha81 | $CsZnAl_2F_9$/Al—1Cu—90Zn | 30/70 | | Ha81 | 50 | Small | Not discolored | Present |
| | Ha82 | $CsZnAl_2F_9$/Al—1Si—1Cu—1Zn | 30/70 | | Ha82 | 35 | Small | Not discolored | Present |
| | Ha83 | $CsZnAl_2F_9$/Al—5Si—5Cu—5Zn | 30/70 | | Ha83 | 40 | Small | Not discolored | Present |
| | Ha84 | $CsZnAl_2F_9$/Al—10Si—10Cu—10Zn | 30/70 | | Ha84 | 50 | Small | Not discolored | Present |
| | Ha85 | $CsZnAl_2F_9$/Al—30Si—30Cu—30Cu | 30/70 | | Ha85 | 55 | Medium | Not discolored | Present |
| | Ha86 | $CsZnAl_2F_9$/Al—90Si—1Cu—1Zn | 30/70 | | Ha86 | 80 | Large | Not discolored | Present |
| | Ha87 | $CsZnAl_2F_9$/Al—1Si—90Cu—1Zn | 30/70 | | Ha87 | 60 | Small | Not discolored | Present |
| | Ha88 | $CsZnAl_2F_9$/Al—1Si—1Cu—90Zn | 30/70 | | Ha88 | 50 | Small | Not discolored | Present |

As shown in Tables 4-1 to 4-8, good results (brazability) were obtained in Example 5 even when the metal powder was mixed. On the other hand, when the ratio of the metal powder was high (Ae45 to Ae88, Be45 to Be88, Ce45 to Ce88, De45 to De88, Ee45 to Ee88, Fe45 to Fe88, Ge45 to Ge88, and He45 to He88 of Comparative Example 4), an unmelted residue was observed, and the joining ratio decreased due to the unmelted residue.

Example 5 and Comparative Example 5

Flux Composition

Flux powders (average particle size: 10 μm) (flux content: 100 mass %) having the composition shown in Table 5 were provided as a flux composition.

Brazing Test

The brazing test was performed in the same manner as in Example 1 and Comparative Example 1, except that the average dew point inside the furnace was changed as shown in Table 5.

Evaluation of Brazability

The brazability was evaluated in the same manner as in Example 1 and Comparative Example 1. The evaluation results are shown in Table 5.

TABLE 5

| Specimen | Flux composition | Average dew point (° C.) | Specimen | Joining ratio (%) | Size of fillet | External appearance of surface of aluminum | Residue on surface of aluminum |
|---|---|---|---|---|---|---|---|
| Example 5 | Af1 | KZnAlF6 | −40 | Example 5 | Af1 | 100 | Large | Not discolored | Absent |
| | Af2 | KZnAlF6 | −20 | | Af2 | 100 | Large | Not discolored | Absent |
| | Bf1 | K2ZnAlF7 | −40 | | Bf1 | 100 | Large | Not discolored | Absent |
| | Bf2 | K2ZnAlF7 | −20 | | Bf2 | 100 | Large | Not discolored | Absent |
| | Cf1 | K2n2AlF | −40 | | Cf1 | 100 | Large | Not discolored | Absent |
| | Cf2 | K2n2AlF | −20 | | Cf2 | 100 | Large | Not discolored | Absent |
| | Df1 | KZnAl2F9 | −40 | | Df1 | 100 | Large | Not discolored | Absent |
| | Df2 | KZnAl2F9 | −20 | | Df2 | 100 | Large | Not discolored | Absent |
| | Ef1 | CsZnAlF6 | −40 | | Ef1 | 100 | Large | Not discolored | Absent |
| | Ef2 | CsZnAlF6 | −20 | | Ef2 | 100 | Large | Not discolored | Absent |
| | Ff1 | Cs2ZnAlF7 | −40 | | Ff1 | 100 | Large | Not discolored | Absent |
| | Ff2 | Cs2ZnAlF7 | −20 | | Ff2 | 100 | Large | Not discolored | Absent |
| | Gf1 | CsZn2AlFs, | −40 | | Gf1 | 100 | Large | Not discolored | Absent |
| | Gf2 | CsZn2AlFs, | −20 | | Gf2 | 100 | Large | Not discolored | Absent |
| | Hf1 | CsZnAl2F9 | −40 | | Hf1 | 100 | Large | Not discolored | Absent |
| | Hf2 | CsZnAl2F9 | −20 | | Hf2 | 100 | Large | Not discolored | Absent |
| Comparative Example 5 | If1 | KZnF3 | −20 | Comparative Example 5 | If1 | 0 | Absent | White | Present (white) |

As shown in Table 5, good results were obtained in Example 5 even when the average dew point during brazing was high. In Comparative Example 5 (If1), most of $KZnF_3$ remained unreacted as a white residue, and a fillet was not formed since the average dew point of the atmosphere during brazing was high.

The invention claimed is:

1. A flux composition comprising:
a component (A) that is a powder of an alkali metal zinc fluoroaluminate represented by a general formula (1), the content of the component (A) in the flux composition being 50 mass % or more, $$M_w Zn_x Al_y F_z \quad (1)$$

wherein M is K or Cs, and w, x, y, and z are a positive integer, the greatest common divisor of w, x, y, and z being 1, and
a component (B) that is at least one powder selected from the group consisting of a powder of an alkali metal fluoroaluminate and a powder of an alkali metal fluorozincate.

2. A flux composition comprising:
a component (A) that is a powder of an alkali metal zinc fluoroaluminate represented by a general formula (1), the content of the component (A) in the flux composition being 50 mass % or more, $$M_w Zn_x Al_y F_z \quad (1)$$

wherein M is K or Cs, and w, x, y, and z are a positive integer, the greatest common divisor of w, x, y, and z being 1, and
a component (C) that is at least one metal powder selected from the group consisting of a powder of an aluminum alloy an Al powder, an Si powder, a Cu powder, and a Zn powder, the aluminum alloy comprising at least one metal element selected from the group consisting of Si, Cu, and Zn.

3. A flux composition comprising a component (A) that is a powder of an alkali metal zinc fluoroaluminate represented by the general formula (1), a component (B) that is one type of powder or two or more types of powders selected from a powder of an alkali metal fluoroaluminate and a powder of an alkali metal fluorozincate, and a component (C) that is at least one metal powder selected from the group consisting of a powder of an aluminum alloy, an Al powder, an Si powder, a Cu powder, and a Zn powder, the aluminum alloy comprising at least one metal element selected from the group consisting of Si, Cu, and Zn.

4. The flux composition according to claim 1, having an average particle size of 80 μm or less.

5. A mixture comprising the flux composition according to claim 1, and an organic resin binder.

6. A mixture comprising the flux composition according to claim 2, and an organic resin binder.

7. A mixture comprising the flux composition according to claim 3, and an organic resin binder.

* * * * *